United States Patent
Kameyama

(10) Patent No.: US 8,605,995 B2
(45) Date of Patent: *Dec. 10, 2013

(54) IMAGE PROCESSING DEVICE AND METHOD, DATA PROCESSING DEVICE AND METHOD, PROGRAM, AND RECORDING MEDIUM

(75) Inventor: Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 13/388,025

(22) PCT Filed: Jul. 26, 2010

(86) PCT No.: PCT/JP2010/062503
§ 371 (c)(1),
(2), (4) Date: Jan. 30, 2012

(87) PCT Pub. No.: WO2011/013606
PCT Pub. Date: Feb. 3, 2011

(65) Prior Publication Data
US 2012/0128238 A1    May 24, 2012

(30) Foreign Application Priority Data
Jul. 31, 2009    (JP) .................................. 2009-179838

(51) Int. Cl.
*G06K 9/62*    (2006.01)
(52) U.S. Cl.
USPC .......................................................... 382/155
(58) Field of Classification Search
None
See application file for complete search history.

(56) References Cited

U.S. PATENT DOCUMENTS 6,820,137 B2    11/2004    Nakamura et al.
7,593,566 B2    9/2009    Kato et al.
(Continued)

FOREIGN PATENT DOCUMENTS

JP    2001-222702 A    8/2001
JP    2002-170112 A    6/2002
(Continued)

OTHER PUBLICATIONS

Generalized Face Super-Resolution. Kui Jia and Shaogang Gong. 2008 IEEE.*

(Continued)

*Primary Examiner* — Stephen R Koziol
*Assistant Examiner* — Delomia Gilliard
(74) *Attorney, Agent, or Firm* — Birch, Stewart, Kolasch & Birch, LLP

(57) ABSTRACT

An eigenprojection matrix (#14) is generated by a projection computation (#12) using a local relationship from a studying image group (#10) including a pair of a high quality image and a low quality image to create a projection core tensor (#16) defining a correspondence between the low quality image and an intermediate eigenspace and a correspondence between the high quality image and the intermediate eigenspace. A first sub-core tensor is created (#24) from the projection core tensor based on a first setting, and an inputted low quality image (#20) is projected (#30) based on the eigenprojection matrix and the first sub-core tensor to calculate a coefficient vector in the intermediate eigenspace. The coefficient vector is projected (#34) based on a second sub-core tensor (#26) created by a second setting from the projection core tensor and based on the eigenprojection matrix to obtain a high quality image (#36).

23 Claims, 27 Drawing Sheets

(56) References Cited

U.S. PATENT DOCUMENTS

| | | |
|---|---|---|
| 7,646,919 B2 | 1/2010 | Olsson et al. |
| 7,801,337 B2 | 9/2010 | Akahori et al. |
| 7,936,906 B2 | 5/2011 | Hua et al. |
| 8,306,316 B2 | 11/2012 | Kameyama |
| 2005/0210036 A1* | 9/2005 | Vasilescu .................... 707/100 |
| 2006/0143142 A1* | 6/2006 | Vasilescu et al. ............ 706/20 |
| 2006/0280380 A1 | 12/2006 | Li |
| 2008/0109474 A1* | 5/2008 | Vasilescu .................... 707/102 |
| 2008/0232667 A1 | 9/2008 | Kitamura et al. |
| 2010/0067772 A1 | 3/2010 | Kitamura |
| 2010/0092046 A1* | 4/2010 | Vasilescu .................... 382/118 |

FOREIGN PATENT DOCUMENTS

| | | |
|---|---|---|
| JP | 2006-350498 A | 12/2006 |
| JP | 2007-188419 A | 7/2007 |
| JP | 2008-84213 A | 4/2008 |
| JP | 2008-167948 A | 7/2008 |
| JP | 2008-167949 A | 7/2008 |
| JP | 2008-167950 A | 7/2008 |
| JP | 2008-192031 A | 8/2008 |
| JP | 2008-229161 A | 10/2008 |

OTHER PUBLICATIONS

Multi-Modal Tensor Face for Simultaneous Super-Resolution and Recognition. 2005 IEEE.*

Atkins, C.B.; Bouman, C.A.; Allebach, J.P., "Optimal image scaling using pixel classification", IEEE, Image Processing, Proceedings. 2001 International Conference. vol. 3, pp. 864-867.

Jia Kui, Gong Shaogang "Generalized Face Super-Resolution", IEEE Transactions of Image Processing, vol. 17, No. 6, Jun. 2008 pp. 873-886.

PCT/ISA/210—International Search Report dated Aug. 31, 2010 for PCT/JP2010/062503.

Zhuang Yueting, Zhang Jian, Wu Fei, "Hallucinating faces: LPH super-resolution and neighbor reconstruction for residue compensation", Pattern Recognition, vol. 40, No. 11, (2007) pp. 3178-3194.

Notice of Allowance dated May 14, 2013, issued in U.S. Appl. No. 12/847,489.

Office Action dated Jan. 29, 2013, issued in U.S. Appl. No. 12/847,489.

* cited by examiner

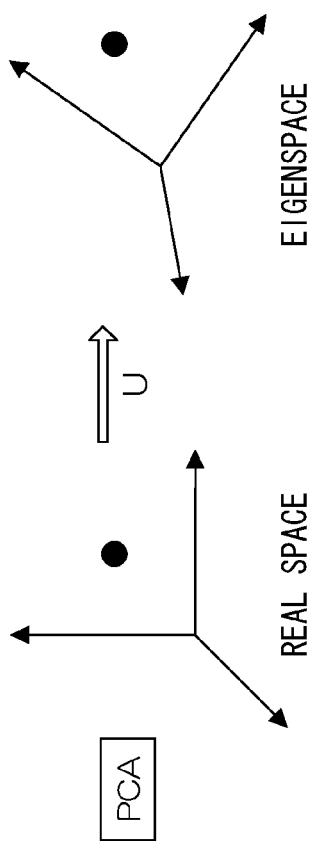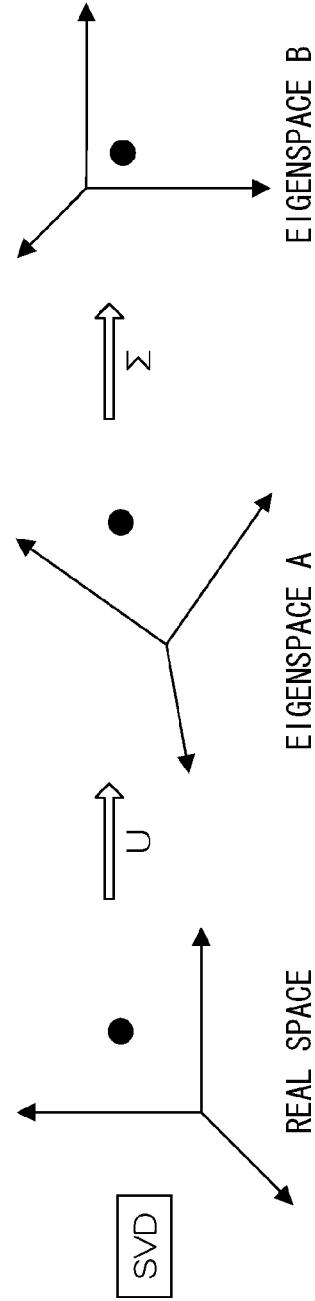

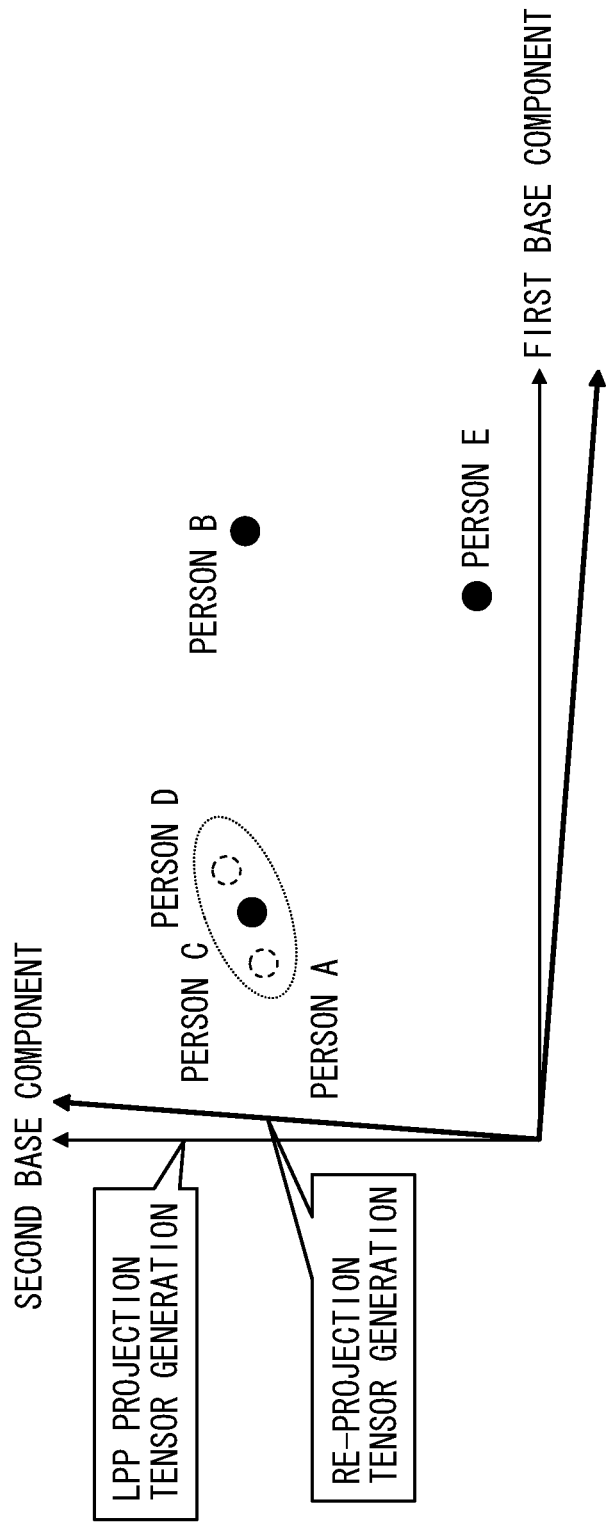

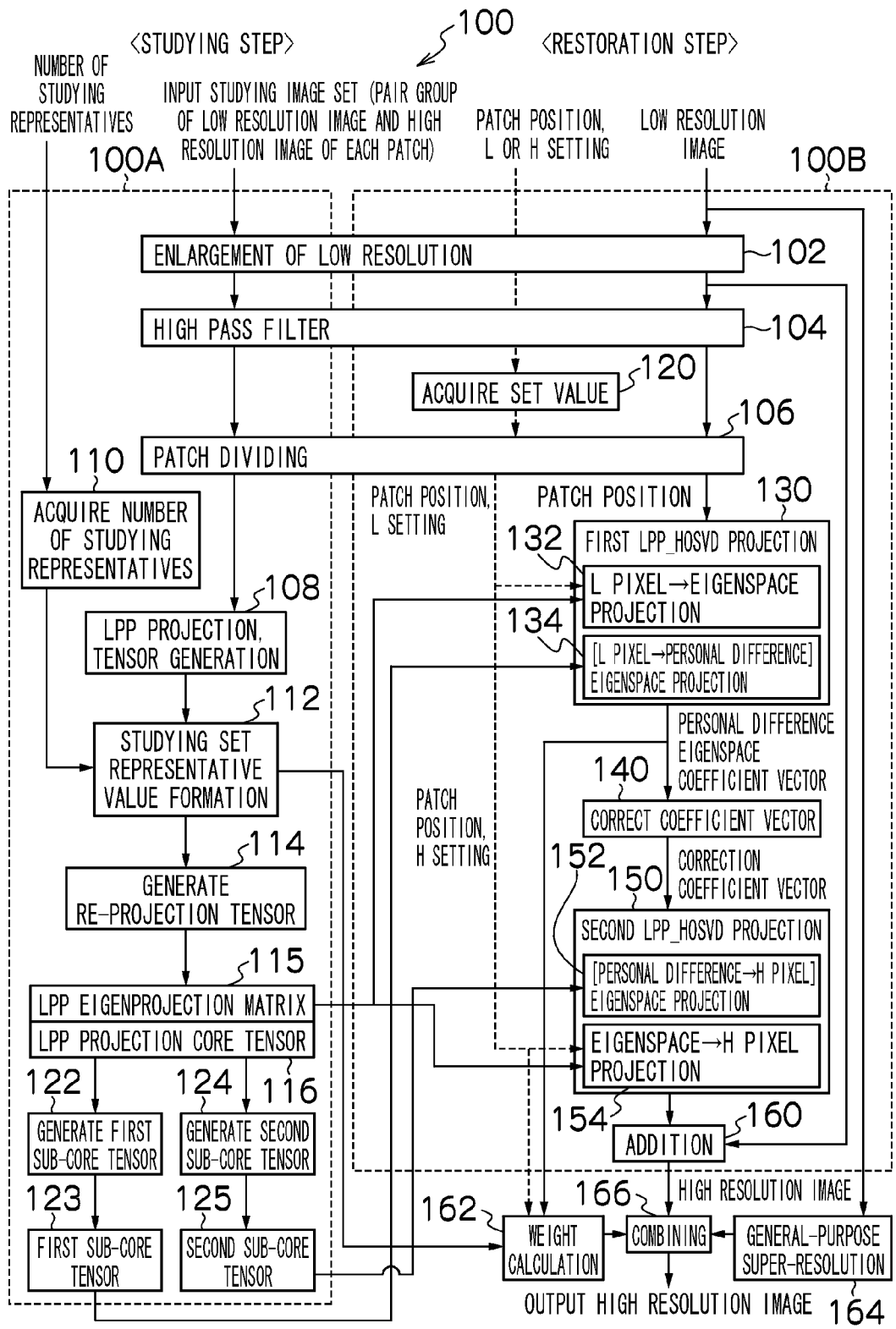

| DIRECTION | IMAGE PROCESSING PARAMETER |
|---|---|
| 0° | SPECIFIC PARAMETER A0 |
| 20° | SPECIFIC PARAMETER A1 |
| ⋮ | ⋮ |

| FOR NON-PERSON | NON-SPECIFIC PARAMETER B |
|---|---|

IMAGE PROCESSING DEVICE AND METHOD, DATA PROCESSING DEVICE AND METHOD, PROGRAM, AND RECORDING MEDIUM

TECHNICAL FIELD

The present invention relates to an image processing device and method, a data processing device and method, a program, and a recording medium, and particularly, to an image processing technique and a data processing technique suitable for restoring, interpolating, enlarging, and encoding high image quality information that does not exist in image data (low image quality information) before processing.

BACKGROUND ART

A technique is proposed as a method of generating a high resolution output image from a low resolution input image, in which pairs of low resolution images and high resolution images of a multiplicity of image contents are studied in advance, a conversion (projection) relationship from low resolution information to high resolution information is obtained, and the projection relationship is used to generate (restore) an image including the high resolution information from the low resolution input image (Non-Patent Literature 1).

The conventional method can be divided into a studying step and a restoration step, and, in the former studying step, the projection relationship between the low resolution information and the high resolution information of the pair group (will be called a "studying image set") of the low resolution images and the high resolution images are studied in advance using a principal component analysis (PCA) or a tensor singular value decomposition (TSVD). For example, a tensor is obtained, the tensor indicating the projection relationship between modality eigenspaces, such as conversion from a real space of low resolution pixels to a pixel eigenspace and conversion to a personal difference eigenspace (eigenspace) of person, as well as conversion to a high resolution pixel eigenspace and conversion from the high resolution pixel eigenspace to the real space.

Meanwhile, in the restoration step, the studied tensor is used to project input images of arbitrary low resolution information including the studying image set onto images of high resolution information.

According to the technique, the number of variations of modalities (such as individual difference between people, expression of face, resolution of image, face direction, illumination change, and race) of projection conversion can be expressed by the order of the tensor (studying model can be designed accordingly), and the projection that satisfies input conditions allows highly accurate restoration.

{Citation List}
{Non-Patent Literature}
{NPL 1}
JIA Kui, GONG Shaogang "Generalized Face Super-Resolution", IEEE Transactions of Image Processing, Vol. 17, No. 6, June 2008 Page. 873-886 (2008).

SUMMARY OF INVENTION

Technical Problem

However, input conditions of the projection conversion are harsh in the conventional technique, and the tolerance of variations, such as a geometric "deviation" between images related to the image position or the size, a personal difference, and a racial difference, is narrow. Therefore, there is a problem that when an image that does not meet the conditions is input, the restored image quality after the projection is deteriorated. There is also a problem in the conventional technique that when the modalities of the projection conversion increase, the order of the tensor increases, the processing speed decreases, and the memory size increases.

The problem relates not only to image processing, but also to various data processing using similar projection conversion, such as speech recognition, language data processing, living body information processing, and natural/physical information processing.

For example, in an application to the speech recognition, a sampling frequency, the number of quantization bits (the number of bits), and the like of voice data can be the modalities, and a studying eigenspace for speech recognition needs to be prepared for each sampling frequency, such as 48 kHz, 44.1 kHz, and 32 kHz, and each number of quantization bits, such as 16 bits and 8 bits.

In an application to the language processing, a studying eigenspace for language recognition needs to be prepared for each language, such as Japanese and English. In an application to the living body information processing, the natural/physical information processing, and the like, a studying eigenspace for information processing needs to be prepared for each of sampling frequency or needs to be prepared for each number of quantization bits.

The present invention has been made in view of the circumstances, and an object of the present invention is to provide an image processing device and method and a program that can alleviate input conditions of an image as a conversion source to realize highly accurate and highly robust (strong) image conversion. Another object of the present invention is to provide an image processing technique that can reduce the processing load, speed up the process, and suppress the required memory size while realizing the highly accurate conversion. Another object of the present invention is to provide a data processing device and method, a program, and a recording medium that expand and apply the image processing technique to a general data processing technique.

Solution to Problem

The following aspects of the invention are provided to attain the objects.

A first aspect of the present invention provides an image processing device characterized by including: studying image acquisition means for acquiring a studying image group including an image pair of a first-quality image and a second-quality image with different image qualities; eigenprojection matrix generation means for generating, from the acquired studying image group, an eigenprojection matrix by a projection computation using a local relationship; projection core tensor creation means for creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; first sub-core tensor creation means for creating, from the created projection core tensor, a first sub-core tensor corresponding to a condition specified by a first setting; second sub-core tensor creation means for creating, from the created projection core tensor, a second sub-core tensor corresponding to a condition specified by a second setting; first subtensor projection means for projecting an input image to be processed by a first projection computation using the eigenprojection matrix and the first sub-core tensor to calculate a coefficient vector in the intermediate eigenspace; and second subtensor projection means for projecting the calculated coefficient vector by a second projection computation using the second sub-core tensor and the eigenprojection matrix to generate a change image with an image quality different from the input image.

A second aspect of the present invention provides the image processing device according to the first aspect, characterized in that the first-quality image is an image with a relatively low image quality of the image pair, the second-quality image is an image with a relatively high image quality of the image pair, and the change quality image is an image with a higher image quality than the input image.

A third aspect of the present invention provides the image processing device according to the first or second aspect, characterized in that the first setting designates a projection relationship of projecting the first-quality image on the intermediate eigenspace, and the second setting designates a projection relationship of projecting the second-quality on the intermediate eigenspace.

A fourth aspect of the present invention provides the image processing device according to any of the first to third aspects, characterized in that the projection computation using the local relationship is one of locality preserving projection (LPP), locally linear embedding (LLE), linear tangent-space alignment (LTSA), Isomap, Laplacian eigenmaps (LE), and neighborhood preserving embedding (NPE).

A fifth aspect of the present invention provides the image processing device according to any of the first to fourth aspects, characterized in that the studying image group includes the image pair targeting a face of a person, and the intermediate eigenspace is a personal difference eigenspace.

A sixth aspect of the present invention provides an image processing device characterized by including: studying image acquisition means for acquiring a studying image group including an image pair of a first-quality image and a second-quality image with different image qualities; eigenprojection matrix generation means for generating, from the acquired studying image group, an eigenprojection matrix by a projection computation using a local relationship; projection core tensor creation means for creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and storage means for storing the eigenprojection matrix generated by the eigenprojection matrix generation means and the projection core tensor created by the projection core tensor creation means.

A seventh aspect of the present invention provides the image processing device according to the sixth aspect, characterized by including: first sub-core tensor creation means for creating a first sub-core tensor corresponding to a condition specified by the first setting from the created projection core tensor; and second sub-core tensor creation means for creating a second sub-core tensor corresponding to a condition specified by a second setting from the created projection core tensor, wherein the first sub-core tensor created by the first sub-core tensor creation means and the second sub-core tensor created by the second sub-core tensor creation means are stored and preserved in the storage means in place of the projection core tensor or along with the projection core tensor.

An eighth aspect of the present invention provides an image processing device characterized by including: information acquisition means for acquiring an eigenprojection matrix generated, by a projection computation using a local relationship, from a studying image group including an image pair of a first-quality image and a second-quality image with different image qualities, acquiring a first sub-core tensor created corresponding to a condition specified by a first setting from a projection core tensor using locality, the projection core tensor generated from the studying image group and the eigenprojection matrix, the projection core tensor defining a correspondence between the first-quality image and an intermediate eigenspace and a correspondence between the second-quality image and the intermediate eigenspace, and acquiring a second sub-core tensor created corresponding to a condition specified by a second setting from the projection core tensor; first subtensor projection means for projecting an input image to be processed by a first projection computation using the eigenprojection matrix and the first sub-core tensor acquired from the information acquisition means to calculate a coefficient vector in the intermediate eigenspace; and second subtensor projection means for projecting the calculated coefficient vector by a second projection computation using the second sub-core tensor and the eigenprojection matrix acquired from the information acquisition means to generate a quality change image with an image quality different from the input image.

A ninth aspect of the present invention provides the image processing device according to any of the first to fifth and eighth aspects, characterized by including: first feature area specifying means for specifying a first feature area from an inputted image; compression processing means for compressing an image part of the first feature area in the inputted image at a first compressive strength and compressing an image part of other than the first feature area at a second compressive strength which is a compressive strength higher than the first compressive strength; and means for projecting at least the first feature area by the first subtensor projection means and the second subtensor projection means to change the image quality.

The ninth aspect can further include: second feature area specifying means for setting, as the input image, an area of the inputted image not specified as the first feature area by the first feature area specifying means and searching a second feature area from a change image obtained by projecting image data of the area by the first subtensor projection means and the second subtensor projection means; and compression processing means for compressing image parts of the first feature area and the second feature area of the inputted image at a first compressive strength and compressing an image part of other than the feature areas at a second compressive strength which is a compressive strength higher than the first compressive strength.

A tenth aspect of the present invention provides an image processing method characterized by including: a studying image acquisition step of acquiring a studying image group including an image pair of a first-quality image and a second-quality image with different image qualities; an eigenprojection matrix generation step of generating, from the acquired studying image group, an eigenprojection matrix by a projection computation using a local relationship; a projection core tensor creation step of creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; a first sub-core tensor creation step of creating, from the created projection core tensor, a first sub-core tensor corresponding to a condition specified by a first setting; a second sub-core tensor creation step of creating, from the created projection core tensor, a second sub-core tensor corresponding to a condition specified by a second setting; a first subtensor projection step of projecting an input image to be processed by a first projection computation using the eigenprojection matrix and the first sub-core tensor to calculate a coefficient vector in the intermediate eigenspace; and a second subtensor projection step of projecting the calculated coefficient vector by a second projection computation using the second sub-core tensor and the eigenprojection matrix to generate a change image with an image quality different from the input image.

An eleventh aspect of the present invention provides an image processing method characterized by including: a studying image acquisition step of acquiring a studying image group including an image pair of a first-quality image and a second-quality image with different image qualities; an eigenprojection matrix generation step of generating, from the acquired studying image group, an eigenprojection matrix by a projection computation using a local relationship; a projection core tensor creation step of creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and a storage step of storing, in storage means, the eigenprojection matrix generated in the eigenprojection matrix generation step and the projection core tensor created in the projection core tensor creation step.

A twelfth aspect of the present invention provides the image processing method according to the eleventh aspect, characterized by including: a first sub-core tensor creation step of creating a first sub-core tensor corresponding to a condition specified by the first setting from the created projection core tensor; and a second sub-core tensor creation step of creating a second sub-core tensor corresponding to a condition specified by a second setting from the created projection core tensor, wherein the first sub-core tensor created in the first sub-core tensor creation step and the second sub-core tensor created in the second sub-core tensor creation step are stored and preserved in the storage means in place of the projection core tensor or along with the projection core tensor.

A thirteenth aspect of the present invention provides an image processing method characterized by including: an information acquisition step of acquiring an eigenprojection matrix generated, by a projection computation using a local relationship, from a studying image group including an image pair of a first-quality image and a second-quality image with different image qualities, acquiring a first sub-core tensor created corresponding to a condition specified by a first setting from a projection core tensor using locality, the projection core tensor generated from the studying image group and the eigenprojection matrix, the projection core tensor defining a correspondence between the first-quality image and an intermediate eigenspace and a correspondence between the second-quality image and the intermediate eigenspace, and acquiring a second sub-core tensor created corresponding to a condition specified by a second setting from the projection core tensor; a first subtensor projection step of projecting an input image to be processed by a first projection computation using the eigenprojection matrix and the first sub-core tensor acquired in the information acquisition step to calculate a coefficient vector in the intermediate eigenspace; and a second subtensor projection step of projecting the calculated coefficient vector by a second projection computation using the second sub-core tensor and the eigenprojection matrix acquired in the information acquisition step to generate a change image with an image quality different from the input image.

A fourteenth aspect of the present invention provides a program characterized by causing a computer to function as: studying image acquisition means for acquiring a studying image group including an image pair of a first-quality image and a second-quality image with different image qualities; eigenprojection matrix generation means for generating, from the acquired studying image group, an eigenprojection matrix by a projection computation using a local relationship; projection core tensor creation means for creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; first sub-core tensor creation means for creating, from the created projection core tensor, a first sub-core tensor corresponding to a condition specified by a first setting; second sub-core tensor creation means for creating, from the created projection core tensor, a second sub-core tensor corresponding to a condition specified by a second setting; first subtensor projection means for projecting an input image to be processed by a first projection computation using the eigenprojection matrix and the first sub-core tensor to calculate a coefficient vector in the intermediate eigenspace; and second subtensor projection means for projecting the calculated coefficient vector by a second projection computation using the second sub-core tensor and the eigenprojection matrix to generate a change image with an image quality different from the input image.

A fifteenth aspect of the present invention provides a program characterized by causing a computer to function as: studying image acquisition means for acquiring a studying image group including an image pair of a first-quality image and a second-quality image with different image qualities; eigenprojection matrix generation means for generating, from the acquired studying image group, an eigenprojection matrix by a projection computation using a local relationship; projection core tensor creation means for creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and storage means for storing the eigenprojection matrix generated by the eigenprojection matrix generation means and the projection core tensor created by the projection core tensor creation means.

A sixteenth aspect of the present invention provides the program according to the fifteenth aspect, characterized by further causing the computer to function as: first sub-core tensor creation means for creating, from the created projection core tensor, a first sub-core tensor corresponding to a condition specified by a first setting; and second sub-core tensor creation means for creating, from the created projection core tensor, a second sub-core tensor corresponding to a condition specified by a second setting, wherein the first sub-core tensor created by the first sub-core tensor creation means and the second sub-core tensor created by the second sub-core tensor creation means are stored and preserved in the storage means in place of the projection core tensor or along with the projection core tensor.

A seventeenth aspect of the present invention provides a program characterized by causing a computer to function as: information acquisition means for acquiring an eigenprojection matrix generated, by a projection computation using a local relationship, from a studying image group including an image pair of a first-quality image and a second-quality image with different image qualities, acquiring a first sub-core tensor created corresponding to a condition specified by a first setting from a projection core tensor using locality, the projection core tensor generated from the studying image group and the eigenprojection matrix, the projection core tensor defining a correspondence between the first-quality image and an intermediate eigenspace and a correspondence between the second-quality image and the intermediate eigenspace, and acquiring a second sub-core tensor created corresponding to a condition specified by a second setting from the projection core tensor; first subtensor projection means for projecting an input image to be processed by a first projection computation using the eigenprojection matrix and the first sub-core tensor acquired from the information acquisition means to calculate a coefficient vector in the intermediate eigenspace; and second subtensor projection means for projecting the calculated coefficient vector by a second projection computation using the second sub-core tensor and the eigenprojection matrix acquired from the information acquisition means to generate a change image with an image quality different from the input image.

The features of the second to fifth aspects of the present invention can be arbitrarily combined with the sixth to eighth aspects. The features similar to the second to ninth aspects or steps corresponding to the means can be added to the method inventions of the tenth to thirteenth aspects and the program inventions of the fourteenth to seventeenth aspects.

The invention according to the first to seventeenth aspects targets image data and provides a technique of converting an image of a first image quality to an image of second image quality. However, the processing technique of image data can also be applied to image recognition (for example, personal authentication) other than the image quality conversion and can be applied to a processing technique targeting not only images, but also various data (for example, speech recognition, language processing, living body information processing, and natural/physical information processing).

An eighteenth aspect of the present invention provides a data processing device characterized by including: eigenprojection matrix generation means for generating, from a studying data group, an eigenprojection matrix by a projection computation u0073using a local relationship; projection core tensor creation means for creating, from the studying data group and the generated eigenprojection matrix, a projection tensor using locality; and storage means for storing the eigenprojection matrix generated by the eigenprojection matrix generation means and the projection core tensor created by the projection core tensor creation means.

A nineteenth aspect of the present invention provides a data processing method characterized by including: an eigenprojection matrix generation step of generating, from a studying data group, an eigenprojection matrix by a projection computation using a local relationship; a projection core tensor creation step of creating, from the studying data group and the generated eigenprojection matrix, a projection tensor using locality; and a storage step of storing, in storage means, the eigenprojection matrix generated in the eigenprojection matrix generation step and the projection core tensor created in the projection core tensor creation step.

A twentieth aspect of the present invention provides a program characterized by causing a computer to function as: eigenprojection matrix generation means for generating, from a studying data group, an eigenprojection matrix by a projection computation using a local relationship; projection core tensor creation means for creating, from the studying data group and the generated eigenprojection matrix, a projection tensor using locality; and storage means for storing the eigenprojection matrix generated by the eigenprojection matrix generation means and the projection core tensor created by the projection core tensor creation means.

A twenty-first aspect of the present invention provides a data processing device characterized by including: information acquisition means for acquiring an eigenprojection matrix generated, by a projection computation using a local relationship, from a studying data group including a pair of first-condition data and second-condition data with different conditions and acquiring a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and first subtensor projection means for projecting input data to be processed by a first projection computation using the eigenprojection matrix and the first sub-core tensor acquired from the information acquisition means to calculate a coefficient vector in the intermediate eigenspace.

A twenty-second aspect of the present invention provides a data processing method characterized by including: an information acquisition step of acquiring an eigenprojection matrix generated, by a projection computation using a local relationship, from a studying data group including a pair of first-condition data and second-condition data with different conditions and acquiring a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and a first subtensor projection step of projecting input data to be processed by a first projection computation using the eigenprojection matrix and the first sub-core tensor acquired in the information acquisition step to calculate a coefficient vector in the intermediate eigenspace.

A twenty-third aspect of the present invention provides a program characterized by causing a computer to function as: information acquisition means for acquiring an eigenprojection matrix generated, by a projection computation using a local relationship, from a studying data group including a pair of first-condition data and second-condition data with different conditions and acquiring a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and first subtensor projection means for projecting input data to be processed by a first projection computation using the eigenprojection matrix and the first sub-core tensor acquired from the information acquisition means to calculate a coefficient vector in the intermediate eigenspace.

According to the twenty-first to twenty-third aspects, the relationship between the input data and the studying data can be determined based on the positional relationship between the coefficient vector in the intermediate eigenspace calculated by the first subtensor projection means and the studying data in the intermediate eigenspace. Providing the determination means (step) allows personal authentication based on image recognition, personal authentication based on speech recognition, and the like.

The twenty-first to twenty-third aspects can also include second subtensor projection means (step) for acquiring, from the information acquisition means (step), a second sub-core tensor created corresponding to a condition specified by a second setting from the projection core tensor and projecting the coefficient vector in the intermediate eigenspace calculated by the first subtensor projection means by a second projection computation using the second sub-core tensor and the eigenprojection matrix to generate change data in a condition different from the input data.

An example of an application to personal authentication based on face images will be described in relation to the eighteenth to twenty-third aspects. Although there may be a plurality of conditions (one or more conditions in general), such as to the front, to the left, and to the right, in relation to the direction of the face in the personal authentication based on face images, there is a property that the projection results substantially gather into one point on a common second eigenspace (i.e. "intermediate eigenspace" such as a persona difference eigenspace) as a result of projection on the second eigenspace from a first eigenspace (i.e. pixel eigenspace) by preserving the locality through a modality of "direction" with one or more conditions, regardless of the direction in the input image if the person is the same person. In this way, projection from the first eigenspace to the second eigenspace is possible while preserving the locality. Therefore, the condition for determining the positional relationship ("closeness") between the studying samples and the input samples does not have to be prepared for each condition of direction (to the front, to the left, to the right, . . . ) on the second eigenspace, and one or more conditions can be accurately handled by a single standard.

A twenty-fourth aspect of the present invention provides a recording medium recording the program according to any one of the fourteenth to seventeenth, twentieth, and twenty-third aspects.

Advantageous Effects of Invention

According to the image processing device and method, the program, and the recording medium according to the present invention, the image conversion is performed through one of the eigenspaces of the projection using the local relationship. Therefore, based on the property of the projection using locality, an arbitrary input image vector can be expressed as a highly linear interpolation point for the sample vector group of the studying image on the intermediate eigenspace.

The projection using locality can define the projection relationship that can secure high reproducibility while reducing the number of dimensions.

This can realize robust and highly accurate image conversion and respond to requests for reducing the dimensions to reduce the processing load, speed up the process, and suppress the memory size.

According to the data processing device and method, the program, and the recording medium of the present invention, projection from a first eigenspace with one or more conditions to a common second eigenspace (intermediate eigenspace) with the locality being preserved is possible. Therefore, an advantageous effect that one or more conditions can be accurately handled by a single standard can be obtained on the second eigenspace (intermediate eigenspace). As a result, a robust process can be executed highly accurately. The process can be speeded up, and the memory size can be suppressed.

BRIEF DESCRIPTION OF DRAWINGS

FIG. 7A is a conceptual diagram of projection based on principal component analysis (PCA);

FIG. 7B is a conceptual diagram of projection based on singular value decomposition (SVD);

FIG. 8 is a conceptual diagram illustrating an advantageous effect of redundancy elimination by studying set representative value formation;

FIG. 12 is a block diagram illustrating a configuration of the image processing device according to another embodiment of the present invention;

FIG. 23 is a diagram illustrating an example of parameters stored in a parameter storage unit 1010 in FIG. 22 in a table format;

DESCRIPTION OF EMBODIMENTS

Figure 1:
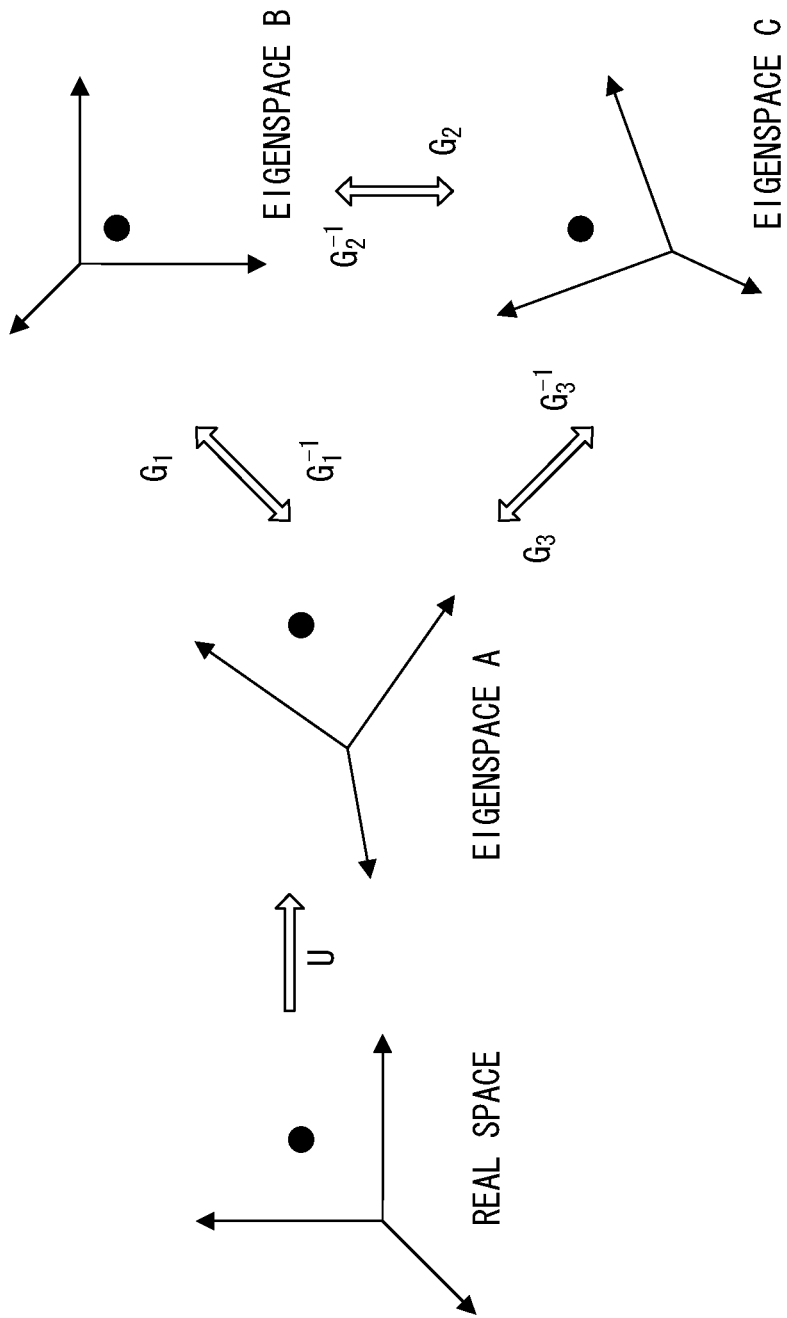
FIG. 1 is a conceptual diagram of tensor projection.

Hereinafter, embodiments of the present invention will be described in detail with reference to the attached drawings.

Although the present invention can be applied to various applications, a face image of a person is handled here, and an example of restoring a high quality image from a low quality input image will be described.

<Principle of Projection Conversion for Restoring High Quality Face Image from Low Quality Face Image>

First, a principle of projection conversion will be described. In a preparation stage for executing a process of restoring a high quality image from a low quality input image, data of face images of a plurality of people are studied in advance, and a function for defining the conversion relationship is obtained. The process will be called a studying step. A step of using the conversion function obtained in the studying step to obtain a high quality output image from an arbitrary input image (low image quality) will be called a restoration step.

(About Studying Image Set)

First, a studying image group including pairs of low resolution images and high resolution images of faces of a plurality of people (for example, 60 people) is prepared as a studying image set. In the studying image set used here, images with reduced image quality obtained by reducing information under certain conditions, such as by thinning out pixels from high resolution studying images at a certain rate, are used as low resolution studying images. The correspondence between the pairs of the low resolution studying images generated by reducing the information and the corresponding original high resolution studying images (images of the same contents of the same people) is studied in advance to generate conversion functions (tensors defining the projection).

A target image size (the number of pixels) and a gradation indicating the density are not particularly limited. For example, the number of pixels of a high resolution image (hereinafter, may be abbreviated as an "H image") is 64×48 pixels, the number of pixels of a low resolution image (hereinafter, may be abbreviated as an "L image") is 32×24 pixels, and each pixel has 8 bits and a density value (pixel value) of 0 to 255 gradation in the image data in the description.

Combining an input dimension and an output dimension can handle an input space and an output space in the same space (coordinate axis), and this is convenient in the computation. In the studying step of the present example, the studying data of the L image is used by applying an enlargement process by an arbitrary method to conform to the number of pixels of the H image. The correspondence of the pixels (positional relationship) between the L image and the H image with the matched number of pixels is determined one to one. The images have the same dimension numbers and can be handled as points (coefficient vectors) in the same coordinate space.

Images of a variety of modalities can be included in the studying image set. To simplify the description, it is assumed here that the direction of the face is to the front and the expression of the face is standard emotionless ("normal"). In the present example, one image is divided into a grid area by area with a predetermined number of pixels (for example, 8×8 pixels), and for the plurality of divided blocks (hereinafter, called "patches"), a computation process is executed patch by patch. More specifically, the number of pixels per patch×the number of patches (the number of divisions) is the total number of processing targets of one image.

An image with 64×48 pixels is divided by the unit (patch) of 8×8 pixels to divide the image into 48 (8×6) patches in the description. However, the patch size, the number of divisions, the format of division, and the like are not particularly limited. A predetermined amount of pixels can be overlapped between adjacent patches in the division of the image, or the process can be executed image by image without dividing the image into patches.

Variations of the modalities in the present embodiment using the studying image set and dimension numbers of the modalities are put together in the following table (Table 1).

TABLE 1

| Modality Number | Modality | Dimension Number |
| --- | --- | --- |
| No. 1 | Pixel Value | 8 × 8 |
| No. 2 | Resolution | 2 |
| No. 3 | Patch Position | 48 |
| No. 4 | Personal Difference | 60 |

The arrangement is not limited to the example of Table 1, and the number of modalities can be further increased. In this way, various modalities can be added, such as the direction of the face can include ten patterns with the direction changed in ten stages in a range of "to the right-to the front-to the left", the expression of the face can include four patterns of normal, smiling, angry, and shouting expressions, and the direction of illumination can include five patterns with the direction changed in five stages by 45 degrees in a range of "directly horizontal to the right-to the front-directly horizontal to the left" (see Table 2).

TABLE 2

| Modality Number | Modality | Dimension Number |
| --- | --- | --- |
| No. 1 | Pixel | 8 × 8 |
| No. 2 | Resolution | 2 |
| No. 3 | Patch Position | 48 |
| No. 4 | Personal Difference | 60 |
| No. 5 | Face Direction | 10 |
| No. 6 | Expression | 4 |
| No. 7 | Illumination Direction | 5 |

Obviously, Tables 1 and 2 are just examples, and other modalities, such as race, sex, and age, may be added, or the modalities may be replaced by other modalities.

The number of types of the modalities is equivalent to the order of a core tensor G defining a projection relationship described later (fourth-order tensor in the case of Table 1), and the product of the dimension numbers of the modalities is the number of components of the core tensor G. In the case of Table 1, the number of components (size) of the core tensor G is 8×8×2×48×60.

The order of the core tensor is seven in the case of Table 2, and the number of components is 8×8×2×48×60×10×4×5. In this way, the order of the tensor increases when the modalities are added, and the number of components of the tensor rapidly increases based on the product of the dimension numbers. Therefore, it is desirable to moderately reduce the dimensions (of the modalities) from the viewpoint of controlling the increase in the memory and reducing the processing time (processing load reduction). The present embodiment provides means that can attain high restoration characteristics while controlling the increase in the memory and reducing the processing time by reducing the dimensions.

(Description of Tensor Projection)

FIG. 1 is a conceptual diagram of tensor projection. Although the description is based on a three-dimensional space for the convenience of the illustration, the space can be expanded to arbitrary finite dimensions (N dimensions). The tensor projection allows transition from a real space R to an eigenspace (also called "feature space") A and allows transition (projection) between a plurality of eigenspaces A, B, and C.

In FIG. 1, the projection relationship from the real space R to the eigenspace A is indicated by a tensor U, and the projection relationship between the eigenspaces A and B is indicated by a tensor $G_1$ or $G_1^{-1}$. Similarly, the projection relationship between the eigenspaces B and C is indicated by a tensor $G_2$ or $G_2^{-1}$, and the projection relationship between the eigenspaces C and A is indicated by a tensor $G_3$ or $G_3^{-1}$. In this way, a conversion route (projection route) rotating a plurality of eigenspaces can be designed, and data can be handled in various spaces.

Figure 2:
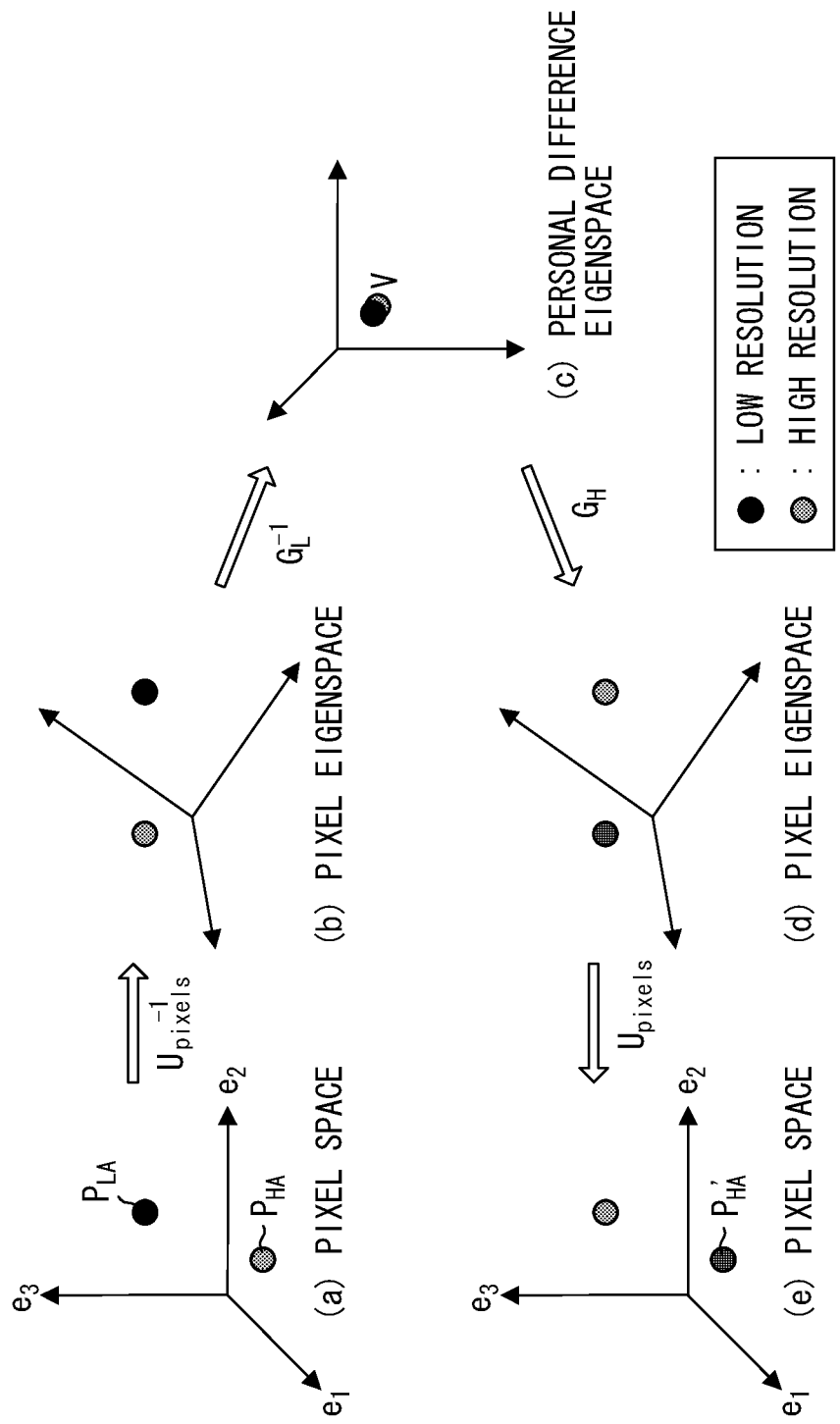
FIG. 2 is an explanatory diagram of a principle of applying the tensor projection to super-resolution image conversion.

FIG. 2 illustrates a principle of applying the tensor projection to super-resolution image conversion.

An example of FIG. 2 uses a projection between a pixel real space, a pixel eigenspace, and a personal difference eigen (person feature) space to schematize a process of converting (reconstructing) a low resolution image to a high resolution image.

Numeric values (pixel values) indicating the densities are provided to the pixels in the image data, and a coefficient vector in a multidimensional space based on an axis indicating the density value (pixel value) can be recognized at each pixel position. Considering a three-dimensional model as in FIG. 2 for the convenience of the description, for example, low resolution face image data of Person A is plotted as a point $P_{LA}$ on the pixel real space. More specifically, a coefficient vector $(x_1, x_2, x_3)$ of the low resolution face image data of Person A has a value $(x_1)$ of 0 to 255 on the axis of a first base component $e_1$, and similarly, has values $(x_2)$ and $(x_3)$ of 0 to 255 on the axis of a second base component $e_2$ and the axis of a third base component $e_3$, respectively. Therefore, the image data is indicated as the point $P_{LA}$ on the pixel real space. Similarly, high resolution face image data of Person A is plotted as a point $P_{HA}$ on the pixel real space.

An object of the conversion here is to convert a point of a low resolution image (for example, the point $P_{LA}$ of a low resolution image) on the pixel real space to make a transition to a point ($P_{HA}'$) of a high resolution image.

In the conversion process, the points are projected from the pixel real space R of FIG. 2(*a*) to the eigenspace A based on a projection function $U_{pixels}^{-1}$ using an eigenprojection matrix $U_{pixels}$ of locality preserving projection (LPP) (FIG. 2(*b*)). The axis (base) of the pixel eigenspace A corresponds to a feature axis (eigenvector) of LPP, and the LPP projection can be recognized as a rotation of a coordinate system that converts the axis of the pixel real space R to the axis of the pixel eigenspace A.

The points are further moved from the pixel eigenspace A to the personal difference eigen (person feature) space B (FIG. 2(*c*)). A function defining the correspondence between the low resolution image and the personal difference eigenspace is used as a projection function $G_L^{-1}$. As illustrated in FIG. 2(*c*), the point of the low resolution image and the point of the high resolution image of the same person can be plotted at substantially the same position in the personal difference eigenspace. Using this property, a projection function $G_H$ defining the correspondence between the high resolution image and the personal difference eigenspace is used to restore the pixel eigenspace A from the personal difference eigenspace.

As illustrated in FIG. 2(*d*), after restoring the pixel eigenspace A by $G_H$ that is a different function from $G_L$, the pixel real space A is further restored based on a projection function $U_{pixels}$ using the LPP eigenprojection matrix (FIG. 2(*e*)). In this way, the substantial conformity between the L image point and the H image point in the personal difference space can be used to convert the L image to the H image through the route (c)→(d)→(e) of FIG. 2.

More specifically, assuming that V is a personal difference eigenspace coefficient vector in the personal difference eigenspace of FIG. 2(*c*), a high resolution pixel vector H in the pixel real space can be obtained by the following formula $$H = U_{pixels} G_H V \qquad \text{[Expression 1]}$$

Meanwhile, a low resolution pixel vector L in the pixel real space is also as in the following formula.

$$L = U_{pixels} G_L V \qquad \text{[Expression 2]}$$

Therefore, to reconstruct the pixel eigenspace→the pixel real space through the pixel eigenspace→the personal difference eigenspace from the low resolution image (low resolution pixel vector L) of the pixel real space to obtain the high resolution image in the pixel real space, the conversion is possible based on the projection of the following formula.

$$H = U_{pixels} G_H V = U_{pixels} G_H (U_{pixels} G_L)^{-1} L \qquad \text{[Expression 3]}$$

In the present embodiment, the projection function ($U_{pixels}$) is obtained from the studying image set including a pair group of low resolution images and high resolution images using the locality preserving projection (LPP), and based on this, the projection functions $G_L$ and $G_H$ are obtained so that the L image point and the H image point of the same person substantially match on the personal difference space.

A low resolution image can be accurately converted to a high resolution image based on the obtained projection functions ($U_{pixels}$, $G_L$, $G_H$) and the framework of the projection route illustrated in FIG. 2.

<Outline of LPP Projection>

The following is an outline of a computation procedure of the LPP projection.

(Procedure 1): obtain a similarity matrix: S indicating whether the studying samples (round-robin) are similar.

(Procedure 2): obtain Σ of each line of the similarity matrix S to obtain a diagonal matrix: D.

(Procedure 3): obtain a Laplacian matrix: L=D−S.

(Procedure 4): solve the following general eigenvalue problem.

$$X \cdot L \cdot X^T \cdot u = \lambda \cdot X \cdot D \cdot X^T \cdot u$$

For example, [1] Cholesky decomposition or [2] general eigenvalue problem is converted to an eigenvalue problem based on inverse matrix calculation to solve the problem.

(Procedure 5): sort eigenvectors u corresponding to eigenvalues in the ascending order of eigenvalues λ to obtain an LPP projection matrix: U.

<Summary of Process>

Figure 3:
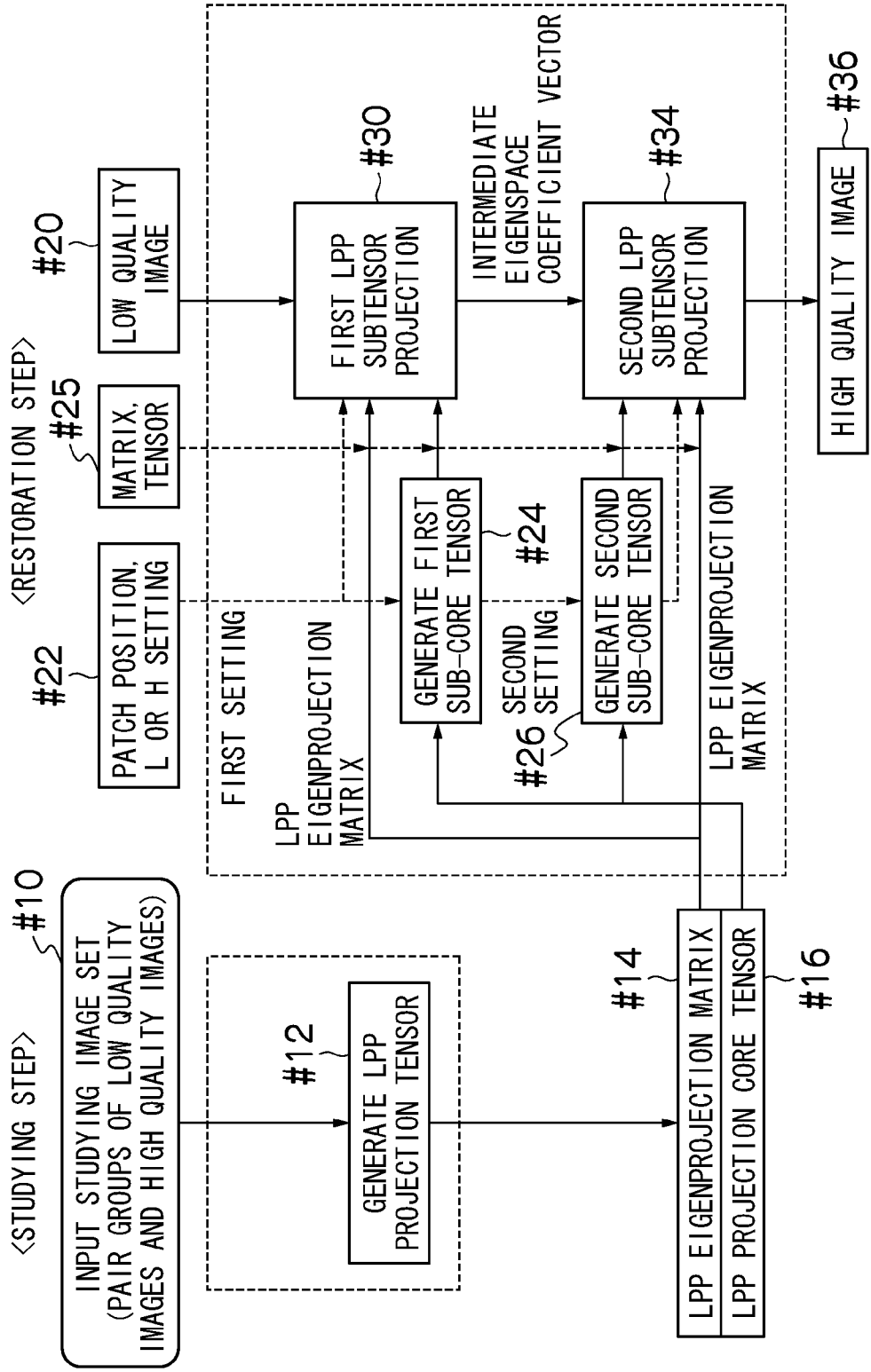
FIG. 3 is a block chart illustrating a summary of a process in an image processing device according to an embodiment of the present invention.

FIG. 3 is a block chart illustrating a summary of a process in an embodiment of the present invention. As illustrated, the process according to the present embodiment can be roughly divided into a studying step and a restoration step.

In the studying step, a studying image group (input studying image set) including pairs of low quality images and high quality images is input (#10), and a process of applying the locality preserving projection (LPP) to the image group to generate a LPP projection tensor (#12) is executed.

In the LPP projection tensor generation step (#12), an LPP eigenprojection matrix (#14) is generated, and an LPP projection core tensor (#16) defining the correspondence between the low quality images and an intermediate eigenspace ("personal difference eigenspace" here) and the correspondence between the high quality images and the intermediate eigenspace is generated.

The LPP converts the coordinates to preserve the closeness of local values of samples (information of geometric distance of neighborhood values) in the original space (real space of pixels here), and the coordinate axis is determined to embed neighborhood samples in the original space to the neighborhood in the projected space (eigenspace).

For example, in the studying image set of Table 1, H images and L images of 60 people are plotted in the real space of pixel at each patch position, and the LPP is applied to the distribution of 120 points to obtain a feature axis focusing on the points with close values (points with similar changes) in the distribution.

In this way, an LPP eigenprojection matrix $U_j=\{U_1, U_2, U_3, \ldots, U_{48}\}$ corresponding to the dimensions (48 dimensions in the case of Table 1) of the patch positions is obtained.

The LPP eigenprojection matrix is used to generate an LPP projection core tensor G including the correspondence between the L images and the personal difference eigenspace (tensor $GL_j=\{GL_1, GL_2, GL_3, \ldots GL_{48}\}$) and the correspondence between the H images and the personal difference eigenspace (tensor $GH_j=\{GH_1, GH_2, GH_3, \ldots GH_{48}\}$).

More specifically, the eigenprojection matrix U is obtained from the viewpoint of the modalities, such as pixels, resolutions, and patch positions, and the U is used to obtain projection core tensor G components. The set of the components is obtained as the projection core tensor G.

In the LPP, the alignment (arrangement) of the feature axes is determined in ascending order of the eigenvalues. The dimensions are reduced by using only highly influential higher-level feature axes, and the size of the core tensor can be significantly reduced.

In the process of the calculation, all eigenprojection matrices U including less influential matrices are calculated. When the matrices are actually used in the restoration process, less influential matrices are not used, and some of the highly influential matrices can be used for the restoration. The execution of moderate dimension compression of the feature axes can set the size of the projection core tensor to an appropriate size.

Meanwhile, in the restoration step, a low quality image as a conversion source is input (#20), and information for specifying the patch position to be processed and information for setting a distinction between the L image and the H image are provided (#22).

A first sub-core tensor corresponding to an L setting as a first setting ($GL_S=\{GL_1, GL_2, GL_3, \ldots GL_{48}\}$ in the above example in Table 1) is generated (#24) from the LPP projection core tensor G (#16) generated in the studying step, and a second sub-core tensor corresponding to an H setting as a second setting ($GH_j=\{GH_1, GH_2, GH_3, \ldots GH_{48}\}$ in the above example in Table 1) is generated (#26).

The LPP projection core tensor (#16) is created based on all eigenvectors corresponding to the modalities and is a set including the projection components related to all modalities. Therefore, components to be used in the restoration process need to be extracted from the tensor components. For example, a condition of using an eigenspace of "personal difference" as an intermediate eigenspace in the projection route described in FIG. 2 (space at a turning point of the projection route) can be determined to extract sub-core tensors GL and GH corresponding to the condition. In this way, the step to the generation of the sub-core tensors to be actually used may be included in the "studying step".

The LPP eigenprojection matrix and the first sub-core tensor are used to project (#30) the data of the input low quality image (#20) to calculate an intermediate eigenspace coefficient vector. The first LPP subten0073or projection step (#30) is equivalent to the projection of the route described in (a)→(b)→(c) of FIG. 2.

The second sub-core tensor and the LPP eigenprojection matrix are used to project the obtained intermediate eigenspace coefficient vector (#34) to obtain a high quality image (#36). The LPP second subtensor projection step (#34) is equivalent to the projection of the route described in (c)→(d)→(e) of FIG. 2.

The processes of the first LPP subtensor projection step (#30) and the second LPP subtensor projection step (#34) in the restoration step are performed patch by patch based on the information of the patch positions. As illustrated in FIG. 3, information for designating a distinction of whether the projection function is a matrix or a tensor (#25) is provided in the computation of the projection steps, and the projection process using the LPP eigenprojection matrix and the projection process using the sub-core tensor are switched according to the information.

The step of inputting the input studying image set in FIG. 3 (#10) and the means for acquiring the information for importing the data are equivalent to "studying image acquisition means (step)". The step of generating the LPP projection tensor (#12) and the computation means are equivalent to "eigenprojection matrix generation means (step)" and "projection core tensor creation means (step)".

The step of generating the first sub-core tensor (#24) and the computation means are equivalent to "first sub-core tensor creation means (step)", and the step of generating the second sub-core tensor (#26) and the computation means are equivalent to "second sub-core tensor creation means (step)".

The low quality image to be processed (#20) is equivalent to an "input image" and "input data", and the high quality image (#36) obtained in the second LPP subtensor projection (#34) is equivalent to a "change image" and "change data". When the process is executed patch by patch based on the patch division, the patch-by-patch images can be interpreted as the "input image", the "input data", the "change image", and the "change data".

The step of first LPP subtensor projection (#30) and the computation means are equivalent to "first subtensor projection means (step)", and the step of second LPP subtensor projection (#34) and the computation means are equivalent to "second subtensor projection means (step)".

<About Advantage of Using LPP Projection>

Figure 4:
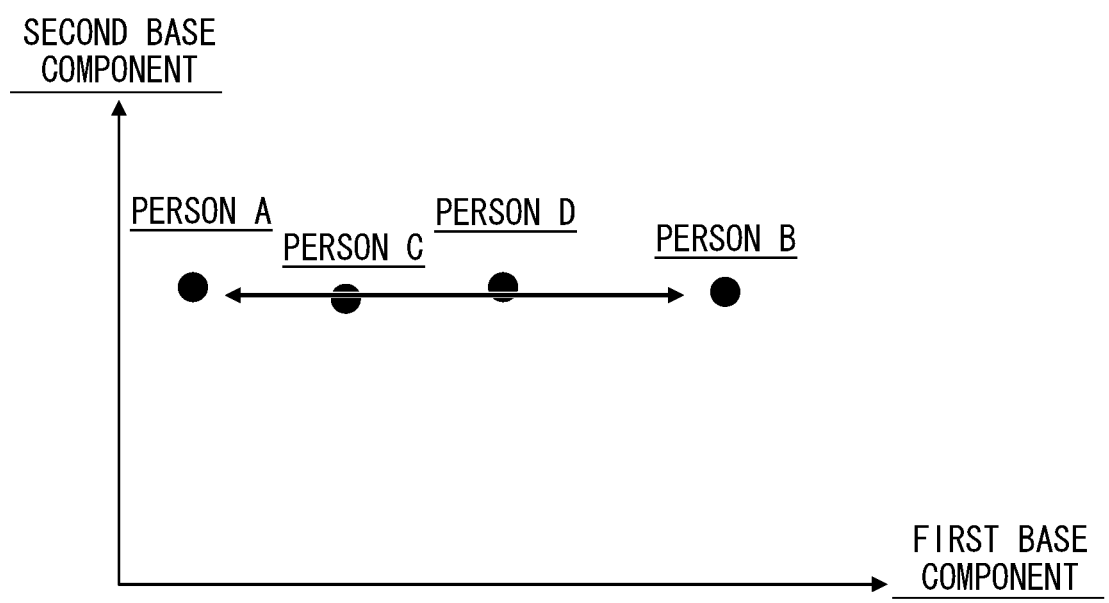
FIG. 4 is an explanatory diagram illustrating a change on an LPP eigenspace (personal difference eigenspace here) with a property close to a linear shape.

FIG. 4 illustrates an example in which a change in the modality (personal difference here) on the LPP eigenspace has a property close to a linear shape. For example, when the studying images of four people, Person A, Person B, Person C, and Person D, are converted by the LPP, the change (change in the personal difference) from Person A to Person B of FIG. 4 is a substantially smooth (continuous) change on the personal difference eigenspace and is close to a linear shape while maintaining the local structure.

In this way, the conversion on the eigenspace of LPP high order singular value decomposition (LPP_HOSVD) (n=2, 3, 4 . . . ) can approximate the change in the element of the modality corresponding to the eigenspace to a linear shape (see FIG. 4), and an arbitrary input image vector is expressed as a highly linear interpolation point relative to the vector group of the studying image sample.

More specifically, an unknown input image other than the studying image sample can be excellently and approximately expressed on the LPP eigenspace using the vector group of the studying image samples. This point is one of the advantages of using the LPP projection conversion system (advantage 1).

Figure 5:
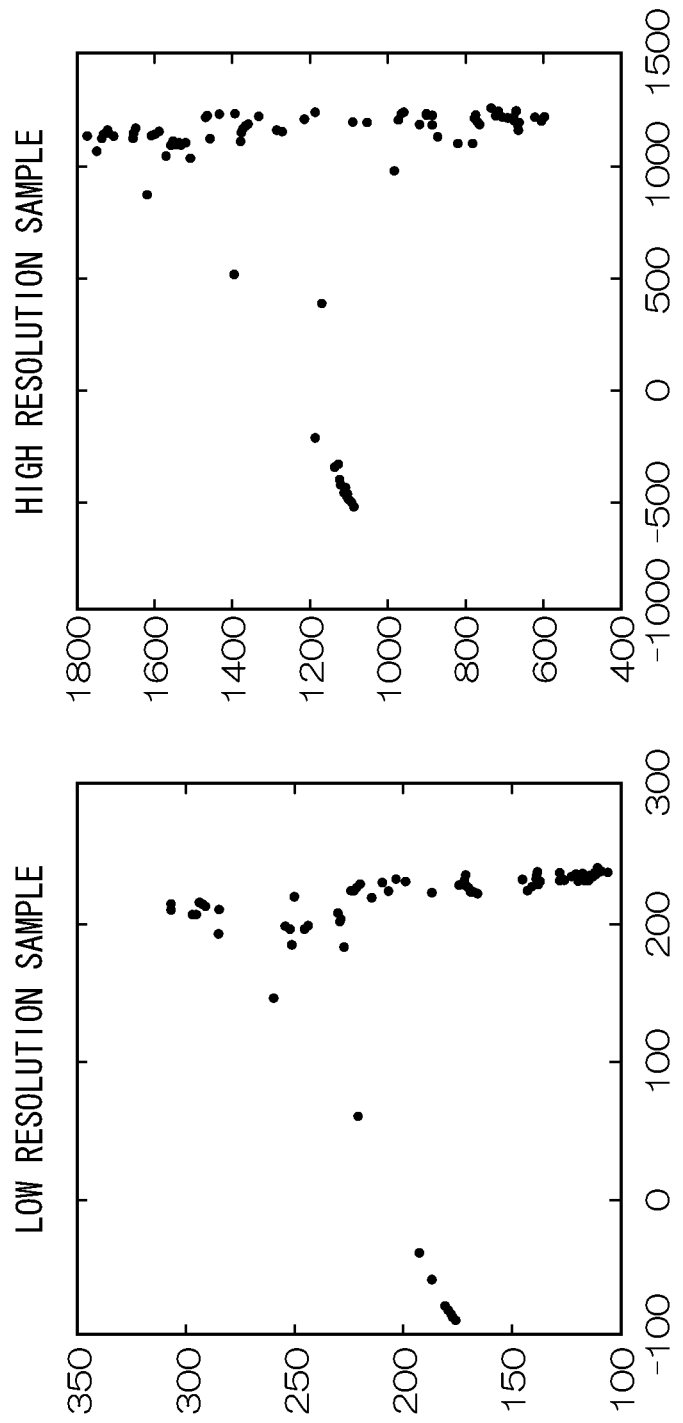
FIG. 5A is an example indicating an LPP projection distribution of a low resolution image sample in a two-dimensional subspace.
FIG. 5B is an example indicating an LPP projection distribution of a high resolution image sample on a two-dimensional subspace.

FIG. 5A indicates an LPP projection distribution of a low resolution image sample on a two-dimensional subspace, and FIG. 5B indicates an LPP projection distribution of a high resolution image sample on a two-dimensional subspace (reference: ZHUANG Yueting, ZHANG Jian, WU Fei, "Hallucinating faces: LPH super-resolution and neighbor reconstruction for residue compensation", Pattern Recogn, Vol. 40, No. 11, Page. 3178-3194 (2007)).

As illustrated in the distributions, it is known that the topology of the low resolution distribution (FIG. 5A) and the topology of the high resolution distribution (FIG. 5B) of the studying image sample vector group on the LPP eigenspace are highly correlated even if the eigenspaces are separately studied and converted.

Using such a property of the LPP to further express the mutual projection relationship between both elements (low resolution and high resolution) of the modality by tensors ($G_L$, $G_H$) of a framework of multilinear projection generates a new advantageous effect (advantage 2) that a highly accurate conversion is possible (error can be reduced).

A synergistic advantageous effect of the advantages 1 and 2 generates a new advantageous effect of further improving the accuracy of the projection relationship. Input conditions are alleviated compared to the conventional techniques, and robustness (strength) is attained (advantage 3).

The conversion on the eigenspace based on the LPP_HOSVD (n=2, 3, 4 . . . ) increases the correlation between the distributions of the studying image group and further reduces the dimensions of the orders (modalities). The process can be speeded up, and the memory can be saved (advantage 4).

<Example of Configuration of Specific Embodiment>

A further practical embodiment including the procedure of the process described in FIG. 3 will be described below.

Figure 6:
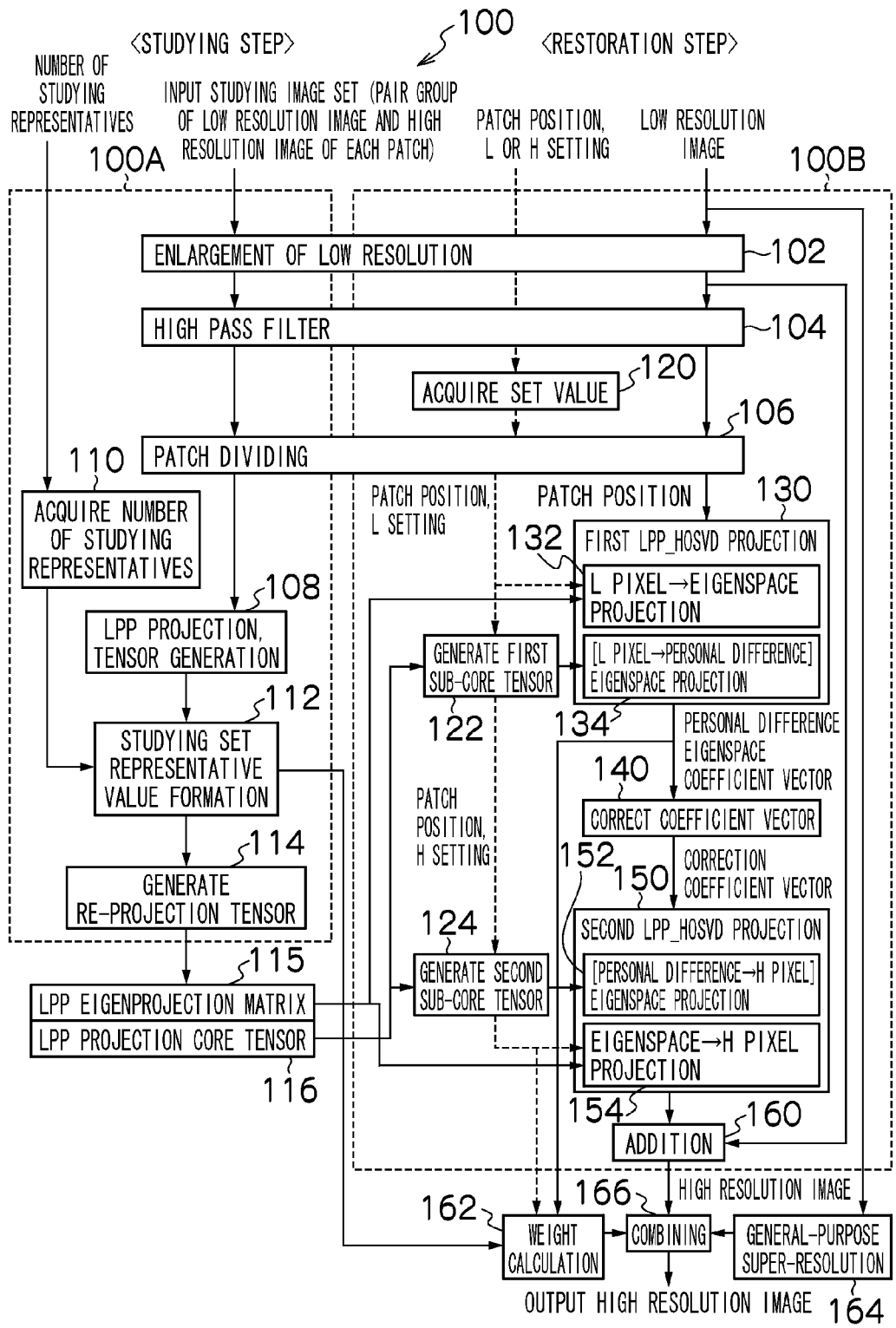
FIG. 6 is a block diagram illustrating a configuration of the image processing device according to the embodiment of the present invention.

FIG. 6 is a block diagram illustrating a configuration of an image processing device 100 according to an embodiment of the present invention. FIG. 6 is divided into the studying step and the restoration step to clarify the correspondence with FIG. 3, and blocks of the processing units contributing to the processes of the steps are illustrated in accordance with the flow of the processes.

As illustrated in FIG. 6, the image processing device 100 includes a low resolution enlargement processing unit 102, a high pass filter 104, a patch dividing unit 106, an LPP projection tensor generation unit 108, a number of studying representatives acquisition unit 110, a studying set representative value formation processing unit 112, a re-projection tensor generation unit 114, a set value acquisition unit 120, a first sub-core tensor generation unit 122, a second sub-core tensor generation unit 124, a first LPP_HOSVD projection processing unit 130, a coefficient vector correction processing unit 140, a second LPP_HOSVD projection processing unit 150, an addition unit 160, a weight calculation unit 162, a general-purpose super-resolution processing unit 164, and a combining unit 166. The means for executing the processes of the processing units are realized by dedicated electronic circuits (hardware), software, or a combination of the circuits and the software.

The first LPP_HOSVD projection processing unit 130 is means for carrying out the process of the projection route described in (a)→(b)→(c) of FIG. 2, and as illustrated in FIG. 6, includes an "L pixel→eigenspace projection unit 132" that projects the L image from the pixel real space to the pixel eigenspace and an "[L pixel→personal difference] eigenspace projection unit 134" that projects the L image from the pixel eigenspace to the personal difference eigenspace. A pixel value in the L image will be called an L pixel, and a pixel value in the H image will be called an H pixel.

The second LPP_HOSVD projection processing unit 150 is means for carrying out the process of the projection route (c)→(d)→(e) of FIG. 2 and includes a "[personal difference→H pixel] eigenspace projection unit 152" that projects the H image from the personal difference eigenspace to the pixel eigenspace and an "eigenspace→H pixel projection unit 154" that performs projection from the pixel eigenspace to the real space.

Contents of the processing units of FIG. 6 will be described below.

(Low Resolution Enlargement Processing Unit)

The low resolution enlargement processing unit 102 executes a process of enlarging an input low resolution image to a predetermined size. The enlargement method is not particularly limited, and various methods, such as bicubic, B spline, bilinear, and nearest neighbor, can be used.

In the studying step, the input low resolution image of the studying image set is enlarged to the number of pixels of the same size as the high resolution image. In the restoration step, the input low resolution image is enlarged to the number of pixels of the same size as the output (in the present example, the same size as the high resolution image of the studying image set). This is to, as described, match the dimension numbers of the input and the output.

(High Pass Filter)

The high pass filter 104 applies filtering for controlling the low-pass to the input image. An unsharp mask, Laplacian, gradient, or the like can be used as the filter. Much of the influence of the illumination change in the face image is in a low frequency range. Therefore, the influence of the illumination change can be removed by suppressing the low-pass by the high pass filter 104, and the robustness to the illumination change can be improved.

The entire eigenspace that can be used in studying can be allocated to the high frequency components by removing the low frequency components from the input image and limiting the processing target of the projection conversion to the high frequency components from the entire frequency range. In the present embodiment that attempts to restore the high resolution output image from the low resolution input image, it is important to mainly restore the high frequency components. In the embodiment of the present invention that applies the tensor projection including the framework of the multilinear projection described in FIG. 2 to the restoration of the high frequency components, providing only the high frequency information as a target of the projection process can obtain a new advantageous effect of simultaneously attaining an advantageous effect that the target can be effectively allocated to the eigenspace (entire dynamic range can be used for processing of the high frequency components in the eigenspace) and an advantageous effect that the influence of the illumination change of the input image can be controlled.

If a modality of "direction of illumination" (illumination change) is added to study a necessary studying image group, a restoration process corresponding to the illumination change is possible based on the same conversion principle as in FIG. 1. However, the size of the tensor increases, and the computation load and the memory capacity increase.

According to the configuration of using the high pass filter 104 as in the present embodiment, there is no addition of the illumination change modality (=no increase in the order of the tensor), and the illumination condition detection process is not necessary. Data collection and processing for studying the restoration projection based on the illumination change are not necessary. Therefore, there is an advantage that the increase in the memory capacity can be prevented, and the processing load does not significantly increase.

It is sufficient if the high frequency component extraction step using the high pass filter 140 (high-pass filter) in the present example at least controls the low frequency components including an illumination change factor, and medium frequency components may be extracted with the high frequency components. More specifically, the high frequency components or the high frequency components and the medium frequency components of the input studying image set are extracted, and the studying image set with controlled low frequency components is obtained.

The same process as the high frequency component extraction step in the studying step is executed in the restoration step. For example, a process of extracting, from the input image, the same frequency components as the frequency components extracted in the studying image set is executed. More specifically, in the high frequency component extraction step of the restoration step, the same frequency components as the studying image set that is a basis of the eigen-projection matrix and the projection core tensor are extracted.

According to the present embodiment, highly accurate and highly robust restoration with fewer studying samples can be expected from a synergetic effect of the high pass filter 104 and the LPP_HOSVD projection.

As described, although the process of extracting the high frequency components is illustrated in the present example as an example of controlling the low frequency components including the illumination change factor, the medium frequency components may be extracted with the high frequency components.

In the present example, although the image processing for removing the image quality degradation factor of the restoration image due to the illumination change included in the low frequency components in the input image and the output image is described, the image processing method can be applied to factors other than the illumination change.

For example, a medium frequency area of the input image can be controlled for an image quality degradation factor included in the medium frequency area, and a high image quality formation process (for example, enlargement process) based on a system different from the tensor projection can be used for the medium frequency area. High image quality processing based on the tensor projection system can be used for other frequency areas, and two images generated by the high image quality processing can be added. In this way, an image quality degradation factor in a predetermined frequency area can be removed from the output image.

(Patch Dividing Unit)

The patch dividing unit 106 divides the inputted image into a grid. In the present example, a "box (block)" of one divided section will be called a "patch". The image processing is executed patch by patch in the studying step and the restoration step. The execution of the process patch by patch to limit the processing target to a part of the image can handle the projection target in a low dimension, and high image quality and robustness for the change in the personal difference can be attained. Therefore, the configuration including the means for the patch division is a preferable mode in the implementation of the present invention.

(LPP Projection Tensor Generation Unit)

The LPP projection tensor generation unit 108 applies the locality preserving projection (LPP) to generate an LPP projection tensor from the input studying image set (pair groups of the low resolution images and the high resolution images) for which preprocessing, such as the low resolution enlargement, the high pass filtering, and the patch division, is finished.

The LPP converts the coordinates to preserve the closeness of a local value of a sample (information of a geometric distance of a neighborhood value) in the original linear space (the real space of pixels here) and determines the coordinate axis to embed a neighborhood sample in the original space to the neighborhood in the projected space (eigenspace).

More specifically, when the preprocessed input studying image set is provided, the LPP first generates the LPP eigen-projection matrix $U_{pixels}$ based on the set and then generates the LPP projection core tensor G as in the singular value decomposition (SVD).

More specifically, a matrix M indicating the images of the studying image set is decomposed to $M=U_1 \Sigma U_2$. Since the matrices $U_1$ and $U_2$ are already obtained as the LPP eigen-projection matrices, E (=G) is obtained from the matrix computation.

In the principle of "LPP locality preserving projection", an axis (feature axis), in which the samples with similar values are close, is obtained. As a result, the local structure is preserved, and the distance between neighborhood sample values is used. A similarity that is large between samples (specimens) with close values and that is small between samples with different values is implemented, and the projection for approximating the samples with large similarity is performed. The LPP is used to hold the local closeness to reduce the linear dimensions, and the LPP has features of preserving the local geometry and being able to perform simple projection only by the linear conversion. However, the LPP does not have an orthogonal basis in general. However, an orthogonal LPP is also proposed, and it is desirable to use the orthogonal LPP.

<About Calculation of Orthogonal LPP>

Based on the premise that a diagonal matrix D and a Laplacian matrix L are obtained from the LPP algorithm, an orthogonal LPP projection matrix $W_{OLPP}=\{u_1, \ldots, u_r\}$ is obtained by the following procedure. A dimensional number r is a number smaller than the original dimension number n.

(Step 1): an eigenvector corresponding to a minimum eigenvalue of a matrix $(XDX^t)^{-1}XLX^t$ is set as $u_1$.

(Step 2): A k-th eigenvector is obtained. More specifically, an eigenvector corresponding to a minimum eigenvalue of a matrix $M^{(k)}$ illustrated in [Expression 4] is set as $u_k$.

$$M^{(k)} = \{I - (XDX^t)^{-1}A^{(k-1)}[B^{(k-1)}]^{-1}[A^{(k-1)}]^t\}(XDX^t)^{-1}(XLX^t) \quad \text{[Expression 4]}$$

wherein
$A^{(k-1)} = \{u_1, \ldots, u_{k-1}\}$
$B^{(k-1)} = [A^{(k-1)}]^t(XDX^t)^{-1}A^{(k-1)}$ The computation of step 2 is repeated from k=2 to r (to n if the dimensions are not compressed and to r if the dimensions are compressed) to obtain eigenvectors. In this way, the orthogonal LPP projection matrix $W_{OLPP} = \{u_1, \ldots, u_r\}$ is obtained.

<Comparison with Principal Component Analysis (PCA)>

Compared to the LPP, the principle of the principal component analysis (PCA) is to maximize a global dispersion, and a main object is to hold a global distribution to reduce the linear dimensions. The PCA has features of preserving a global geometry and performing a simple projection based only on the linear conversion and has an orthogonal basis.

As illustrated in FIG. 7A, the PCA only provides a projection function between the real space vector and the eigen (feature) space vector. Meanwhile, as illustrated in FIG. 7B, the singular value decomposition (SVD) also provides a projection function $\Sigma$ between the vector of the eigenspace A and the vector of the eigenspace B in addition to the projection function U between the real space vector and the eigen (feature) space vector. Therefore, the SVD is equivalent to a decomposition expression of the feature vector in the PCA.

A matrix SVD is a method of decomposing an arbitrary matrix M into $M = U\Sigma V^*$. Here, U denotes an output normal orthogonal vector, V denotes an input normal orthogonal vector, $\Sigma$ denotes a diagonal output matrix of $\sigma i$, and $V^*$ denotes an adjoint matrix of V. More specifically, a V projection eigenspace and a U projection eigenspace are uniquely and linearly associated in a relationship of $\sigma i$ ($>0$) times per i. The dimensions of the matrix SVD are increased (the modalities are increased), that is, the tensor is formed, to obtain a tensor SVD (TSVD). The technique described in Non-Patent Literature 1 uses the TSVD.

Meanwhile, the dimensions of the LPP are increased (the modalities are increased) in the LPP_HOSVD (n=2, 3, 4 . . . ) of the present embodiment, and the LPP_HOSVD (n=2, 3, 4 . . . ) is a tensor version of the LPP. Describing an example of the studying image set of Table 1, the H images and the L images of 60 people are plotted at the patch positions on the pixel real space, and the LPP is applied to the distribution of the 120 points to obtain a feature axis focusing on close values (points with similar changes) in the distribution.

However, in the present embodiment, a studying image set including pair groups of low quality images and high quality images of more than 60 people (for example, 200 people) is used in the initial studying stage from the viewpoint of selecting more appropriate 60 people to ultimately determine the projection function from the samples of 60 people.

In this way, a provisional, tentative LPP eigenprojection matrix $U_j = \{U_1, U_2, U_3, \ldots U_{48}\}$ corresponding to the dimensions (48 dimensions in the case of Table 1) of the patch positions is obtained. The tentative LPP eigenprojection matrix is used to generate the tentative projection core tensor G that defines the conversion between the pixel eigenspace and the personal difference eigenspace for the L images and the H images based on the tensor singular value decomposition.

The projection core tensor G includes a sub-core tensor $G_{Lj} = \{G_{L1}, G_{L2}, G_{L3}, \ldots G_{L48}\}$ that associates the pixels (L pixels) of the low resolution image with the personal difference eigenspace and a sub-core tensor $G_{Hj} = \{G_{H1}, G_{H2}, G_{H3}, \ldots G_{H48}\}$ that associates the pixels (H pixels) of the high resolution image with the personal difference eigenspace.

(Number of Studying Representatives Acquisition Unit)

As described, the studying images are narrowed down in the present embodiment to select appropriate samples to determine the projection function. The number of pair groups of the studying images (the number of people of the samples here) to be ultimately used is called the "number of studying representatives", and information of the number of studying representatives is acquired from the outside.

The number of studying representatives acquisition unit 110 of FIG. 6 is means for importing the number of studying representatives from the outside. Examples of the means for acquiring the information of the number of studying representatives include a configuration of acquiring the information from the outside of the device, such as the user operating a predetermined input device (user interface) or the like to input the information, and a configuration of automatically generating the information according to a program in the device.

(Studying Set Representative Value Formation Processing Unit)

The studying set representative value formation processing unit 112 executes a process of obtaining a personal difference eigenspace coefficient vector group from the preprocessed input studying image set (at least one of the low resolution images and the high resolution images). In the process, the same process as the first LPP_HOSVD projection processing unit 130 in the restoration step, that is, a process up to L pixel→eigenspace projection (process of reference numeral 132) and [L pixel→personal difference] eigenspace projection (process of reference numeral 134), is applied to the input studying image set to obtain the coefficient vector of the personal difference eigenspace.

This is equivalent to obtaining the projection points for the personal difference eigenspace in relation to the images of the input studying image set. As a result, the closeness between the sample (specimen) points in the personal difference eigenspace can be recognized.

Based on the distribution of the points in the personal difference eigenspace, N representative personal difference eigenspace coefficient vectors (representative vectors) are obtained according to the number of studying representatives N obtained from the number of studying representatives acquisition unit 110. The representative vectors are obtained using a K-means method, an EM algorithm, a variational Bayes method, a Markov chain Monte Carlo method, or the like. Or a plurality of the systems may be combined. For example, initial candidates can be obtained by the k-means method, and the representative vectors can be ultimately obtained by the EM algorithm to highly accurately obtain the representative vectors in a relatively short time.

As a result of the representative value formation, similar sample points (closely located points in the personal difference eigenspace) are put together (replaced) to the representative vectors. Although the obtained representative vector group on the personal difference eigenspace can be used as it is, a mode of adopting N samples of the closest preprocessed input studying image set for each of the obtained vectors of the representative vector group is preferable. While the representative vectors are combined from the sample points in the former case, the actual sample points are adopted in the latter case. Therefore, a blur caused by combining the representative points can be prevented.

As a result of the representative value formation, similar sample points (closely located points in the personal difference eigenspace) are represented by the representative values, and the redundancy of the studying image set is reduced.

(Re-projection Tensor Generation Unit)

The re-projection tensor generation unit 114 applies the same process as the LPP projection tensor generation unit 108 to the N representative studying image sets obtained in the studying set representative value formation processing unit 112 to generate the LPP eigenprojection matrix and the LPP projection core tensor again. In this way, an LPP eigenprojection matrix ($U_{pixels}$) 115 and an LPP projection core tensor (G) 116 used in the restoration step described later are obtained based on the representative studying image sets.

Although the LPP projection tensor generation unit 108 and the re-projection tensor generation unit 114 are illustrated by separate blocks in FIG. 6, a configuration of using the same processing block to loop the process is also possible.

FIG. 8 is a conceptual diagram schematically illustrating a state of eliminating the redundancy of the studying sets by the process of forming the studying set representative value. To simplify the description, the number of studying samples is "5", and a two-dimensional space is illustrated here. As a result of the process (first time) by the LPP projection tensor generation unit 108, when the face image data of five people of Person A to Person E is distributed as illustrated in FIG. 8 on the personal difference eigenspace, the representative value is formed by Person C for the samples of three people of Person A, Person C, and Person D in a relatively close positional relationship, and the samples of Person A and Person D are eliminated.

Based on the data of three people of Person B, Person C, and Person E, the re-projection tensor generation unit 114 recalculates the LPP eigenprojection matrix $U_{pixels}$ and the LPP projection core tensor G. In this way, the redundancy of the studying image sets is reduced by the process of forming the studying set representative value, and the dimensions of the orders of the projection tensor can be reduced while maintaining the restoration performance and the robustness. This can contribute to the control of the increase in the memory and to the increase in the speed of the process.

The processing units operated in the restoration step will be described.

The low resolution enlargement processing unit 102, the high pass filter 104, and the patch dividing unit 106 described in the studying step of FIG. 6 are also used in the same way for the input image (low quality image) in the restoration step. More specifically, in the restoration step, "L pixel→eigenspace projection" (reference numeral 132), "[L pixel→personal difference] eigenspace projection" (reference numeral 134), "[personal difference→H pixel] eigenspace projection" (reference numeral 152), and "eigenspace→H pixel projection" (reference numeral 154) are performed patch by patch for the high pass components of the input image.

(Set Value Acquisition Unit)

The set value acquisition unit 120 is means for acquiring, from the outside, information of the patch position to be processed and information for designating the setting of L and H and for providing the information to the "first sub-core tensor generation unit 122", the "second sub-core tensor generation unit 124", the "L pixel→eigenspace projection unit 132", and the "eigenspace→H pixel projection unit 154".

Instead of acquiring the information from the outside, the patch positions of the image after the patch division may be provided to the "first sub-core tensor generation unit 122", the "second sub-core tensor generation unit 124", the "L pixel→eigenspace projection unit 132", and the "eigenspace→H pixel projection unit 154" in association with the first sub-core tensor generation unit 122 and the second sub-core tensor generation unit 124.

The means may be performed in the studying step along with the "first sub-core tensor generation unit 122" and the "second sub-core tensor generation unit 124".

(First Sub-Core Tensor Generation Unit)

The first sub-core tensor generation unit 122 provides the patch positions and the conditions of the L setting output from the set value acquisition unit 120 to generate a sub-core tensor $G_L$ for low resolution from the LPP projection core tensor 116 related to the output of the re-projection tensor generation unit 114. The means may be performed in the studying step, and in place of or along with the mode of storing and preserving the LPP projection core tensor 116, the sub-core tensor $G_L$ may be generated, stored, and preserved in the studying step. Although a memory for preserving the sub-core tensor is necessary according to the mode, there is an advantage that the processing time of the restoration step can be reduced.

(L Pixel→Eigenspace Projection Unit)

The "L pixel→eigenspace projection unit 132" in the first LPP_HOSVD projection processing unit 130 obtains the LPP eigenprojection matrix 115 ($U_{pixels}$) based on the patch positions provided from the set value acquisition unit 120 and applies, to the image of the output from the patch dividing unit 106, the process of $U_{pixels}^{-1}$ projection to the pixel eigenspace described in (a)→(b) of FIG. 2. By the way, $U_{pixels}^{-1}$ denotes an inverse matrix of $U_{pixels}$.

([L Pixel→Personal Difference] Eigenspace Projection Unit)

The [L pixel→personal difference] eigenspace projection unit 134 following the "L pixel→eigenspace projection unit 132" in FIG. 6 obtains a corresponding projection tensor $G_L$ from the first sub-core tensor generation unit 122 and applies, to the output of the "L pixel→eigenspace projection unit 132", the process of $G_L^{-1}$ projection to the personal difference eigenspace described in (b)→(c) of FIG. 2 to obtain the personal difference eigenspace coefficient vector.

(Coefficient Vector Correction Processing Unit)

The coefficient vector correction processing unit 140 uses the personal difference eigenspace coefficient vector group of the number of patches obtained by the [L pixel→personal difference] eigenspace projection unit 134 of FIG. 6 to generate a correction coefficient vector group to be provided to the [personal difference→H pixel] eigenspace projection unit 152 of the second LPP_HOSVD projection processing unit 150.

In the correction computation, the features of the tensor projection including a framework of multilinear projection are used. More specifically, when the studied LPP eigenprojection matrix and LPP projection core tensor are used as the features of the tensor projection as described in FIG. 2, the pixel vectors of the patch group obtained by dividing the face image of the same person (for example, face image of Person A) are substantially gathered into one point on the personal difference eigenspace. Therefore, a high mutual correlation between patches can be used based on the conversion on the same order of the tensor space.

The use of the property can determine the presence/absence of partial concealment in the face image (situation that part of the face is hidden by glasses, a mask, an edge of an automatic door, a door, and the like) and can prevent the deterioration in the restoration due to the partial concealment. Hereinafter, some specific examples will be described.

[Example of Restoration as Face in which Concealing Matter is Removed from Concealed Area of Face]

The pixel vector of the patch with the concealing matter is a point at a position away from the area where the pixel vectors of other patches without the concealing matter gather in the personal difference eigenspace. In such a case, the pixel vector of the patch with the concealing matter can be corrected to a vector without the concealing matter (correction coefficient vector).

EXAMPLE A-1-1

Noise of the personal difference eigenspace coefficient vector group (influence of partially concealing matters, such as glasses, a mask, and a door) is removed using a representative value, such as an average value, a median, a maximum value, and a minimum value, of the coefficient vector group of the patch group related to the same person in the personal difference eigenspace as a value of the correction coefficient vector group.

EXAMPLE A-1-2

The noise may be further removed using mainly a representative value, such as an average value, a median, a maximum value, and a minimum value, in a histogram of the coefficient vector group of the patch group in relation to the same person in the personal difference eigenspace, or for example, an average value, a median, a maximum value, or a minimum value targeting the personal difference eigenspace coefficient vector group of a range of dispersion a or a range of $2\sigma$, as a value of the correction coefficient vector group.

[Example of Restoration for Concealing Matter (such as Glasses and Mask) by Detection of Concealed Area]

When an area with a concealing matter is detected, a mode of converting the area by a dedicated tensor is also possible.

EXAMPLE A-2-1

The relative positions of the glasses (horizontally long on the upper side) and the mask (lower center) in the face are mostly recognized in advance. And the representative values of the personal difference eigenspace coefficient vector group of the patches of the areas and the personal difference eigenspace coefficient vector group of the patches of the entire face (or face areas excluding the concealment candidate areas) are compared, and it is detected that the probability that there is no concealment is high if the representative values are similar (if the distance is close). Conversely, it is detected that the probability that there is a concealing matter is high if the distance between the representative values is far.

Figure 9:
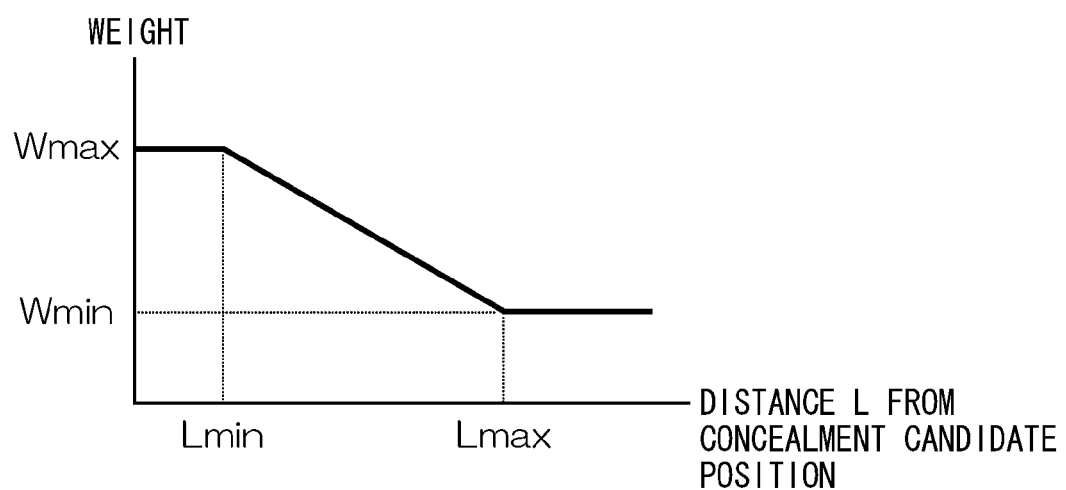
FIG. 9 is a diagram illustrating an example of weights defined in association with the distance from a concealment candidate position.

At the positional boundary of the patch of the area, a weight as illustrated in FIG. 9 or a weight expressed by a function, such as $\alpha/x$, $\alpha/x^2$, and $\exp(-\alpha x)$ (wherein, x denotes a distance from the concealment candidate position), can be added to obtain the representative value.

The uncertainty of the size of the concealing matter is taken into account in the representative value provided with the weight according to the patch position. For example, there are various sizes in the glasses, and the glasses may or may not appear in the adjacent patch depending on the size of the glasses. In terms of the probability, the influence of the glasses is greater in an area closer to the center position of the eyes, and the influence of the glasses is smaller if the distance is farther (toward the periphery). Therefore, the degree of influence of the concealing matter is defined as a function of the distance from the center position of the eyes. Examples of the means for obtaining the weight include a mode of computing the weight from a predetermined function and a mode of using a look-up table (LUT) stored in advance.

If an area with a high probability of the existence of a concealing matter is detected, a restoration based on the system of the present invention (restoration using the tensor projection) targeting the concealing matter (glasses, mask, and the like) is performed for the concealing matter area.

EXAMPLE A-2-2

Although the concealing matter is detected by focusing on the distance from the representative value in the "example A-2-1", the concealing matter can also be detected from the spread of the distribution of the coefficient vector group. More specifically, another example of the example A-2-1 includes a mode of detecting that the probability of the existence of the concealment is high if the distribution of the personal difference eigenspace coefficient vector group of the patch corresponding to the area pertinent to the concealment candidate is spread. The probability of the existence of the concealment may be determined to be high if the distribution of the concealment candidate area is more spread than the distribution in the entire face.

EXAMPLE A-2-3

Another example includes a mode of preliminarily obtaining a correct (image not included in the studying set) distribution shape of the personal difference eigenspace coefficient vector group. In this case, it is detected that the probability that there is no concealment is high if the personal difference eigenspace coefficient vector group is similar to the preliminary distribution shape.

[ (Example of Detecting Concealed Area for Restoration by System Different from the Present Invention]

EXAMPLE A-3-1

A mode of performing the same detection as in the "example A-2-1" for the restoration in the concealing matter area based on another conversion method, such as bicubic and the "general-purpose super-resolution processing unit 164" (see FIG. 6), is also possible.

[ Example of Restoration by Predicting Coefficient Vector of Area Other than Specific Area from Specific Area in Face]

EXAMPLE A-4-1

The high correlation in the personal difference eigenspace may be used for the pixel vectors of the patch group formed by dividing the face image of the same person to obtain a correlation coefficient vector group of the entire face from the personal difference eigenspace coefficient vector group of only the patches of part of the face (for example, areas of eyes, nose, and mouth).

EXAMPLE A-4-1-1

For example, a representative value, such as an average value, a median, a maximum value, and a minimum value, of the personal difference eigenspace coefficient vector group of part of the face is used as a value of the correction coefficient vector group of the entire face.

EXAMPLE A-4-1-2

In place of the "example A-4-1-1", the distribution of the personal difference eigenspace coefficient vector group is obtained for a plurality of patches at the center part of the face. Extrapolation prediction is performed based on the distribution to obtain the correction coefficient vector group of the parts other than the center part. For example, the distribution of the coefficient vector group is obtained for 9 (3×3) patches at the center part of the face, and the coefficient vectors at outer positions of the nine patches are obtained from the distribution based on an extrapolation method (extrapolation).

EXAMPLE A-4-1-3

The distribution of the personal difference eigenspace coefficient vector group is obtained only for the patches thinned out in the horizontal and vertical directions of the face. The distribution is interpolated to obtain the correction coefficient vector group of the patches for which the personal difference eigenspace coefficient vectors are not obtained. For example, the distribution of the coefficient vector group is obtained only for the patch positions of even numbers, and the interpolation is performed to obtain the remaining patches of odd numbers.

According to the "example A-4-1" to "example A-4-1-3", the number of processes of the [L pixel→personal difference] eigenspace projection unit 134 is reduced from the first sub-core tensor generation unit 122 described in FIG. 6, and the processes can be speeded up.

EXAMPLE A-Common-1

Low-pass filtering (for example, average filtering) may be further applied to the correction coefficient vector group of the patches to be processed and the surrounding patches. According to the mode, there is an advantageous effect of spatially smoothing the obtained correction coefficient vector group and removing the noise components. Maximum value, minimum value, or median filtering may be applied in place of the average filtering.

(Second Sub-Core Tensor Generation Unit)

The second sub-core tensor generation unit 124 provides the patch positions of the output of the set value acquisition unit 120 and the conditions of the H setting to generate the sub-core tensor $G_H$ from the LPP projection core tensor 116.

The means may be performed in the studying step in place of the mode of performing the means in the restoration step as in FIG. 6. Generating the sub-core tensor $G_H$ in the studying step can reduce the processing time of the restoration step. However, a memory for preserving the sub-core tensor $G_H$ is necessary.

([Personal Difference→H Pixel] Eigenspace Projection Unit)

The [personal difference→H pixel] eigenspace projection unit 152 obtains $G_H$ from the second sub-core tensor generation unit 124 to perform the $G_H$ projection described in (c)→ (d) of FIG. 2 for the correction coefficient vectors of the output of the coefficient vector correction processing unit 140.

(Eigenspace→H Pixel Projection Unit)

The eigenspace→H pixel projection unit 154 obtains the LPP eigenprojection matrix $U_{pixels}$ based on the patch positions from the set value acquisition unit 120 and applies a process of the $U_{pixels}$ projection described in (d)→(e) of FIG. 2 to the coefficient vectors of the output of the [personal difference→H pixel] eigenspace projection unit 152 to obtain the high resolution image.

(Addition Unit)

The addition unit 160 outputs a sum of the input (restoration information of high frequency components) from the eigenspace→H pixel projection unit 154 and the input (original low resolution enlarged image) from the low resolution enlargement processing unit 102. The addition unit 160 adds and integrates all patches to generate one face image (high resolution image).

According to the image processing illustrated in the present example, an output image, in which information of high frequency areas not included in an input image is restored, can be obtained. More specifically, high frequency components greater than Nyquist frequency components of the image formed by enlarging the input image by the low resolution enlargement processing unit 102 is restored, and the high frequency components are added to the original low resolution enlarged image to obtain the high resolution image.

Figure 10A:
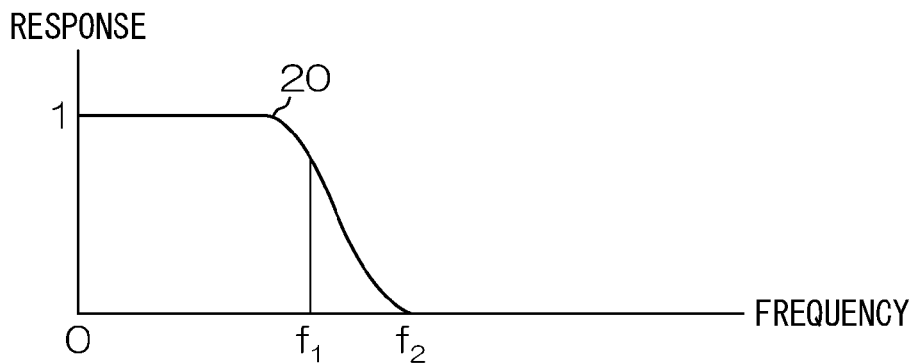
FIG. 10A is a diagram illustrating frequency characteristics of an input image.

Characteristics illustrated by providing reference numeral 20 in FIG. 10A illustrate a relationship (frequency characteristics of input image) between a spatial frequency (frequency) in the input image (equivalent to the "low quality image #20" of FIG. 3) and a response (gain). As illustrated in FIG. 10A, the input image includes a spatial frequency up to $f_2$, and a low frequency area (for example, frequency area below $f_1$) includes an illumination change factor.

Figure 10B:
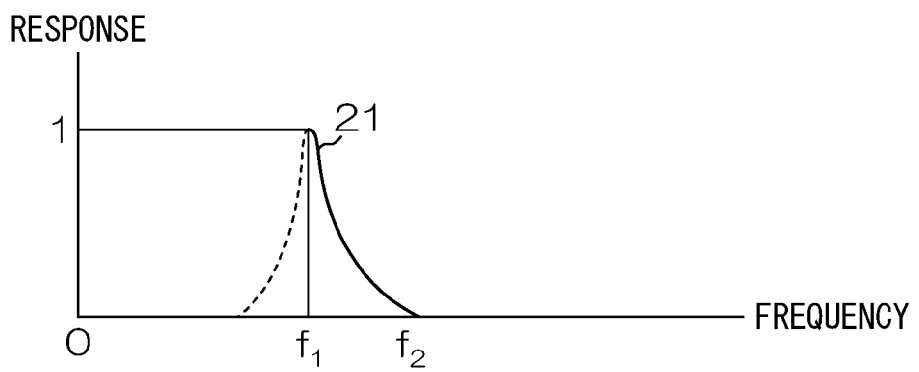
FIG. 10B is a diagram illustrating frequency characteristics of the input image after passing through a high pass filter.

Characteristics illustrated by providing reference numeral 21 in FIG. 10B are frequency characteristics of a low frequency component control image in which the high frequency components are extracted from the input image by the high pass filter 104. A process of cutting the frequency components below $f_1$ is applied to the input image including the frequency characteristics illustrated in FIG. 10A.

When the low frequency component control image including the frequency characteristics illustrated by providing reference numeral 21 to FIG. 10B is generated, the first LPP_HOSVD projection processing unit 130 and the second LPP_HOSVD projection processing unit 150 perform projection computations for the low frequency component control image, and a projection image (high pass restoration image) including higher frequency components not included in the low frequency component control image (high frequency components of the input image) is obtained.

Figure 10C:
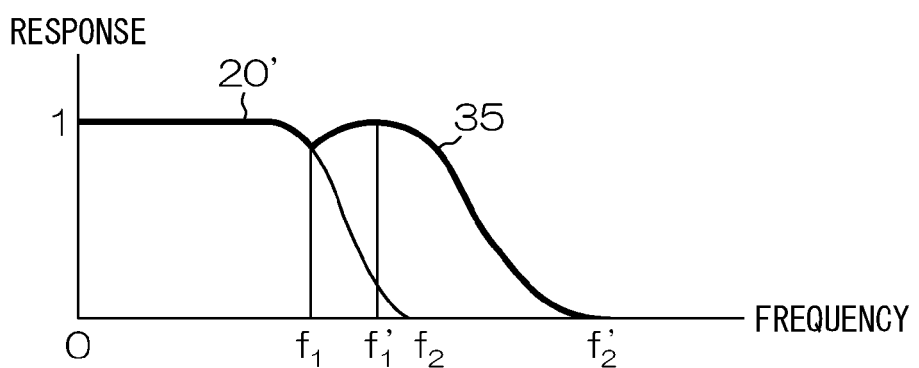
FIG. 10C is a diagram illustrating frequency characteristics of an output image.

The part indicated by reference numeral 35 in FIG. 10C is the part equivalent to the restored projection image. As described in FIG. 6, the low resolution enlargement processing unit 102 generates an enlarged image by applying an enlargement process to the input low resolution image to enlarge the image to a predetermined size (the number of pixels). An example of the frequency characteristics of the enlarged image is as illustrated in FIG. 10C by providing reference numeral 20'.

The addition unit 160 of FIG. 6 executes a process of adding the enlarged image obtained from the low resolution enlargement processing unit 102 and the projection image (high pass resolution image) generated by the tensor projection. As illustrated in FIG. 10C, a high quality restored image (equivalent to the "high quality image #36" of FIG. 3) in a band with a combination of reference numerals 20' and 35 is generated.

As illustrated in FIG. 10C, although the response of the frequency area greater than $f_1$ decreases (restoration characteristics are degraded) in the enlarged image enlarged from the input image (20'), a predetermined response (restoration characteristics) is secured for the frequency area from $f_2$ to $f_2'$ by adding the projection image (35). Therefore, according to the image processing illustrated in the present example, the frequency area from $f_2$ to $f_2'$ not expressed in the input image can be expressed in the restored output image.

In FIG. 10C, $f_1'$ denotes a frequency corresponding to a threshold $f_1$ in the input image, and there is a method of setting the frequency $f_1'$ based on the Nyquist frequency in a sampling theorem. More specifically, using the frequency $f_1$ corresponding to a frequency little lower than the Nyquist frequency as a threshold to apply a high frequency component extraction process to the input image can remove the image quality degradation factor included in the low frequency components of the input image, and a preferable high quality image is restored.

The frequency area extracted in the input image (and the studying image set) may be a so-called cutoff frequency (frequency in which the response is −3 dB) or may be arbitrarily set according to the input image and the output image.

In the addition of the enlarged image formed by the low resolution enlargement processing unit 102 and the projection image obtained by the tensor projection (restored image obtained from the "eigenspace→H pixel projection unit 154"), the restoration information of the high frequency components may be added after applying a predetermined filtering process to the original low resolution enlarged image.

In the addition of the enlarged image formed by the low resolution enlargement processing unit 102 and the projection image obtained by the tensor projection (restored image obtained from the "eigenspace→H pixel projection unit 154"), it is also preferable to add the images after weighting the images using weighting factors determined from the reliability of the projection image as an index.

For example, the projection image can be actively used when the restoration reliability of the high image quality formation process by the tensor projection is high, and the weighting factor can be determined to increase the rate of adopting the enlarged image when the restoration reliability is low. It is more preferable to take the frequency characteristics into account to determine the weighting factor.

Although the high resolution image can be obtained from the addition unit 160 as described above, the weight may be added to reduce the influence of the high resolution image obtained from the "eigenspace→H pixel projection unit 154" when the correction process in the coefficient vector correction processing unit 140 is large.

Hereinafter, an example of a configuration for realizing the process will be described.

Other than the super-resolution processing means (reference numerals 100A and 100B of FIG. 6) using the LPP projection tensor, super-resolution processing means (described as "general-purpose super-resolution processing unit 164" in FIG. 6) based on a different algorithm, the weight calculation unit 162, and the combining unit 166 are included.

(General-Purpose Super-Resolution Processing Unit)

The general-purpose super-resolution processing unit 164 applies super-resolution enlargement to the input low resolution image to enlarge the image to the same size as the output.

Although the enlargement method is not particularly limited, for example, a clustering system (Atkins, C. B.; Bouman, C. A.; Allebach, J. P., "Optimal image scaling using pixel classification", IEEE, Image Processing, 2001. Proceedings. 2001 International Conference on Volume 3, Issue, 2001 Page(s): 864-867 vol. 3) is used.

The clustering system is characterized by adopting a mixed model. Therefore, the super-resolution of a variety of patterns can be handled by combining a plurality of models.

The following mixed Gaussian model is assumed as means for processing.

$$x = \Sigma(Ai \cdot z + Bi) \cdot wi(y - \mu i, \tau i) \qquad \text{[Expression 5]}$$

Wherein, z: low resolution image, x: high resolution image, Ai, Bi, µi, and τi are specified during studying, and a probability wi as a weight is dynamically obtained in the restoration based on a dimension vector y of a difference between an unknown pixel and the surrounding.

Ai, Bi, µi, and τi are obtained, for example, as follows.

The center of gravity of each of 100 classes is obtained by K-means to classify the dimension vector of difference (cluster vector) to create an initial distribution state.

Updates are repeated by an EM algorithm. The likelihood function is maximized by the current conditional probability, and the next conditional probability is obtained. The conditional probability is estimated in an E step. The estimation value of the E step is used to maximize the likelihood function in an M step. The loop computation of the E step and the M step is continued until the output of the likelihood function is stabilized. For example, the studying is performed 10,000 times to study 100,000 pixels in 100 classes (convergence condition is $e^{-10}$).

The enlargement method described in the low resolution enlargement processing unit 102 may be used as another enlargement method in the general-purpose super-resolution processing unit 164. More specifically, the "general-purpose super-resolution process" here is a concept including image processing other than the super-resolution process using the projection tensor, such as an enlargement process of enlarging the size of the low quality image as an input image to the same size as the high quality image.

(Weight Calculation Unit)

The weight calculation unit 162 is means for obtaining a weight w1 used in the combining unit 166 to make an adjustment of increasing and decreasing the rate of adopting the general-purpose super-resolution system by the general-purpose super-resolution processing unit 164 according to a deviation level of the input condition. The weight w1 is determined so that the rate of adopting the general-purpose super-resolution system is reduced if the deviation level of the input condition is low, and the rate of adopting the general-purpose super-resolution system is increased if the deviation level of the input condition is higher.

An example of the calculation method of the weighting factor includes a system of calculating the weighting factor based on the correlation between the coefficient vector in the personal difference eigenspace of the studying image group (representative value is formed by the studying set representative value formation processing unit 112) and the personal difference eigenspace coefficient vector generated for the input image by the first LPP_HOSVD projection processing unit 130.

In this way, both the tensor projection super-resolution process and the super-resolution process by another system are used, and if the deviation level of the input condition is large, the super-resolution process based on the other system is adopted. As a result, a problem of the tensor projection super-resolution process that the restoration characteristics become poor if the deviation level of the input condition is large can be solved, and a high quality image with excellent restoration characteristics can be obtained.

Hereinafter, a specific example of calculation in the weight calculation unit 162 will be described. It is indicated here that based on a formula ([Expression 7]) of the combining unit

166 described later, the smaller the value of the weight w1, the higher the rate of adopting (1−w1) the general-purpose super-resolution system.

EXAMPLE B-1-1

The means of tensor projection super-resolution (reference numerals 100A and 100B of FIG. 6) described above have a feature that the farther the personal difference eigenspace coefficient vector on the personal difference eigenspace from the coefficient vector of the studying set, the poorer the restoration characteristics (feature [1]).

Figure 11A:
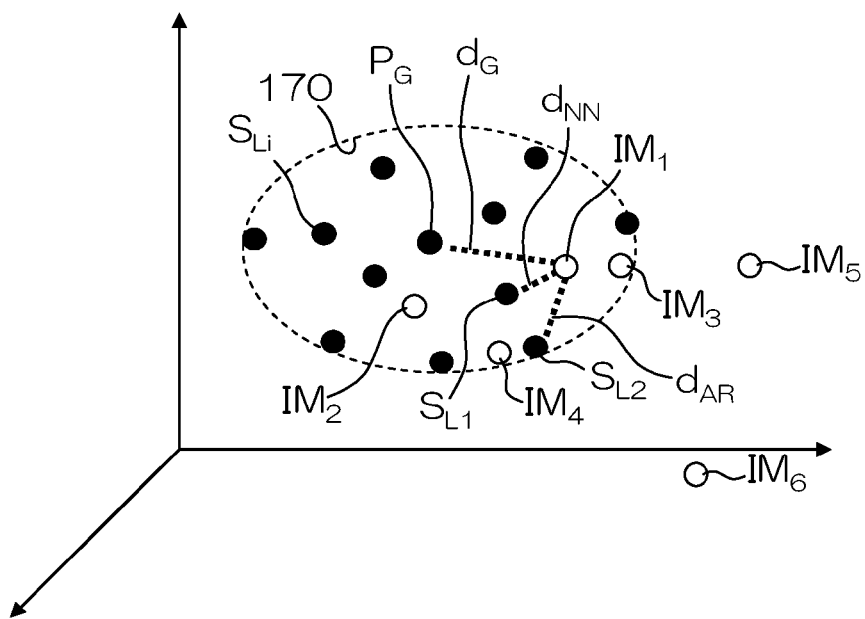
FIG. 11A is a conceptual diagram illustrating a relationship between a studying image vector group and unknown image vectors on a personal difference eigenspace.

FIG. 11A is a conceptual diagram illustrating the feature [1]. FIG. 11A indicates the eigenspace of the tensor in a three-dimensional space and indicates the studying image vectors by dots $SL_1, SL_2 \ldots SL_i$. A periphery of the distribution range of the studying image group is indicated by reference numeral 170, and a center of gravity $P_G$ of the studying image vectors is indicated by a black circle.

Unknown image vectors $IM_1, IM_2 \ldots$ other than the studying image vectors are indicated by white circles.

Distances are determined from the closeness of the unknown image vectors to the studying image vector group, distances from the studying image vectors (nearest neighbor, center of gravity, surrounding boundary point), inside/outside determination of the sample group (class), and the like.

In FIG. 11A, the unknown image vector indicated by $IM_1$ is inside the studying set (sample group), and it is determined that the distance between the studying image sample and the input image is relatively close after comprehensively evaluating a distance dNN from a closet neighbor point (nearest neighbor), a distance dG from the center of gravity $P_G$, and a distance dAR from the surrounding boundary point (for example, evaluation values are calculated by an evaluation function based on a linear combination of the distances).

It is similarly determined for $IM_2$ that the distance from the studying image sample is close. The restoration of the unknown image vectors is significantly excellent.

$IM_3$ and $IM_4$ exist inside the class of the sample group, and the distance is a little farther compared to $IM_1$ and $IM_2$. It can be stated that $IM_3$ and $IM_4$ are in a "relatively close" level. $IM_3$ and $IM_4$ can also be relatively excellently restored.

$IM_5$ and $IM_6$ exist outside of the sample group, and the distance from the studying set is far. The restoration characteristics when the unknown image vectors $IM_5$ and $IM_6$ are restored are low. In this way, excellent restoration is possible if the distance from the leaning set is closer, and there is a tendency that the restoration becomes poor if the distance is farther.

The feature [1] is used to obtain the weight w1 as follows.

The processes up to the "[L pixel→personal difference] eigenspace projection unit 134" of the restoration step are executed for the representative studying set obtained by the studying set representative value formation processing unit 112, and the representative personal difference eigenspace coefficient vector group is obtained in advance.

Figure 11B:
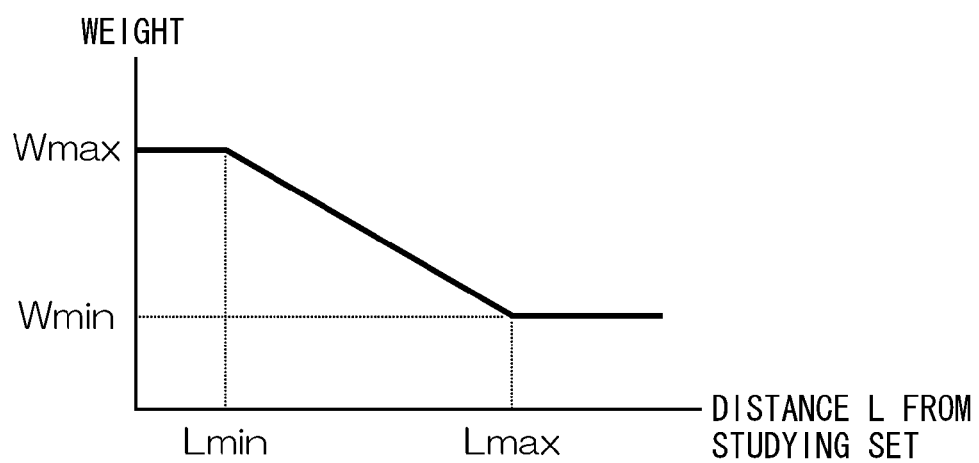
FIG. 11B is a diagram illustrating an example of weights defined in association with the distance from a studying set.

The closest distance between the representative personal difference eigenspace coefficient vector group and the personal difference eigenspace coefficient vectors obtained by the "[L pixel→personal difference] eigenspace projection unit 134" is obtained based on the patch positions from the set value acquisition unit 120, and w1 is obtained based on an LUT as illustrated in FIG. 11B or functions such as $\beta 1/x$, $\beta 1/x^2$, and $\exp(-\beta 1 x)$.

EXAMPLE B-1-2

If the directions of the coefficient vectors of the studying set and the personal difference eigenspace coefficient vectors are similar, w1 is increased.

EXAMPLE B-2-1

The means of tensor projection super-resolution (reference numerals 100A and 100B of FIG. 4) have a feature that the restoration performance is poor if the "distribution including the number of patches as the number of samples" of the personal difference eigenspace coefficient vectors on the personal difference eigenspace is spread (varies) (feature [2]).

The feature [2] is used, and if the spread of the distribution of the distance or the direction between the coefficient vectors of the representative studying set and the personal difference eigenspace coefficient vectors of the patches relative to the patch samples is wide, the weight w1 is reduced. For example, a look-up table indicating the correspondence between the spread of the distribution and the weight w1 may be created in advance, or a function defining the correspondence may be used for the calculation.

According to the mode, when the feature [1] of the tensor projection is used by evaluating the reliability of the method according to the present invention on the personal difference eigenspace of the tensor (person eigenspace of FIG. 2(c)) as compared to the pixel eigenspace of the tensor (image eigenspace of FIG. 2(b)), all patches can be evaluated by the same index (all patches substantially gather into one point), and a new advantageous effect is generated that the spread of the distribution can be evaluated as a reliability scale. Therefore, the weight calculation accuracy improves.

EXAMPLE B-2-2

In the distribution relative to the patch samples of the example "B-2-1", w1 is reduced for the patch samples with a small number of samples (or farther from the representative value). Therefore, the weight is changed according to the frequency on the histogram. In this case, there is an advantageous effect that the weight can be controlled patch by patch.

EXAMPLE B-3

In the distribution relative to the patch samples of the "example B-2-1", the weight may be increased if the shapes of the distributions are similar. For example, the weight is changed depending on whether distribution shapes of the distribution of Person A recognized in the studying step and the distribution of the input image (unknown image) are similar.

EXAMPLE B-Common-1

The following configuration can be commonly adopted for the "example B-1-1", "example B-1-2", "example B-2-1", "example B-2-2", and "example B-3". For example, a correct answer appropriateness determination index of individual patches of each individual (for example, in the face of Person A) relative to the individual representative personal difference vectors as the studying samples will be further considered in the "example B-1-1" or "example B-1-2". The distances of the individual patches from the representative value of the distribution relative to the patch samples are used as the determination index. The patch is handled not suitable for a correct answer if the distance is far from the representative value. Specifically, wp with similar characteristics as FIGS. 11A and 11B, $\beta 2/x$, $\beta 2/x^2$, $\exp(-2x)$, and the like may be obtained, and $w1'=w1 \cdot wp$ may be provided to the combining unit 166.

According to the mode, when the feature [1] of the tensor projection is used by evaluating the reliability of the method according to the present invention on the personal difference eigenspace of the tensor (personal eigenspace of FIG. 2(*c*)) as compared to the pixel eigenspace of the tensor (image eigenspace of FIG. 2(*b*)), all patches can be evaluated by the same index (all patches substantially gather into one point), and a new advantageous effect is generated that the reliability of the studying sample defined in a tentative correct answer can be included in the evaluation. Therefore, the weight calculation accuracy improves.

EXAMPLE B-Common-2

An average, a median, maximum, minimum, and the like may be commonly used as the representative value in the "example B-1-1", "example B-1-2", "example B-2-1", "example B-2-2", and "example B-3".

EXAMPLE B-Common-3

The dispersion, the standard deviation, and the like may be commonly used as the spread (variation) of the distribution in the "example B-1-1", "example B-1-2", "example B-2-1", "example B-2-2", and "example B-3".

EXAMPLE B-Common-4

If the distance between the representative value, such as the center of gravity of the studying set and the surrounding boundary point, and the personal difference eigenspace coefficient vector is close or the directions are similar, w1 is increased. According to the mode, the calculation targets of the distance and the direction can be reduced, and the process can be speeded up.

EXAMPLE B-Common-5

The Euclidean distance, the Mahalanobis distance, the KL distance, and the like can be used in the calculation of the "distance" in the examples.

EXAMPLE B-Common-6

The vector angle, the inner product, the outer product, and the like can be used in the calculation of the "direction" in the examples.

EXAMPLE B-Common-7

The relationship between the distance, the direction, the representative value, the distribution spread, the distribution shape, and a restoration error is defined as a correct answer/wrong answer set in the "studying step" described in FIG. 4. The restoration error denotes a difference between image restored by the projection function obtained from the studying image set and the correct answer image, and for example, the restoration error is indicated by an average square error from the correct answer/wrong answer image or the PNSR (peak signal to noise ratio).

The relationship between at least one of the elements "distance, direction, representative value, distribution spread, and distribution shape" and the "restoration error" and the relationship between the "restoration error" and the "weight w1" are defined in an LUT, a function, and the like.

In the "restoration step", the LUT or the function is used to obtain the "weight w1" from the similarly of at least one of the "distance, direction, representative value, distribution spread, and distribution shape" between the "studying step" and the "restoration step".

A specific method of obtaining the "weight w1" from the similarity of at least one of the "distance, direction, representative value, distribution spread, and distribution shape" will be illustrated below.

<Process in Studying Step>

The relationship between at least one of the "distance, direction, representative value, distribution spread, distribution shape" and the "restoration error" is obtained. For example, "characteristics of distance-restoration error" is obtained. Characteristics with reliable probability proportional to the frequency may be obtained.

<Process in Restoration Step>

The closest "distance, direction, representative value, distribution spread, and distribution shape" in the "studying step" from the "distance, direction, representative value, distribution spread, and distribution shape" obtained in the "restoration step" described in FIG. 6 is selected to obtain a corresponding "restoration error".

Based on the selected "restoration error", the "weight" is obtained from the relationship of the following formula ([Expression 6]). It is assumed here that the smaller the "restoration error", the greater the "weight".

$$\text{Weight } w1=b0+b1 \times (\text{restoration error}) \qquad \text{[Expression 6]}$$

In place of the linear function indicated in [Expression 6], a nonlinear function may be defined to obtain the weight.

EXAMPLE B-Common-8

In the function defining the correlation between at least one of the "distance, direction, representative value, distribution spread, and distribution shape" of the correct answer/wrong answer set on the personal difference eigenspace in the "example B-common-7" and the "weight", the coefficients b0 and b1 of [Expression 5] may be obtained by (regularization) least squares method, multiple regression analysis, SVM (regression), AdaBoost (regression), non-parametric Bayes, maximum likelihood estimation method, EM algorithm, variational Bayes method, Markov chain Monte Carlo method, and the like.

EXAMPLE B-Common-9

In the examples ("example B-1-1" to "example B-common-8"), low-pass (average) filtering may be further applied to the patches to be processed and the weight of the surrounding patches. The mode has an advantageous effect of spatially smoothing the obtained weight and an advantageous effect of removing the noise. The maximum value, the minimum value, and the median filter may also be applied.

The "examples B-common-1 to 9" methods can also be applied to the weight in the coefficient vector correction processing unit 140 described above.

As described, in the configuration of using the image conversion means of another system (means of general-purpose super-resolution here) according to the deviation level of the input image relative to the studying image set (deviation level of input condition), if the representative value of the studying image set is used when using the positional relationship between the coefficient vectors on the eigenspace, there is an advantageous effect that the utilization function of the other system can be effectively functioned.

(Combining Unit)

The combining unit 166 of FIG. 6 combines or selects the image provided from the adding unit 160 (input image 1) and the image provided from the general-purpose super-resolution processing unit 164 (input image 2) according to the following weight obtained in the weight calculation unit 162.

$$\text{Output high resolution image} = \Sigma(wi \cdot Ii) = w1 \cdot I1 + w2 \cdot I2 \quad \text{[Expression 7]}$$

Wherein, w1 denotes the weight w1 of an output I1 of the adding unit 160, and w2 denotes a weight w2=1−w1 of an output I2 of the general-purpose super-resolution processing unit 164.

According to the image processing system with the configuration, a high quality image can be obtained from a low quality input image. A robust high image quality formation process with a wide tolerance for the input condition can be realized.

In addition to the general-purpose super-resolution processing unit 164, one or a plurality of high image quality formation processing units based on another method may be further arranged. The processing units may be selectively used, or the images may be combined by arbitrary weighting.

Meanwhile, the reliability of the super-resolution restoration process may be extremely low depending on the condition of the input image, and there may be a case in which it is desirable to output the image using the information of the original input image instead of outputting the failed image with low reliability. Therefore, a processing unit that simply enlarges the input image may be arranged in place of or in addition to the general-purpose super-resolution processing unit 164, and an image enlarged by the enlargement processing unit (image not subjected to the super-resolution restoration process) may be provided to the combining unit 166.

MODIFIED EXAMPLE1 OF EMODIMENT

FIG. 12 is a block illustrating another embodiment. In FIG. 12, the same or similar elements as in the configuration of FIG. 6 are designated with the same reference numerals, and the description will not be repeated.

The embodiment illustrated in FIG. 12 is a mode of generating a first sub-core tensor 123 and a second sub-core tensor 125 and storing and preserving the tensors in storage means such as a memory in the studying step.

The LPP eigenprojection matrix U and the projection core tensor G (as well as the first sub-core tensor 123 and the second sub-core tensor 125 generated from the matrix and the tensor) can be repeatedly used in the subsequent processes once the matrix and the tensor are created and preserved. Therefore, a mode of forming parameters from the matrix and the tensor for each studying image set and arbitrarily resetting appropriate projection matrix and tensor according to the content of the input image in the restoration step is preferable.

For example, parameters are formed by country or region from projection conversion sets, such as a set of the projection matrix and the tensor generated based on the studying image set of the faces of Japanese and a set of the projection matrix and the tensor generated based on the studying image set of the faces of Westerners, and the parameters are switched and used as necessary.

Alternatively, the set of the projection matrix and the tensor may be switched based not only on the process of the super-resolution restoration of the face image, but also on applications of the process. For example, the studying image set is switched according to an application, such as for endoscopic image and for vehicle image, to generate the LPP eigenprojection matrix U and the projection core tensor G (as well as the first sub-core tensor 123 and the second sub-core tensor 125 generated from the matrix and the tensor), and the generated projection matrix and the tensor are preserved and stored in a non-volatile memory, a magnetic disk, or other storage means. Various image processing is possible with the same algorithm by reading and setting the projection matrix and the tensor according to the application.

MODIFIED EXAMPLE 2 OF EMBODIMENT

Although the configurations that can carry out the studying step and the restoration step by one image processing device are illustrated in FIGS. 6 and 12, the image processing device that carries out the studying step and the image processing device that carries out the restoration step can be separately arranged. In this case, it is desirable that the image processing device that manages the restoration step can acquire information of the separately created projection relationship (eigenprojection matrix and projection tensor) from the outside. A media interface or a communication interface corresponding to an optical disk or other removable storage media can be applied as the information acquisition means.

MODIFIED EXAMPLE 3 OF EMBODIMENT

Although the LPP is illustrated as the projection that uses the local relationship in the embodiment, in place of the LPP, various manifold studying methods can also be applied, such as locally linear embedding (LLE), linear tangent-space alignment (LTSA), Isomap, Laplacian eigenmap (LE), and neighborhood preserving embedding (NPE).

MODIFIED EXAMPLE 4 OF EMBODIMENT

In the embodiment described in FIG. 6, the modalities of the patch and the resolution of the four types of modalities described in Table 1 are handled as known elements to set the conditions to simplify the description, and the projection route from the pixel real space through the pixel eigenspace and the personal difference eigenspace is designed by focusing on the modalities of the "pixel value" and the "personal difference". However, the design of the projection route is not limited to the present example in carrying out the present invention. Various eigenspaces can be selected as the eigenspaces in the projection route according to the modality variations.

MODIFIED EXAMPLE 5 OF EMBODIMENT

The image of the conversion source input to the restoration step may be an image area partially cut out (extracted) from an image at a prestage before the procedure of the processes described in FIGS. 6 and 12. For example, a process of extracting a face part of a person from an original image is executed, and the extracted face image area can be handled as the input image data of the restoration step.

Processing means for executing a combining process of replacing the extracted area by the restored output high resolution image and embedding the image to the original image may be added. In this case, the enlargement magnification is adjusted in accordance with the size of the ultimate output image (or the size of the background to be combined).

<Other Applications>

Applications to various "targets", "modalities", and "image processing" are possible by changing the studying image set as follows. Therefore, the application range of the present invention is not limited to the embodiments described above.

Other than the face, the image as the "target" may be an area including a region of part of a human body, such as head or hands of a person, or a region including at least part of a living body other than the human body. The living body includes specific tissues inside the living body, such as blood vessels in the living body. When the image processing technique of the present invention is applied to an endoscopic system, tumor tissues in the living body may be included in the concept of the "living body", and the tumor tissues may be the "target".

Other than the living body, a card, such as currency and a cash card, a vehicle, and a number plate of a vehicle as well as a text, a drawing, a table, and a photograph of a document scanned by a scanner device such as a copy machine can also be the targets.

The "modality" includes the direction of the subject, the size, the position, the illumination position, and the like. Other examples of the "modality" include the type of the subject, such as race, age, and sex, and the attribute of the subject image, such as the expression of the imaged person, the gesture of the imaged person, the posture of the imaged person, and the wearing material worn by the imaged person. Examples of the wearing material include glasses, sunglasses, a mask, and a hat.

Other than the super-resolution formation, the "image processing" that can apply the present invention includes projection processes, such as a process of reducing aliasing components, multi-color formation, multi-gradation formation, noise reduction, artifact reduction for reducing artifacts such as block noise and mosquito noise, blur reduction, sharpness formation, high frame rate formation, wide dynamic range formation, color gradation correction, distortion aberration correction, and encoding. For example, in the case of the noise reduction, a noise image (equivalent to the "low quality image") and an image without noise (equivalent to the "high quality image") are handled as a pair to study the projection relationship.

The present invention can be applied not only to still images, but also to frame images (or field images) that constitute a video.

<Application to Monitoring System>

Figure 13:
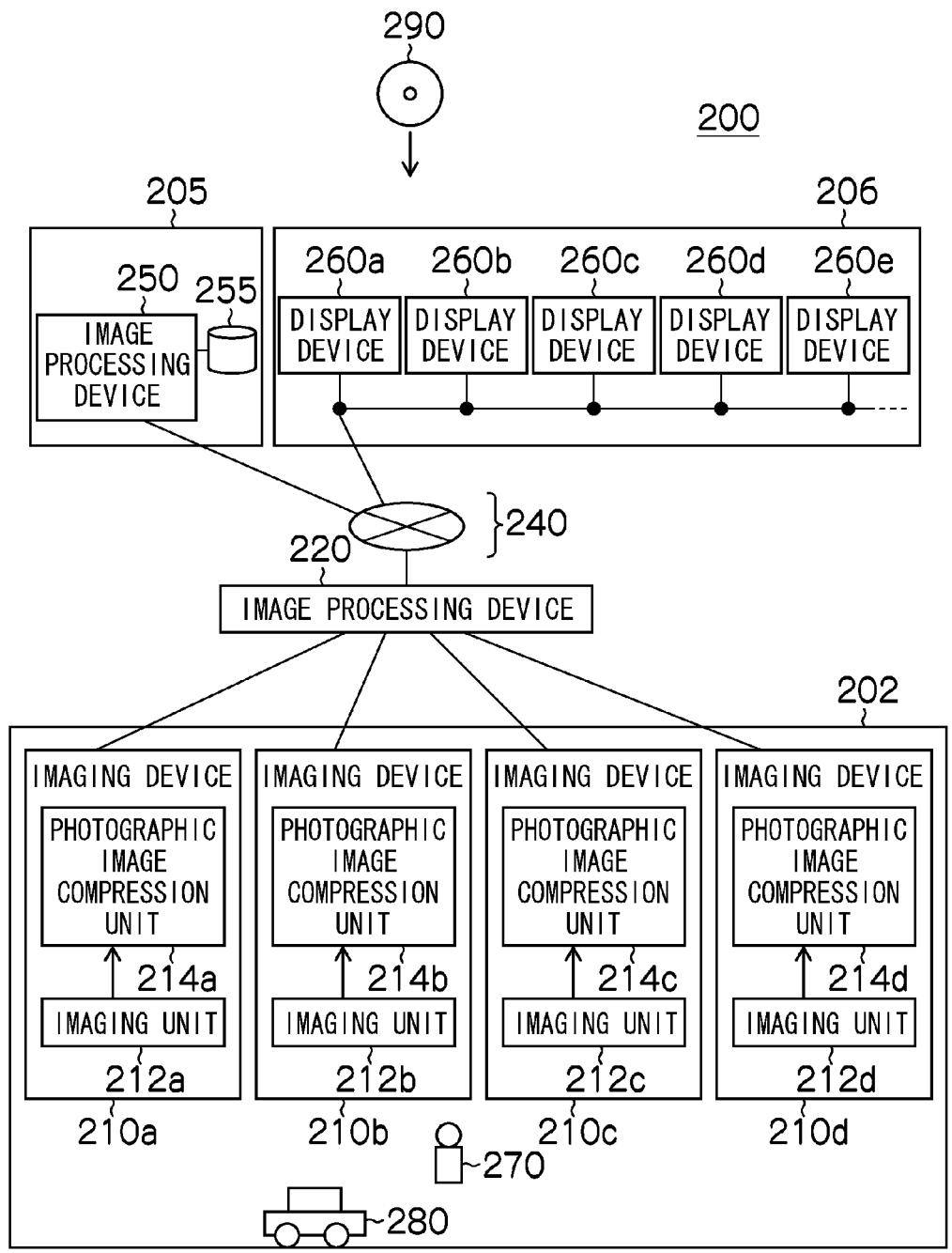
FIG. 13 is a configuration diagram illustrating an example of an image processing system according to the embodiment of the present invention.

FIG. 13 illustrates an example of an image processing system 200 according to an embodiment of the present invention. The image processing system 200 described below can function as, for example, a monitoring system.

The image processing system 200 includes a plurality of imaging devices 210a-d that image a monitoring target space 202, an image processing device 220 that processes the photographic images taken by the imaging devices 210a-d, a communication network 240, an image processing device 250, an image database (DB) 255, and a plurality of display devices 260a-e. The image processing device 250 can be installed in a space 205 different from the monitoring target space 202 (for example, a location far away from the monitoring target space 202), and the display devices 260a-e can be installed in a space 206 different from the monitoring target space 202 and the installation space 205 of the image processing device 250.

The imaging device 210a includes an imaging unit 212a and a photographic image compression unit 214a. The imaging unit 212a continuously images the monitoring target space 202 to take a plurality of photographic images. The photographic images obtained by the imaging unit 212a may be photographic images in an RAW format. The photographic image compression unit 214a synchronizes the photographic images in the RAW format taken by the imaging unit 212a and generates video data by compressing a video including the plurality of photographic images obtained by the synchronization based on MPEG encoding or other encoding systems. The imaging device 210a outputs the generated video data to the image processing device 220.

The other imaging devices 210b, 210c, and 210d have the same configurations as the imaging device 210a, and the video data generated by the imaging devices 210a-d are transmitted to the image processing device 220. In the following description, the imaging devices 210a-d may be collectively called "imaging device 210". Similarly, the display devices 260a-e may be collectively called "display device 260". In the following description, characters following numeric codes, such as alphabetical characters at the end of reference numerals provided to similar constituent elements, may be abbreviated to collectively call the constituent elements indicated by the numeric codes.

The image processing device 220 decodes the video data acquired from the imaging device 210 to acquire the video. The image processing device 220 detects a plurality of feature areas with different types of features, such as an area of an imaged person 270 and an area of an imaged moving body 280 such as a vehicle, from the plurality of photographic images included in the acquired video. The image processing device 220 compresses the images of the feature areas at a strength according to the type of the features and compresses the images of the areas other than the feature areas at a strength stronger than the compressive strength for compressing the images of the feature areas.

The image processing device 220 also generates feature area information including information for specifying the feature areas detected from the photographic images. The feature area information may be text data including the positions of the feature areas, the sizes of the feature areas, the number of feature areas, and identification information for identifying the photographic images from which the feature areas are detected or may be data obtained by applying processing, such as compression and encryption, to the text data.

The image processing device 220 attaches the generated feature area information to the compressed video data and transmits the information to the image processing device 250 through the communication network 240.

The image processing device 250 receives the compressed video data associated with the feature area information from the image processing device 220. The image processing device 250 stores the compressed video data in the image DB 255 in association with the feature area information associated with the compressed video data. As for the image DB 255, the compressed video data may be stored in a nonvolatile storage medium such as a hard disk. In this way, the image DB 255 stores the compressed photographic images.

In response to a request from the display device 260, the image processing device 250 reads out the compressed video data and the feature area information from the image DB 255, uses the accompanying feature area information to expand the read out compressed video data to generate a video for display, and transmits the video to the display device 260 through the communication network 240. The display device 260 includes a user interface that can input a search condition of the image and the like. The display device 260 can transmit various requests to the image processing device 250 and displays the video for display received from the image processing device 250.

In place of or in combination with the video display, the image processing device 250 can specify photographic images satisfying various search conditions and feature areas of the photographic images based on the positions of the feature areas included in the feature area information, the sizes of the feature areas, and the number of feature areas. The image processing device 250 may decode the specified photographic images and provide the images to the display device 260 to display the images that match the requested search conditions on the display device 260.

The image processing device 250 may use the corresponding feature area information to expand the compressed video data acquired from the image processing device 220 to generate a video for display and then store the video in the image DB 255. At this time, the image processing device 250 may store the video for display in the image DB 255 in association with the feature area information. According to the mode, the image processing device 250 can read out the video for display (expanded) from the image DB 255 according to the request from the display device 260 to transmit the video to the display device 260 along with the feature area information.

In place of the mode of providing the expanded video for display from the image processing device 250 to the display device 260, the display device 260 may execute the expansion process of the compressed video data to generate the image for display. More specifically, the display device 260 may receive the feature area information and the compressed video data from the image processing device 250 or the image processing device 220. In the mode, when the received compressed video data is decoded and displayed on the display device 260, the display device 260 may temporarily and simply enlarge the feature areas in the decoded photographic images and display the feature areas on the display device 260.

The display device 260 may further determine the image quality of the feature areas according to the processing capacity in the display device 260 to increase the image quality of the images of the feature areas based on the determined image quality. The display device 260 may replace the images of the feature areas in the photographic images displayed on the display device 260 by the images of the feature areas formed by increasing the image quality and display the images on the display device 260. The super-resolution means using the tensor projection of the present invention can be used as the processing means of high image quality formation upon the replacement and display. More specifically, the image processing device applying the present invention can be loaded on the display device 260.

According to the image processing system 200 of the present example, the information indicating the feature areas is stored in association with the video. Therefore, a photographic image group that matches a predetermined condition in the video can be quickly searched and cued. According to the image processing system 200 of the present example, only the photographic image group that matches the predetermined condition can be decoded. Therefore, the replay instruction can be readily responded, and a partial video that matches the predetermined condition can be quickly displayed.

A recording medium 290 illustrated in FIG. 13 stores programs for the image processing device 220, the image processing device 250, and the display device 260. The programs stored in the recording medium 290 are provided to electronic information processing devices, such as computers, that respectively function as the image processing device 220, the image processing device 250, and the display device 260 of the present embodiment. CPUs included in the computers operate according to the contents of the programs and control the components of the computers. The programs executed by the CPUs cause the computers to function as the image processing device 220, the image processing device 250, the display device 260, and the like described in relation to FIG. 13 and the following drawings.

Examples of the recording medium 290 include a CD-ROM, as well as an optical recording medium, such as a DVD or a PD, a magneto-optical recording medium, such as an MO or an MD, a magnetic recording medium, such as a tape medium or a hard disk device, a semiconductor memory, and a magnetic memory. A storage device, such as a hard disk or a RAM, arranged on a server system connected to a dedicated communication network or to the Internet can also function as the recording medium 290.

Hereinafter, examples of configurations of the image processing devices 220 and 250 and the display device 260 in the image processing system 200 of the present example will be described in further detail.

[Description of Image Processing Device 220]

Figure 14:
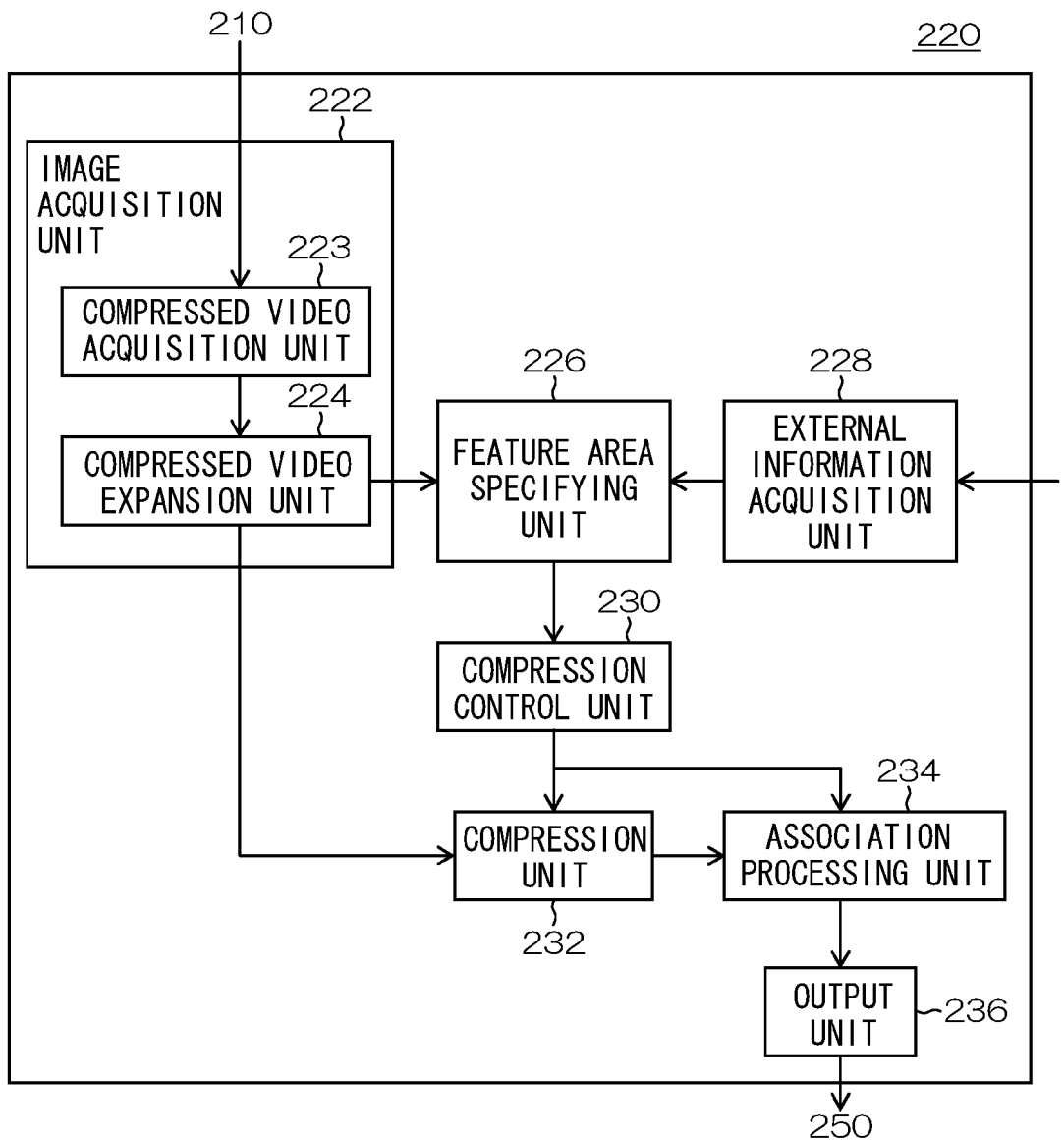
FIG. 14 is a block diagram illustrating an example of a configuration of an image processing device 220 in FIG. 13.

FIG. 14 illustrates an example of a block configuration of the image processing device 220. The image processing device 220 includes an image acquisition unit 222, a feature area specifying unit 226, an external information acquisition unit 228, a compression control unit 230, a compression unit 232, an association processing unit 234, and an output unit 236. The image acquisition unit 222 includes a compressed video acquisition unit 223 and a compressed video expansion unit 224.

The compressed video acquisition unit 223 acquires the encoded video data generated by the imaging device 210 (see FIG. 13). The compressed video expansion unit 224 expands the video data acquired by the compressed video acquisition unit 223 to generate a plurality of photographic images included in the video. Specifically, the compressed video expansion unit 224 decodes the encoded video data acquired by the compressed video acquisition unit 223 to extract the plurality of photographic images included in the video. The photographic images included in the video may be frame images or field images.

The plurality of photographic images obtained by the compressed video expansion unit 224 are supplied to the feature area specifying unit 226 and the compression unit 232. The feature area specifying unit 226 detects a feature area from the video including the plurality of photographic images. Specifically, the feature area specifying unit 226 detects the feature area from each of the plurality of photographic images.

For example, the feature area specifying unit 226 detects an image area, in which the image content changes in the video, as the feature area. Specifically, the feature area specifying unit 226 may detect an image area including a moving object as the feature area. The feature area specifying unit 226 can detect a plurality of feature areas with different types of features from each of the plurality of photographic images.

The types of the features may be types classified based on the types of the objects, such as a person and a moving body. The types of the objects may be determined based on the shapes of the objects or the degree of coincidence of the colors of the objects. In this way, the feature area specifying unit 226 may detect the plurality of feature areas including different types of objects from the plurality of photographic images.

(Example 1 of Feature Area Detection Method)

For example, the feature area specifying unit 226 may extract an object that matches with a predetermined shape pattern at a degree of coincidence greater than a predetermined degree of coincidence from the plurality of photographic images and detect areas in the photographic images including the extracted object as the feature areas with the same type of feature. A plurality of shape patterns may be defined for each type of the features. An example of the shape pattern includes a shape pattern of the face of a person. Patterns of different faces may be defined for each of a plurality of persons. In this way, the feature area specifying unit 226 can detect different areas including different persons as different feature areas.

Other than the face of a person, the feature area specifying unit 226 can detect, as the feature areas, areas including a region of part of a human body, such as the head of a person or hands of a person, or a region of at least part of a living body other than the human body.

When images inside a living body are processed, such as in an application to an endoscopic system with a similar configuration as the image processing system 200, specific tissues inside the living body, such as blood vessels inside the living body, or tumor tissues inside the living body can be the target. Other than the living body, the feature area specifying unit 226 may detect, as the feature areas, areas of an imaged card, such as currency and cash card, an imaged vehicle, and an imaged number plate of a vehicle.

(Example 2 of Feature Area Detection Method)

Other than the pattern matching based on template matching and the like, the feature area specifying unit 226 can detect the feature areas based on, for example, a studying result based on machine studying (for example, AdaBoost) described in Japanese Patent Application Laid-Open No. 2007-188419. For example, an image feature amount extracted from an image of a predetermined subject and an image feature amount extracted from an image of a subject other than the predetermined subject are used to study the features of the image feature amount extracted from the image of the predetermined subject. The feature area specifying unit 226 may detect areas, from which the image feature amount including features that match the studied features is extracted, as the feature areas.

Other than the examples 1 and 2, the feature areas can be detected by various methods, and the feature area specifying unit 226 detects a plurality of feature areas from a plurality of photographic images included in each of a plurality of videos based on an arbitrary method. The feature area specifying unit 226 supplies information indicating the detected feature areas to the compression control unit 230. The information indicating the feature areas can include coordinate information of the feature areas indicating the positions of the feature areas, type information indicating the types of the feature areas, and information for identifying a video in which the feature areas are detected.

The compression control unit 230 controls the compression process of video by the compression unit 232 based on information indicating the feature areas acquired from the feature area specifying unit 226. Based on the control by the compression control unit 230, the compression unit 232 compresses the photographic images at different strengths in the feature areas of the photographic images and in the areas other than the feature areas of the photographic images. For example, the compression unit 232 reduces the resolution of the areas other than the feature areas in the photographic images included in the video compared to the resolution in the feature areas to compress the photographic images. In this way, the compression unit 232 compresses the image areas in the photographic images at strengths according to the importance of the image areas.

When the feature area specifying unit 226 detects a plurality of feature areas, the compression unit 232 may compress the images of the plurality of feature areas in the photographic images at strengths according to the types of the features of the feature areas. For example, the compression unit 232 may reduce the resolutions of the images of the plurality of feature areas in the photographic images to resolutions defined in accordance with the types of the features of the feature areas.

The association processing unit 234 associates the information for specifying the feature areas detected from the photographic images with the photographic images. Specifically, the association processing unit 234 associates the information for specifying the feature areas detected from the photographic images with the compressed video including the photographic images as video configuration images. The output unit 236 outputs, to the image processing device 250, the compressed video data including the information for specifying the feature areas associated by the association processing unit 234.

The external information acquisition unit 228 acquires, from the outside of the image processing device 220, data used in the process by the feature area specifying unit 226 to specify the feature areas. The feature area specifying unit 226 uses the data acquired by the external information acquisition unit 228 to specify the feature areas. The data acquired by the external information acquisition unit 228 will be described in relation to a parameter storage unit 650 illustrated in FIG. 15 described below.

(Example of Configuration of Feature Area Specifying Unit 226)

Figure 15:
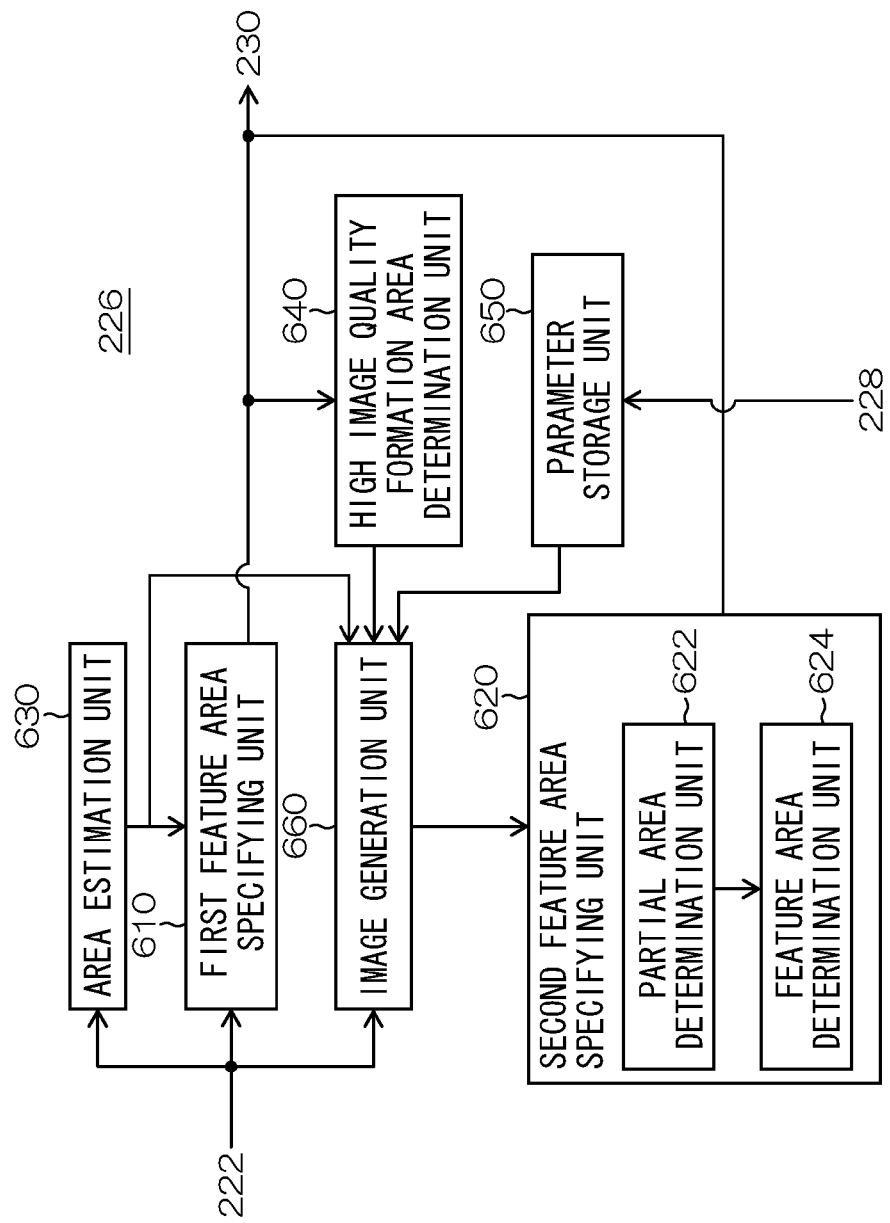
FIG. 15 is a block diagram illustrating an example of a configuration of a feature area specifying unit 226 in FIG. 14.

FIG. 15 illustrates an example of a block configuration of the feature area specifying unit 226. The feature area specifying unit 226 includes a first feature area specifying unit 610, a second feature area specifying unit 620, an area estimation unit 630, a high image quality formation area determination unit 640, the parameter storage unit 650, and an image generation unit 660. The second feature area specifying unit 620 includes a partial area determination unit 622 and a feature area determination unit 624.

The first feature area specifying unit 610 acquires the photographic images as the video configuration images included in the video from the image acquisition unit 222 and specifies the feature areas from the acquired photographic images. The first feature area specifying unit 610 may use the detection method illustrated in the "example 1 and example 2 of feature area detection method" to detect the feature areas to specify the feature areas from the photographic images.

The image generation unit 660 generates, from the photographic images, high quality images, in which the image quality is further increased in the areas with a higher possibility of being specified as the feature areas among the areas not specified as the feature areas (equivalent to "first feature areas") by the first feature area specifying unit 610. The super-resolution image processing means using the tensor projection according to the present invention can be used as the means for generating the high quality images by the image generation unit 660.

The second feature area specifying unit 620 searches the feature areas (equivalent to "second feature areas") from the high quality images generated by the image generation unit 660. The feature areas specified by the first feature area specifying unit 610 and the second feature area specifying unit 620 are supplied to the compression control unit 230 as the feature areas specified by the feature area specifying unit 226.

The second feature area specifying unit 620 may search the feature areas in further detail compared to the first feature area specifying unit 610 based on the high quality images obtained from the image generation unit 660. For example, the second feature area specifying unit 620 may include a detector that detects the feature areas more accurately than the detection accuracy for specifying the feature areas by the first feature area specifying unit 610. More specifically, the detector capable of more accurate detection than the detection accuracy of the detector included as the first feature area specifying unit 610 may be provided as the second feature area specifying unit 620.

In another mode, the second feature area specifying unit 620 may search the feature areas in further detail compared to the first feature area specifying unit 610 from the same input images (images not subjected to the high image quality formation process) as the images input to the first feature area specifying unit 610.

The image generation unit 660 may generate, from the photographic images, high quality images, in which the image quality is preferentially increased in the areas with a higher possibility of being specified as the feature areas among the areas not specified as the feature areas by the first feature area specifying unit 610. The image generation unit 660 may also generate the high quality images based on image processing to the photographic images.

The image generation unit 660 may generate, from the photographic images, the high quality images, in which the image quality is further increased in the areas with a higher possibility of being specified as the feature areas among the areas not specified as the feature areas by the first feature area specifying unit 610, after the first feature area specifying unit 610 has specified the feature areas. In this way, the "areas not specified as the feature areas by the first feature area specifying unit 610" may be the areas not specified as the feature areas by the first feature area specifying unit 610 at the stage when the first feature area specifying unit 610 has specified the feature areas. In this case, the second feature area specifying unit 620 will search the feature areas again.

In addition, the "areas not specified as the feature areas by the first feature area specifying unit 610" may be areas predicted to be not specified by the first feature area specifying unit 610 at the stage when the first feature area specifying unit 610 has not specified the feature areas. For example, when the first feature area specifying unit 610 detects the areas that match a predetermined condition as the feature areas, the "areas not specified as the feature areas by the first feature area specifying unit 610" may be areas that do not meet the condition. The image generation unit 660 may generate the high quality images at the stage when the first feature area specifying unit 610 has not specified the feature areas.

Although the first feature area specifying unit 610 and the second feature area specifying unit 620 are illustrated by different functional blocks in the present block diagram (FIG. 15), it is obvious that the units can be included as a single functional element. For example, the first feature area specifying unit 610 and the second feature area specifying unit 620 can at least partially share a hardware element, such as an electric circuit for feature area detection, and a software element, such as software for feature area detection.

Although the image generation unit 660 generates images formed by increasing the image quality of the input images in the example described above, the image generation unit 660 may generate images with higher image quality than the images subjected to the feature area specifying process for specifying the feature areas executed by the first feature area specifying unit 610 and provide the images to the second feature area specifying unit 620. For example, when the first feature area specifying unit 610 applies predetermined image processing to the input images to specify the feature areas, the image generation unit 660 may generate the images with higher image quality than the images obtained by the image processing and provide the images to the second feature area specifying unit 620.

It is sufficient if the high quality images generated by the image generation unit 660 are images with higher image quality than the images used by the first feature area specifying unit 610 in the feature area specifying process, and the high quality images include images with higher image quality than the input images and images with lower image quality than the input images. In this way, the image generation unit 660 generates, from the input images, high quality images obtained by changing the image quality of the areas not specified as the feature areas by the first feature area specifying unit 610 to image quality corresponding to the possibility of being specified as the feature areas. The image generation unit 660 may also generate high quality images with the image quality of accuracy corresponding to the possibility of being specified as the feature areas.

The area estimation unit 630 estimates areas that should be specified as the feature areas in the photographic images. For example, if the feature area specifying unit 226 should specify areas of a moving object in the video as the feature areas, the area estimation unit 630 estimates the areas with the moving object in the video. For example, the area estimation unit 630 estimates the position of the moving object based on the position of the moving object extracted from other one or more photographic images as video configuration images included in the same video, the timing that the other photographic images are taken, and the like. The area estimation unit 630 may estimate areas in a predetermined size including the estimated position as the areas with the moving object in the video.

In this case, the first feature area specifying unit 610 specifies, as the feature areas, the areas of the moving object among the areas estimated by the area estimation unit 630 in the photographic images. The image generation unit 660 may generate high quality images obtained by increasing the image quality of the areas, in which the areas of the moving object are not specified by the first feature area specifying unit 610, among the areas estimated by the area estimation unit 630.

As a result, the possibility that the moving object can be extracted by re-searching increases when the moving object cannot be detected from the areas with a high possibility of the existence of the moving object. In this way, the probability of a missed detection of the feature areas by the feature area specifying unit 226 can be reduced.

The partial area determination unit 622 determines whether the images of one or more partial areas at predetermined positions in specific image areas meet predetermined conditions. The feature area determination unit 624 determines whether the specific image areas are the feature areas based on the determination results of the partial area determination unit 622. For example, in the determination of whether the specific image areas are the feature areas, the partial area determination unit 622 determines whether the plurality of different partial areas on the specific image areas meet the predetermined conditions. The feature area determination unit 624 determines that the specific image areas are the feature areas when the number of partial areas from which the determination result of "no" is obtained is smaller than a predetermined value.

When the second feature area specifying unit 620 determines whether the specific image areas are the feature areas based on the process for the one or more partial areas at the predetermined positions in the specific image areas, the image generation unit 660 may increase the image quality of the one or more partial areas when generating the high quality images obtained by increasing the image quality of the specific image areas. This can increase the image quality of only the areas effective for the feature area detection process, and the amount of computation in the re-detection process of the feature areas can be reduced.

The high image quality formation area determination unit 640 determines areas for which the image generation unit 660 increases the image quality. Specifically, the high image quality formation area determination unit 640 determines wider areas as the areas for which the image generation unit 660 increases the image quality when the possibility that the areas are specified as the feature areas is lower. The image generation unit 660 generates high quality images formed by further increasing the image quality of the areas determined by the high image quality formation area determination unit 640. As a result, the possibility that the moving object can be extracted by re-searching can be increased, and the probability of a missed detection of the feature areas by the feature area specifying unit 226 can be reduced.

The parameter storage unit 650 stores image processing parameters used to increase the image quality of the images in association with the amount of features extracted from the images. The image generation unit 660 uses the image processing parameters stored in the parameter storage unit 650 in association with the amount of features that matches the amount of features extracted from the target areas of the high image quality formation to generate the high quality images in which the image quality of the target areas of the high image quality formation is increased. The parameter storage unit 650 may store the image processing parameters calculated by studying using a plurality of images, from which similar amounts of features are extracted, as teacher images in association with the amount of features that represents the similar amounts of features.

The image processing parameters may be image data including spatial frequency components of a higher frequency area that should be added to the image data as a target of the high image quality formation. When data of pixel values of a plurality of pixels or data of a plurality of feature amount components is handled as input data, other examples of the image processing parameters include a vector, a matrix, a tensor, an n-dimensional mixed normal distribution, an n-dimensional mixed multinomial distribution, and the like for converting the input data to data indicating the high quality images. It is assumed that n is an integer one or greater. The image processing parameters will be described later in relation to the operation of the image processing device 250.

The external information acquisition unit 228 illustrated in FIG. 13 acquires at least one of the image processing parameters and the amount of features stored in the parameter storage unit 650 (described in FIG. 15) from the outside. The parameter storage unit 650 stores at least one of the image processing parameters and the amount of features acquired by the external information acquisition unit 228.

Figure 16:
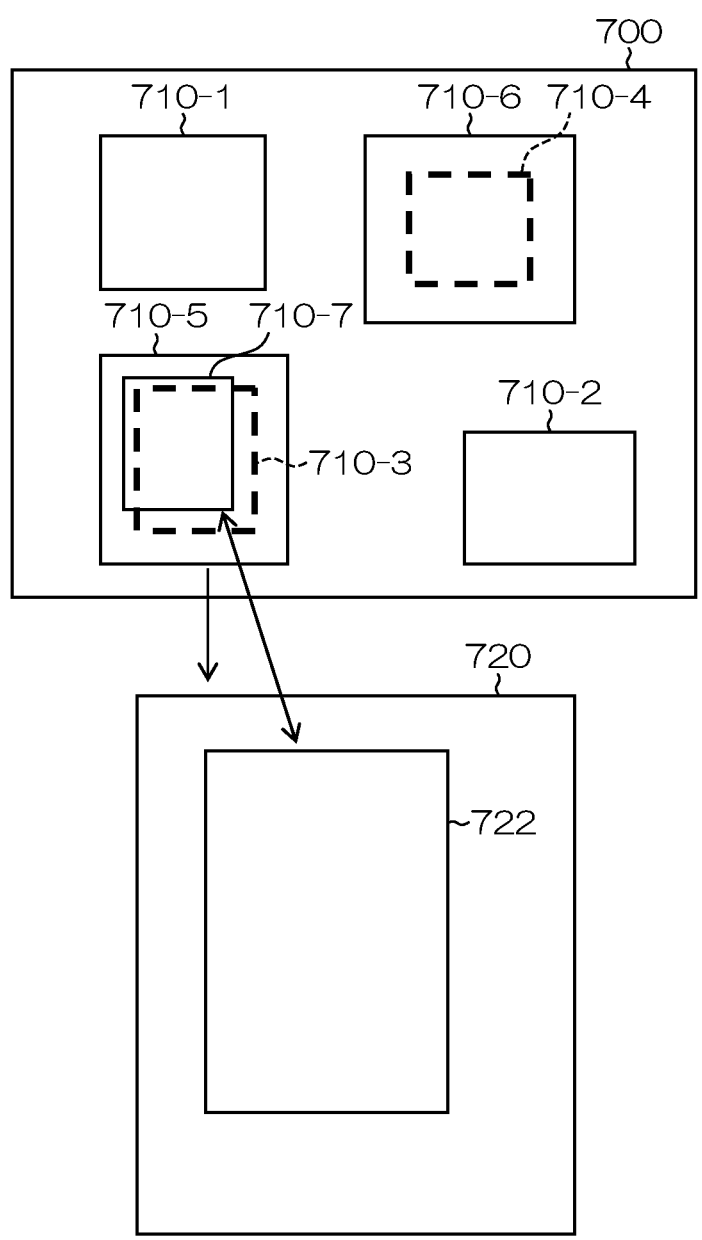
FIG. 16 is an explanatory diagram illustrating an example of a process of specifying feature areas from an image.

FIG. 16 illustrates an example of a specifying process of feature areas in the feature area specifying unit 226. A process of specifying feature areas in a photographic image 700 will be described here.

As illustrated in FIG. 16, the first feature area specifying unit 610 (see FIG. 15) calculates, for a plurality of image areas of the photographic image 700, matching degrees to a predetermined condition. The first feature area specifying unit 610 specifies an area 710-1 and an area 710-2, in which the matching degrees to the predetermined condition in the photographic image is greater than a first threshold, as the feature areas.

The high image quality formation area determination unit 640 (see FIG. 15) selects an area 710-3 and an area 710-4 in which the matching degrees to the predetermined condition in the photographic image is greater than a second threshold which is smaller than the first threshold (see FIG. 16). The high image quality formation area determination unit 640 determines an area 710-5, which includes the area 710-3 and has a size corresponding to the matching degree of the image of the area 710-3 for the condition, as a target area of the high image quality formation by the image generation unit 660. The high image quality formation area determination unit 640 also determines an area 710-6, which includes the area 710-4 and has a size corresponding to the matching degree of the image of the area 710-4 for the condition, as a target area of the high image quality formation by the image generation unit 660.

It is determined that a smaller matching degree is calculated for the area 710-4 compared to the area 710-3 in the example of FIG. 16, and the high image quality formation area determination unit 640 determines the area 710-6, which is enlarged from the area 710-4 at a greater enlargement rate, as the target area of the high image quality formation by the image generation unit 660 (see FIG. 15). In this way, the high image quality formation area determination unit 640 determines the area, which is obtained by enlarging an area, in which the matching degree to the condition is greater than the predetermined second threshold, at an enlargement rate according to the matching degree, as the target area of the high image quality formation by the image generation unit 660.

The second feature area specifying unit 620 (see FIG. 15) searches a feature area from the images of the area 710-5 and the area 710-6 with an increased image quality (see FIG. 16). The second feature area specifying unit 620 may execute the same process as the first feature area specifying unit 610 to search an area that meets the condition from images of the area 710-5 and the area 710-6 with an increased image quality. It is assumed here that the second feature area specifying unit 620 has determined that an area 722 meets the condition in an image 720 of the area 710-5 with an increased image quality. In this case, the feature area specifying unit 226 specifies an area 710-7 corresponding to the area 722 on the image 720 as a feature area in addition to the area 710-1 and the area 710-2 specified by the first feature area specifying unit 610.

In this way, the image generation unit 660 (see FIG. 15) generates, from the photographic image, a high quality image formed by increasing the image quality of an area with a greater matching degree to a predetermined condition among the areas not specified as the feature areas by the first feature area specifying unit 610. Specifically, the image generation unit 660 generates a high quality image formed by increasing the image quality of an area in which the matching degree to the condition is greater than the predetermined second threshold among the areas not specified as the feature areas by the first feature area specifying unit 610. As a result, the possibility of extracting the feature areas from areas that are likely to be the feature areas can be increased, and the probability of a missed detection of the feature areas can be reduced.

As described, the areas except the areas specified as the feature areas by the first feature area specifying unit 610 and the target areas of the high image quality formation are determined as non-feature areas that are not the feature areas. Based on results of specifying the feature areas by the first feature area specifying unit 610 and the second feature area specifying unit 620, preliminary test results, posterior test results, or the like, the value of the first threshold may be set so that the probability of specifying an area, which is not a feature area, as a feature area is greater than a predetermined value. This can reduce the possibility that the areas specified as the feature areas by the first feature area specifying unit 610 include non-feature areas. Although a matching degree close to the first threshold may be calculated in the non-feature areas, the possibility that the areas are falsely detected as the feature areas can be reduced by setting the first threshold as described above.

Based on results of specifying the feature areas by the first feature area specifying unit 610 and the second feature area specifying unit 620, preliminary test results, posterior test results, or the like, the value of the second threshold may be set so that the matching degrees calculated from the feature areas are equal to or greater than the second threshold. This can reduce the possibility that the areas, in which the matching degrees equal to or smaller than the second threshold are calculated, include the feature areas. Although a matching degree close to the second threshold may be calculated for the feature areas, the possibility that the areas are determined as non-feature areas can be reduced by setting the second threshold as described above.

Meanwhile, as a result of setting the first threshold and the second threshold, there is a possibility that areas, in which the matching degrees greater than the second threshold and equal to or smaller than the first threshold are calculated, include the feature areas. According to the feature area specifying unit 226, the image quality of the areas is increased, and then the second feature area specifying unit 620 searches the feature areas. Therefore, the feature areas and the non-feature areas can be appropriately separated, and the probability of a missed detection of the feature areas and the probability of detecting a non-feature area as a feature area can be reduced. In this way, the feature area specifying unit 226 can provide a feature area detector with high sensitivity and specificity.

Other than determining whether to execute the high image quality formation process based on the relationship between the matching degree and the threshold, the image generation unit 660 may generate a high quality image formed by increasing the image quality of at least part of the image areas of the input image at high image quality formation accuracy corresponding to the matching degree to the condition. In this case, the high image quality formation accuracy may be defined by a continuous function or a discontinuous function corresponding to the matching degree.

Figure 17:
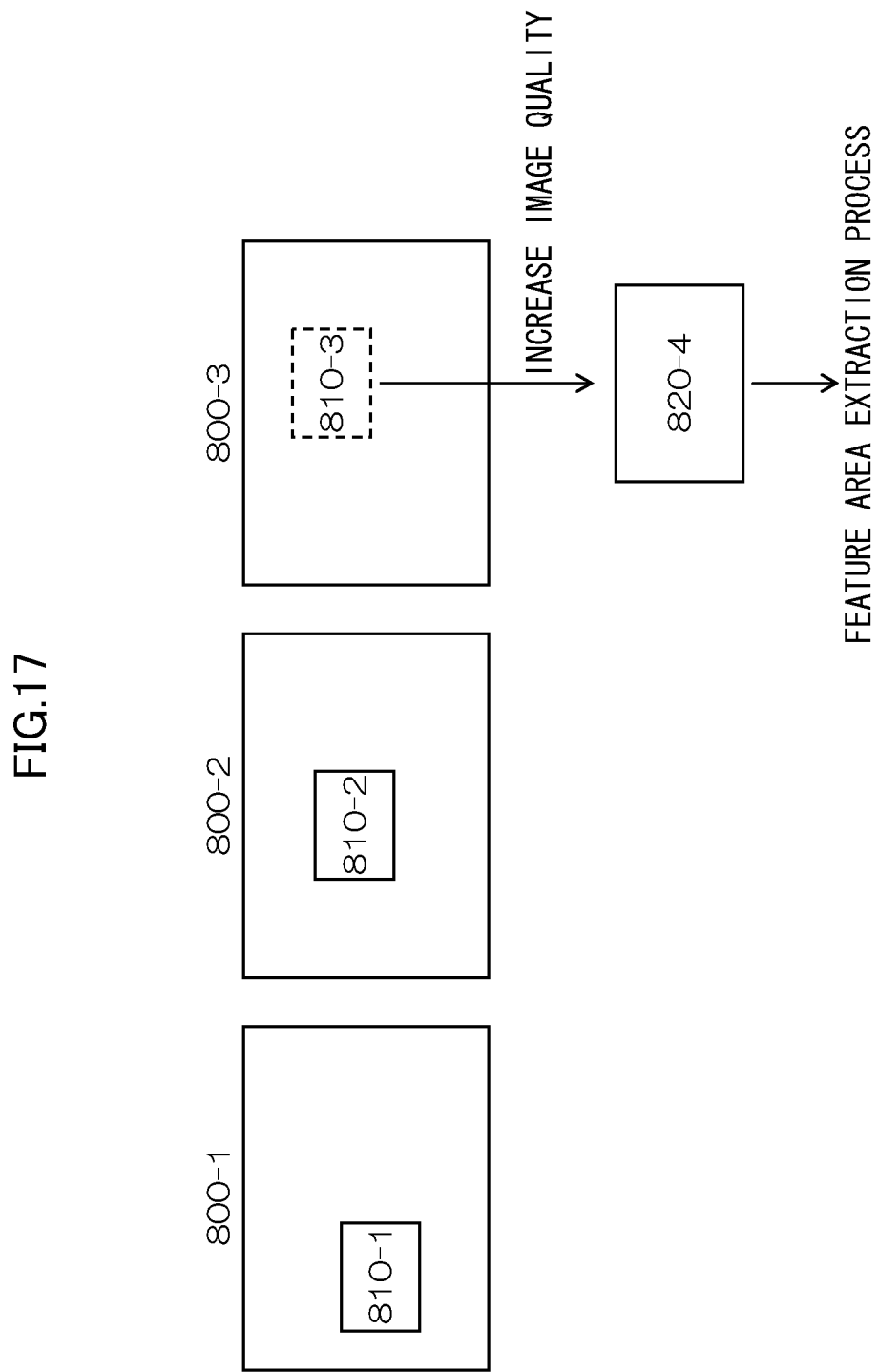
FIG. 17 is an explanatory diagram illustrating another example of the process of specifying feature areas from an image.

FIG. 17 illustrates another example of the specifying process of the feature areas in the feature area specifying unit 226. An example of a process by the feature area specifying unit 226 for specifying an area of a moving object from a video as a feature area is particularly illustrated here.

It is assumed that the first feature area specifying unit 610 or the second feature area specifying unit 620 (see FIG. 15) has specified an area 810-1 and an area 810-2 as the feature areas in a photographic image 800-1 and a photographic image 800-2, respectively, as illustrated in FIG. 17. It is assumed here that the area 810-1 and the area 810-2 include objects of the same imaged subject.

In this case, the area estimation unit 630 (see FIG. 15) determines an area 810-3 as an area where an object of the same subject should exist in a photographic image 800-3 based on the positions on the images of the area 810-1 and the area 810-2, the timing of imaging of the photographic image 800-1 and the photographic image 800-2, and the timing of imaging of the photographic image 800-3 (FIG. 17). For example, the area estimation unit 630 calculates the speed of the moving object on the image areas from the positions of the area 810-1 and the area 810-2 on the images and the timing of imaging of the photographic image 800-1 and the photographic image 800-2 and determines that the area 810-3 is an area where an object of the same subject should exist based on the calculated speed, the position of the area 810-2, and the time difference between the timing of imaging of the photographic image 800-2 and the timing of imaging of the photographic image 800-3.

The first feature area specifying unit 610 (see FIG. 15) searches a moving object from the area 810-3 (FIG. 17). If the first feature area specifying unit 610 does not detect a moving object from the area 810-3, the image generation unit 660 generates a high quality image 820-4 formed by increasing the image quality of the area 810-3 (FIG. 17). The second feature area specifying unit 620 searches a moving object from the high quality image 820-4. This can increase the possibility of the extraction of the object from an area with a high possibility of the detection of the moving object and can reduce the probability of a missed detection of the moving object.

The image generation unit 660 (see FIG. 15) may generate the high quality image 820-4 formed by further increasing the image quality of an area closer to the center of the area 810-3. This can reduce the strength of the high image quality formation for an area with a low probability of the existence of the moving object. Therefore, the amount of computation for the high image quality formation may be reduced compared to when the image quality of the entire area is uniformly increased at a high strength.

Figure 18:
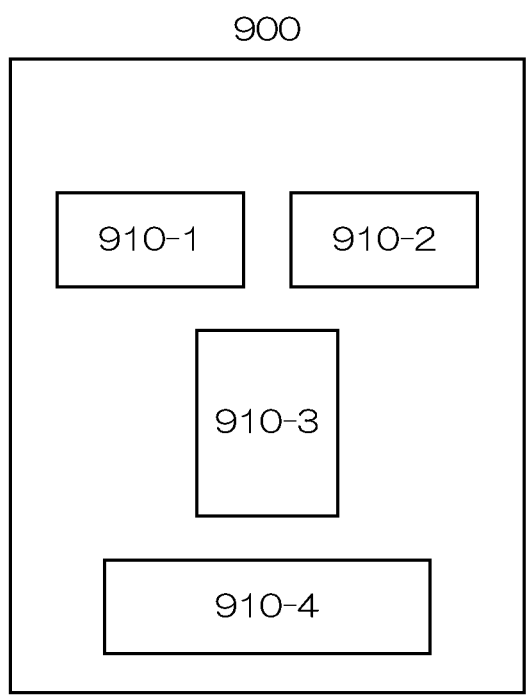
FIG. 18 is an explanatory diagram illustrating an example of a determination process of feature areas by a second feature area specifying unit 620 in FIG. 15.

FIG. 18 illustrates an example of a determination process of the feature area by the second feature area specifying unit 620 described in FIG. 15. To determine whether a specific image area 900 is a feature area, the second feature area specifying unit 620 extracts the amount of features from partial areas 910-1 to 4 in a predetermined positional relationship in the image area 900. At this time, the second feature area specifying unit 620 extracts, from each of the partial areas 910, an amount of feature of a predetermined type according to the position of each of the partial areas 910 in the image area 900.

The second feature area specifying unit 620 calculates, for each partial area 910, a matching degree of the amount of features extracted from the image of the partial area 910 relative to a predetermined condition. The second feature area specifying unit 620 determines whether the image area 900 is a feature area based on the matching degree calculated for each partial area 910. The second feature area specifying unit 620 may determine that the image area 900 is a feature area if the total weighted value of the matching degrees is greater than a predetermined value. The second feature area specifying unit 620 may also determine that the image area 900 is a feature area if the number of partial areas 910, in which the matching degree greater than a predetermined value is calculated, is greater than a predetermined value.

The process from the extraction of the amount of features to the matching degree calculation may be implemented by an image filter. The process may be implemented as a weak classifier. The positions of the partial areas 910 may be determined according to the type of the object to be extracted as the feature area. For example, when an area including an object of the face of a person is to be detected as the feature area, the partial areas 910 may be determined at positions in which discrimination power to the object of the face of the person is greater than a predetermined value. The high discrimination power may denote that the probability that the determination result indicate "true" for an object of the face of the person is high and that the probability that the determination result indicates "false" for objects other than the face of the person is high.

The image generation unit 660 (see FIG. 15) does not increase the image quality of the areas other than the partial areas 910 and increases the image quality of only the partial areas 910. As described, the second feature area specifying unit 620 extracts feature areas from the image with increased quality to determine whether the image area 900 is a feature area. This can increase the detection probability of the feature areas while limiting the image areas for which the image quality is increased and can quickly detect the feature areas at a high probability. Although the determination process of the feature areas in the second feature area specifying unit 620 is described above, the first feature area specifying unit 610 may also determine whether the areas are the feature areas by the same process.

The processes in the first feature area specifying unit 610 and the second feature area specifying unit 620 can be implemented by a plurality of weak classifiers. An example of using and implementing N weak classifiers in total will be described below. The first feature area specifying unit 610 uses Nf weak classifiers to determine whether the areas are the feature areas. The matching degree is calculated based on the determination result, and as described above, an area with the matching degree greater than the first threshold is determined as the feature area, and an area with the matching degree equal to or smaller than the second threshold is determined as a non-feature area.

The image generation unit 660 increases the image quality of the areas with the matching degree equal to or smaller than the first threshold and greater than the second threshold. The second feature area specifying unit 620 uses the Nf weak classifiers used by the first feature area specifying unit 610 and Nb weak classifiers other than the Nf weak classifiers to determine whether the image with increased quality includes feature areas. For example, whether the areas are the feature areas may be determined based on the matching degrees calculated from the determination results of the Nf+Nb weak classifiers.

Among the areas not specified as the feature areas by the first feature area specifying unit 610, the feature areas may be specified by different processes from a plurality of areas determined according to the comparison results of a third threshold, which is smaller than the first threshold and greater than the second threshold, and the matching degrees. For example, the image generation unit 660 may increase the image quality of the areas, in which the matching degree greater than the third threshold is calculated, and the Nf+Nb weak classifiers in the second feature area specifying unit 620 may determine whether the areas are the feature areas. Meanwhile, the image generation unit 660 may increase the image quality of the areas, in which the matching degree equal to or smaller than the third threshold is calculated, and the Nf+Nb weak classifiers in the second feature area specifying unit 620 may determine whether the areas are the feature areas.

The number of weak classifiers Nb used in the process by the second feature area specifying unit 620 may be adjusted according to the matching degree. For example, if the matching degree is smaller, more weak classifiers may be used in the second feature area specifying unit 620 to determine whether the areas are the feature areas.

As described, the second feature area specifying unit 620 may search the feature areas from the image quality change image in greater detail if the matching degree is lower. An example of a weak classifier configuration in at least one of the first feature area specifying unit 610 and the second feature area specifying unit 620 includes a weak classifier configuration by AdaBoost.

The first feature area specifying unit 610 and the second feature area specifying unit 620 may detect the feature areas from a low resolution image group formed by multiresolution expressions. In this case, the image generation unit 660 may generate the low resolution image group based on highly accurate multiresolution formation by multiresolution formation in the first feature area specifying unit 610. An example of the multiresolution formation process in the first feature area specifying unit 610 includes a reduction process by a bicubic method.

An example of the multiresolution formation process in the second feature area specifying unit 620 includes a reduction process based on prior studying. The second feature area specifying unit 620 may use image processing parameters obtained by studying using full-scale images and images of target resolution to generate the low resolution image group from the input images. It is more preferable to use images of target resolution with lower folding noise in the studying. For example, images obtained by different imaging devices including different numbers of imaging elements can be used for the studying.

The image processing method using the tensor projection of the present invention can be applied as the high image quality formation process described in relation to FIGS. 15 to 18. More specifically, the image generation unit 660 may use the image processing technique of high image quality formation of the present invention illustrated in FIGS. 1 to 12 to generate the high quality image formed by further increasing the image quality of the areas with a high possibility of being specified as the feature areas.

Other than the process of high resolution formation, examples of the high image quality formation process include a multi-gradation formation process for increasing the number of gradations and a multi-color formation process for increasing the number of colors. The image processing method using the tensor projection of the present invention can be applied to the processes.

If the photographic images subject to the high image quality formation are video configuration images (frame images or field images) of a video, pixel values of other photographic images may be used to increase the image quality in high image quality formation processes, such as high resolution formation, multi-color formation, multi-gradation formation, noise reduction, artifact reduction for reducing artifacts such as block noise and mosquito noise, blur reduction, sharpness formation, and high frame rate formation. For example, the image quality may be increased using the deviation of the imaging position of a moving body due to a difference in the imaging timing. More specifically, the image generation unit 660 may use photographic images as video configuration images included in the video and other video configuration images included in the video to generate high quality images.

Other than the process using a plurality of video configuration images, examples of the noise reduction process include processes described in Japanese Patent Application Laid-Open No. 2008-167949, Japanese Patent Application Laid-Open No. 2008-167950, Japanese Patent Application Laid-Open No. 2008-167948, and Japanese Patent Application Laid-Open No. 2008-229161. For example, the image generation unit 660 can use a result of prior studying using images with a larger amount of noise and images with a smaller amount of noise to reduce the noise. To reduce the amount of noise of the images taken by visible light as in the present embodiment, images taken under the ambient light with a smaller amount light can be used in the prior studying, instead of using images taken by small doses in the prior studying as described in Japanese Patent Application Laid-Open No. 2008-167949. In the sharpness formation process, examples of more accurate sharpness formation process include a process using a filter in a larger filter size and a process of forming the sharpness in more directions.

(Example of Configuration of Compression Unit 232)

Figure 19:
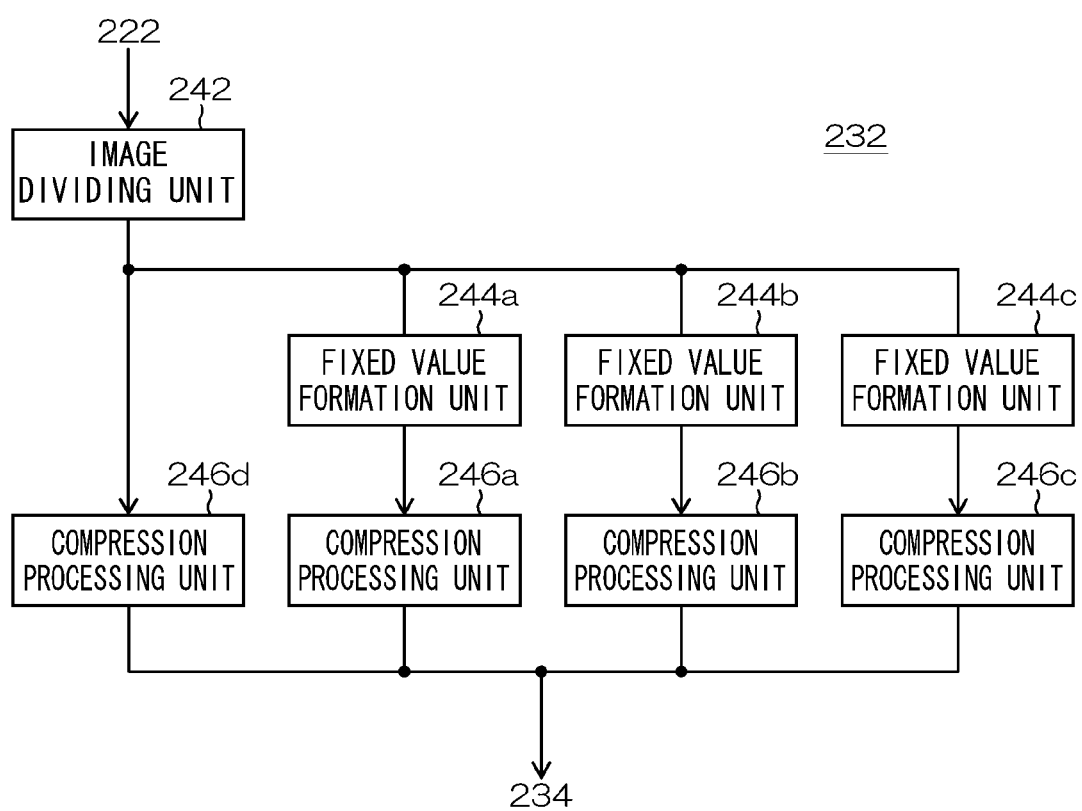
FIG. 19 is a block diagram illustrating an example of a configuration of a compression unit 232 in FIG. 14.

FIG. 19 illustrates an example of a block configuration of the compression unit 232 described in FIG. 14. The compression unit 232 includes an image dividing unit 242, a plurality of fixed value formation units 244a-c (hereinafter, may be collectively called "fixed value formation units 244"), and a plurality of compression processing units 246a-d (hereinafter, may be collectively called "compression processing units 246").

The image dividing unit 242 acquires a plurality of photographic images from the image acquisition unit 222. The image dividing unit 242 divides the plurality of photographic images into feature areas and background areas other than the feature areas. Specifically, the image dividing unit 242 divides the plurality of photographic images into a plurality of individual feature areas and background areas other than the feature areas. The compression processing units 246 compress feature area images as images of the feature areas and background area images as images of the background areas at different strengths. Specifically, the compression processing units 246 compress feature area videos including a plurality of feature area images and background area videos including a plurality of background area images at different strengths.

More specifically, the image dividing unit 242 generates feature area videos of each type of a plurality of features by dividing the plurality of photographic images. The fixed value formation units 244 fix the pixel values of the areas other than the feature areas of the types of the features in each feature area image included in the plurality of feature area videos generated for each type of features.

Specifically, the fixed value formation units 244 set predetermined pixel values to the pixel values of the areas other than the feature areas. For each type of the features, the compression processing units 246a-c compress the plurality of feature area videos by MPEG or other encoding formats.

The fixed value formation units 244a-c fix the values of the feature area video of a first feature type, the feature area video of a second feature type, and the feature area video of a third feature type, respectively. The compression processing units 246a-c compress the feature area video of the first feature type, the feature area video of the second feature type, and the feature area video of the third feature type including the values fixed by the fixed value formation units 244a-c, respectively.

The compression processing units 246a-c compress the feature area videos at strengths predetermined according to the types of the features. For example, the compression processing units 246 may convert the feature area videos to videos with different resolutions predetermined according to the types of the features of the feature areas to compress the converted feature area videos. Furthermore, in the compression of the feature area videos by MPEG encoding, the compression processing units 246 may compress the feature area videos by different quantization parameters predetermined according to the types of the features.

The compression processing unit 246d compresses the background area videos. The compression processing unit 246d may compress the background area videos at a strength higher than the compressive strengths of the compression processing units 246a-c. The feature area videos and the background area videos compressed by the compression processing units 246 are supplied to the association processing unit 234 (see FIG. 14).

As described in FIG. 19, the fixed value formation units 244 fix the values of the areas other than the feature areas. Therefore, when the compression processing unit 246 performs predictive coding based on the MPEG encoding or the like, the amount of difference between the images and the prediction images in the areas other than the feature areas can be significantly reduced. Therefore, the compression unit 232 can compress the feature area videos at higher compression rates.

Although each of the plurality of compression processing units 246 included in the compression unit 232 compresses the images of the plurality of feature areas and the images of the background areas in the configuration of FIG. 19, but, in another mode, the compression unit 232 may include one compression processing unit 246. The one compression processing unit 246 may compress the images of the plurality of feature areas and the images of the background areas at different strengths. For example, the images of the plurality of feature areas and the images of the background areas may be sequentially supplied to the one compression processing unit 246 in a time division manner, and the one compression processing unit 246 may sequentially compress the images of the plurality of feature areas and the images of the background areas at different strengths.

The one compression processing unit 246 may also quantize the image information of the plurality of feature areas and the image information of the background areas by different quantization coefficients to compress the images of the plurality of feature areas and the images of the background areas at different strengths. Images converted to images with different image qualities from the images of the plurality of feature areas and the images of the background areas may be supplied to the one compression processing unit 246, and the one compression processing unit 246 may compress the images of the plurality of feature areas and the images of the background areas. In the mode in which the one compression processing unit 246 quantizes the information by different quantization coefficients area-by-area or compresses the images converted to different image qualities area-by-area as described above, the one compression processing unit 246 may compress entire one image or may compress the images divided by the image dividing unit 242 as described in FIG. 19. When the one compression processing unit 246 compresses the entire one image, the dividing process by the image dividing unit 242 and the fixed value formation process by the fixed value formation units 244 do not have to be executed. Therefore, the compression unit 232 does not have to include the image dividing unit 242 and the fixed value formation units 244.

(Example of Configuration 2 of Compression Unit 232)

Figure 20:
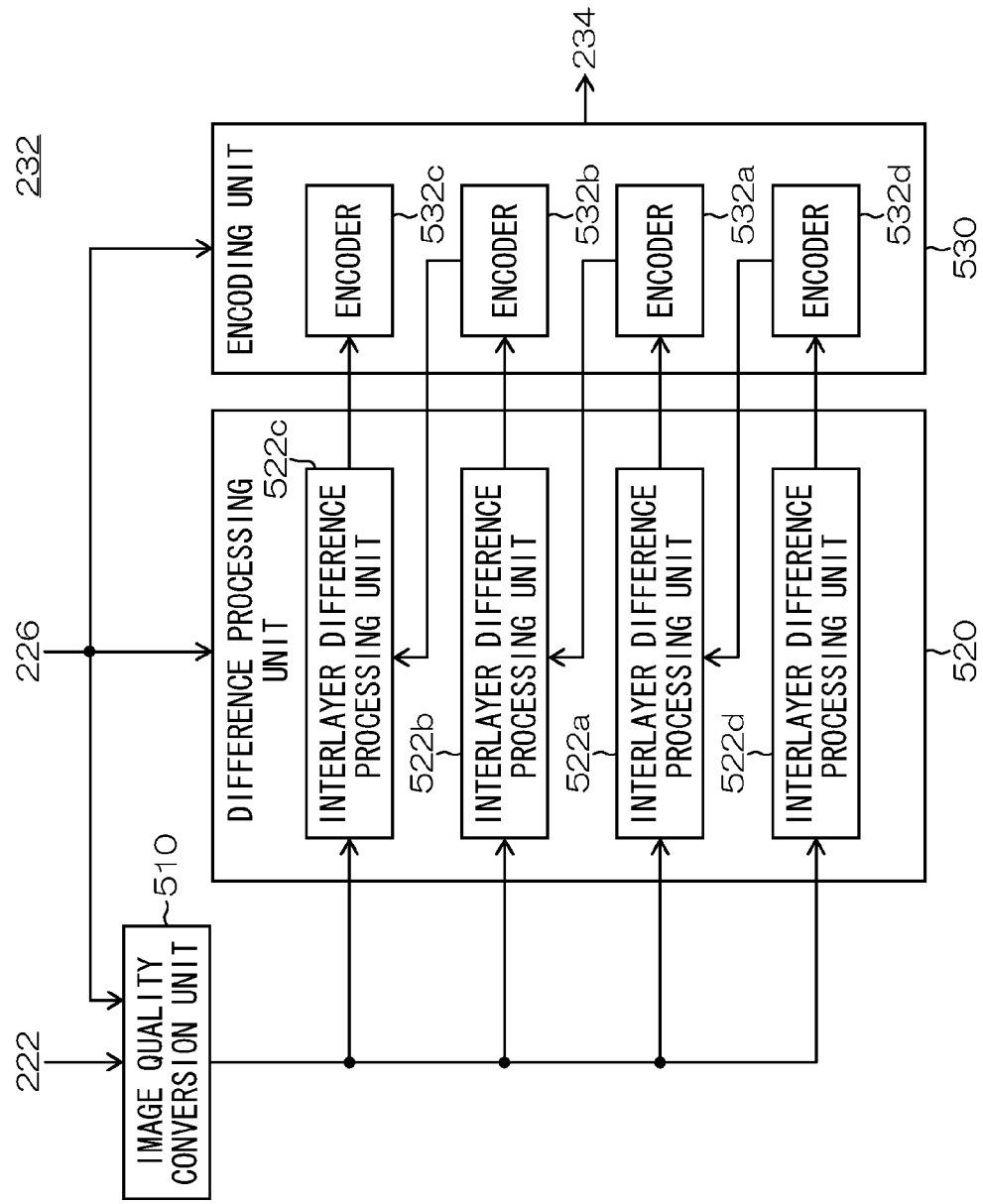
FIG. 20 is a block diagram illustrating another example of a configuration of the compression unit 232.

FIG. 20 illustrates another example of a block configuration of the compression unit 232 described in FIG. 14. The compression unit 232 in the present configuration compresses a plurality of photographic images by a spatially scalable encoding process according to the type of the features.

The compression unit 232 illustrated in FIG. 20 includes an image quality conversion unit 510, a difference processing unit 520, and an encoding unit 530. The difference processing unit 520 includes a plurality of interlayer difference processing units 522a-d (hereinafter, collectively called "interlayer difference processing units 522"). The encoding unit 530 includes a plurality of encoders 532a-d (hereinafter, collectively called "encoders 532").

The image quality conversion unit 510 acquires a plurality of photographic images from the image acquisition unit 222. The image quality conversion unit 510 also acquires information for specifying the feature areas detected by the feature area specifying unit 226 and information for specifying the types of the features of the feature areas. The image quality conversion unit 510 replicates the photographic images to generate the same number of photographic images as the types of the features of the feature areas. The image quality conversion unit 510 converts the generated photographic images to images of resolutions corresponding to the types of the features.

For example, the image quality conversion unit 510 generates a photographic image converted to a resolution corresponding to the background area (hereinafter, called a "low resolution image"), a photographic image converted to a first resolution corresponding to the type of the first feature (hereinafter, called a "first resolution image"), a photographic image converted to a second resolution corresponding to the type of the second feature (hereinafter, called a "second resolution image"), and a photographic image converted to a third resolution corresponding to the type of the third feature (hereinafter, called a "third resolution image"). The first resolution image has a higher resolution than the low resolution image, the second resolution image has a higher resolution than the first resolution image, and the third resolution image has a higher resolution than the second resolution image.

The image quality conversion unit 510 supplies the low resolution image, the first resolution image, the second resolution image, and the third resolution image to the interlayer difference processing unit 522d, the interlayer difference processing unit 522a, the interlayer difference processing unit 522b, and the interlayer difference processing unit 522c, respectively. The image quality conversion unit 510 applies the image quality conversion process to the plurality of photographic images and supplies videos to the interlayer difference processing units 522.

The image quality conversion unit 510 may convert the frame rate of the videos supplied to the interlayer difference processing units 522 according to the types of the features of the feature areas. For example, the image quality conversion unit 510 may supply, to the interlayer difference processing unit 522d, a video with a frame rate lower than the video supplied to the interlayer difference processing unit 522a. The image quality conversion unit 510 may also supply, to the interlayer difference processing unit 522a, a video at a frame rate lower than the video supplied to the interlayer difference processing unit 522b and may supply, to the interlayer difference processing unit 522b, a video at a frame rate lower than the video supplied to the interlayer difference processing unit 522c. The image quality conversion unit 510 may thin out the photographic images according to the types of the features of the feature areas to convert the frame rate of the videos supplied to the interlayer difference processing units 522.

The interlayer difference processing unit 522d and the encoder 532d apply predictive coding to the background area video including a plurality of low resolution images. Specifically, the interlayer difference processing unit 522 generates difference images between the images and prediction images generated from other low resolution images. The encoder 532d quantizes a conversion factor obtained by converting the difference images to spatial frequency components and encodes the quantized conversion factor by entropy coding or the like. The predictive coding process may be applied to each partial area of the low resolution images.

The interlayer difference processing unit 522a applies predictive coding to a first feature area video including a plurality of first resolution images supplied from the image quality conversion unit 510. Similarly, the interlayer difference processing unit 522b and the interlayer difference processing unit 522c apply predictive coding to a second feature area video including a plurality of second resolution images and a third feature area video including a plurality of third resolution images, respectively. Hereinafter, specific operations of the interlayer difference processing unit 522a and the encoder 532a will be described.

The interlayer difference processing unit 522a decodes the first resolution images after encoding by the encoder 532d and enlarges the decoded images to images with the same resolution as the first resolution. The interlayer difference processing unit 522a generates different images between the enlarged images and the low resolution images. At this time, the interlayer difference processing unit 522a sets a difference value in the background area to 0. The encoder 532a encodes the difference images in the same way as the encoder 532d. The encoding process by the interlayer difference processing unit 522a and the encoder 532a may be applied to each partial area of the first resolution images.

In the encoding of a first resolution image, the interlayer difference processing unit 522a compares an amount of encoding predicted when the difference image between the first resolution image and the low resolution image is encoded and an amount of encoding predicted when the difference image between the first resolution image and the prediction image generated from another first resolution image is encoded. If the latter amount of encoding is smaller, the interlayer difference processing unit 522a generates a difference image between the first resolution image and the prediction image generated from the other first resolution image. If it is predicted that the amount of encoding is smaller when the image is encoded without calculating the difference between the first resolution image and the low resolution image or the prediction image, the interlayer difference processing unit 522a may not calculate the difference between the first resolution image and the low resolution image or the prediction image.

The interlayer difference processing unit 522a may not set the difference value in the background area to 0. In this case, the encoder 532a may set the data after encoding of the difference information in the areas other than the feature areas to 0. For example, the encoder 532a may set the conversion factor after conversion to the frequency components to 0. Motion vector information when the interlayer difference processing unit 522d has performed the predictive coding is supplied to the interlayer difference processing unit 522a. The interlayer difference processing unit 522a may use the motion vector information supplied from the interlayer difference processing unit 522d to calculate a motion vector for prediction image.

Operations of the interlayer difference processing unit 522b and the encoder 532b are substantially the same as the operations of the interlayer difference processing unit 522a and the encoder 532a except that the second resolution image is encoded and that the difference from the first resolution image after encoding by the encoder 532a may be calculated when the second resolution image is encoded. Therefore, the description will not be repeated. Similarly, operations of the interlayer difference processing unit 522c and the encoder 532c are substantially the same as the operations of the interlayer difference processing unit 522a and the encoder 532a except that the third resolution image is encoded and that the difference from the second resolution image after encoding by the encoder 532b may be calculated when the third resolution image is encoded. Therefore, the description will not be repeated.

As described, the image quality conversion unit 510 generates, from each of the plurality of photographic images, a low quality image with reduced image quality and a feature area image with higher quality than the low quality image at least in the feature areas. The difference processing unit 520 generates a feature area difference image indicating a difference image between an image of a feature area in the feature area image and an image of the feature area in the low quality image. The encoding unit 530 encodes the feature area difference image and the low quality image.

The image quality conversion unit 510 generates low quality images with reduced resolution from the plurality of photographic images, and the difference processing unit 520 generates feature area difference images between images of the feature areas in the feature area images and images enlarged from the images of the feature areas in the low quality images. The difference processing unit 520 has spatial frequency components obtained by converting the difference between the feature area image in the feature area and the enlarged image to the spatial frequency area and generates a feature area difference image in which the amount of data of the spatial frequency components is reduced in the areas other than the feature areas.

As described, the compression unit 232 encodes the differences of images between a plurality of layers with different resolutions to perform hierarchical encoding. As is clear from this, it is clear that part of the system of compression by the compression unit 232 of the present configuration includes a compression system based on H.264/SVC. To expand the layered compressed video, the image processing device 250 decodes the video data of each layer, and for the areas encoded based on the interlayer differences, executes an addition process with the photographic images decoded in the layers in which the differences are calculated. In this way, the photographic images with the original resolution can be generated.

[Description of Image Processing Device 250]

Figure 21:
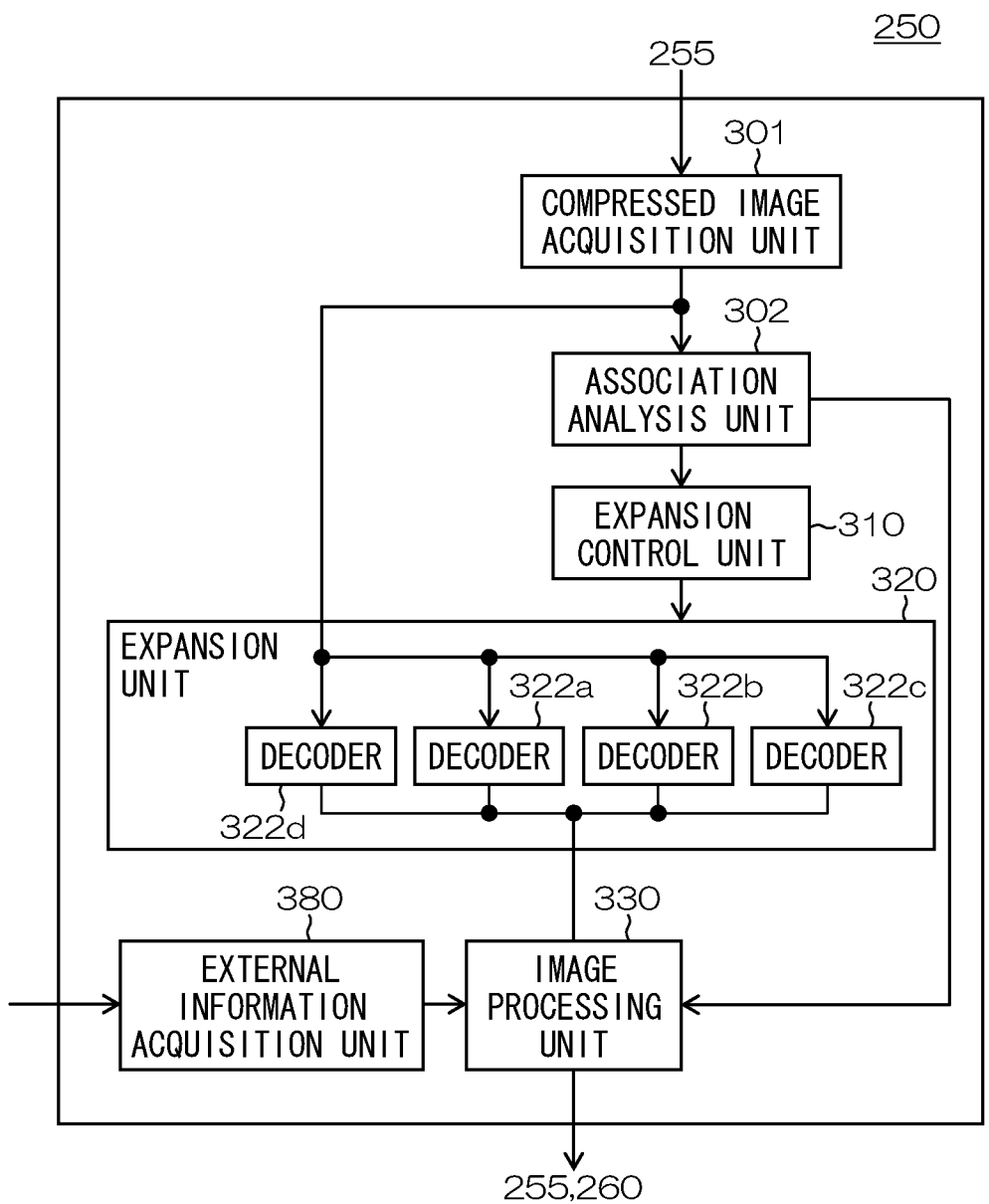
FIG. 21 is a block diagram illustrating an example of a configuration of an image processing device 250 in FIG. 13.

FIG. 21 illustrates an example of a block configuration of the image processing device 250 illustrated in FIG. 13. As illustrated in FIG. 21, the image processing device 250 includes a compressed image acquisition unit 301, an association analysis unit 302, an expansion control unit 310, an expansion unit 320, an external information acquisition unit 380, and an image processing unit 330. The expansion unit 320 includes a plurality of decoders 322a-d (hereinafter, collectively called "decoders 322").

The compressed image acquisition unit 301 acquires the compressed videos compressed by the image processing device 250. Specifically, the compressed image acquisition unit 301 acquires the compressed videos including a plurality of feature area videos and background area videos. More specifically, the compressed image acquisition unit 301 acquires the compressed videos accompanied by the feature area information.

The association analysis unit 302 separates the compressed videos into a plurality of feature area videos as well as background area videos and the feature area information and supplies the plurality of feature area videos and background area videos to the expansion unit 320. The association analysis unit 302 analyzes the feature area information and supplies the positions of the feature areas and the types of the features to the expansion control unit 310 and the image processing unit 330.

The expansion control unit 310 controls an expansion process by the expansion unit 320 according to the positions of the feature areas and the types of the features acquired from the association analysis unit 302. For example, the expansion control unit 310 causes the expansion unit 320 to expand the areas of the videos indicated by the compressed videos according to the compression system used by the compression unit 232 to compress the areas of the videos in accordance with the positions of the feature areas and the types of the features.

The decoders 322 decode one of the plurality of encoded feature area videos and background area videos. Specifically, the decoder 322a, the decoder 322b, the decoder 322c, and the decoder 322d decode the first feature area video, the second feature area video, the third feature area video, and the background area video, respectively.

The image processing unit 330 combines the plurality of feature area videos and background area videos expanded by the expansion unit 320 and generates one video. Specifically, the image processing unit 330 combines the images of the feature areas on the photographic images included in the plurality of feature area videos with the photographic images included in the background area videos to generate one display video. The image processing unit 330 may generate a display video in which the image quality of the feature areas is higher than the image quality of the background areas. The super-resolution image processing means using the tensor projection of the present invention can be used for the conversion process of the high image quality formation.

The image processing unit 330 outputs the feature area information and the display video acquired from the association analysis unit 302 to the display device 260 or the image DB 255 (see FIG. 13). The positions of the feature areas indicated by the feature area information, the types of the features of the feature areas, and the number of feature areas may be associated with the information for identifying the photographic images included in the display video, and the image DB 255 may be recorded in a non-volatile recording medium such as a hard disk.

The external information acquisition unit 380 acquires data used in image processing by the image processing unit 330 from the outside of the image processing device 250. The image processing unit 330 uses the data acquired by the external information acquisition unit 380 to execute the image processing. The data acquired by the external information acquisition unit 380 will be described in relation to FIG. 22.

(Example of Configuration of Image Processing Unit 330)

Figure 22:
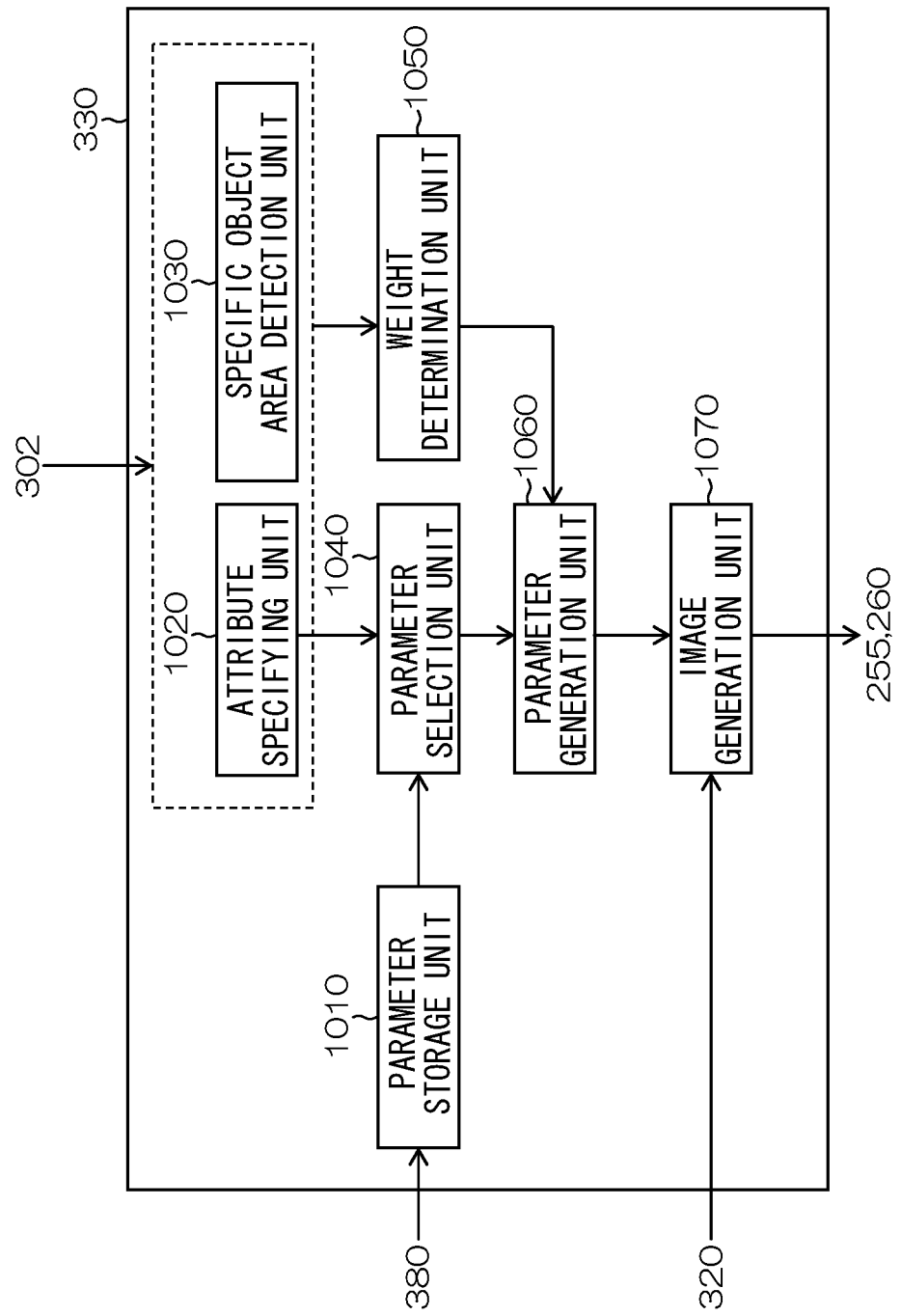
FIG. 22 is a block diagram illustrating an example of a configuration of an image processing unit 330 in FIG. 21.

FIG. 22 illustrates an example of a block configuration of the image processing unit 330 included in the image processing device 250 described in FIG. 21. As illustrated in FIG. 22, the image processing unit 330 includes a parameter storage unit 1010, an attribute specifying unit 1020, a specific object area detection unit 1030, a parameter selection unit 1040, a weight determination unit 1050, a parameter generation unit 1060, and an image generation unit 1070.

The parameter storage unit 1010 stores, in association with a plurality of attributes of subject images, a plurality of image processing parameters for increasing the image quality of the subject images with the attributes. The attribute specifying unit 1020 specifies the attributes of the subject images included in the input images. The input images may be the frame images obtained by the expansion unit 320. The parameter selection unit 1040 prioritizes and selects the plurality of image processing parameters stored in the parameter storage unit 1010 in association with the attributes that are in more conformity with the attributes specified by the attribute specifying unit 1020. The image generation unit 1070 uses the plurality of image processing parameters selected by the parameter selection unit 1040 to generate high quality images formed by increasing the image quality of the subject images included in the input images. The super-resolution image processing means using the tensor projection of the present invention is used for the conversion process of the high image quality formation.

An example of the attributes includes a state of the subject, such as the direction of the subject. More specifically, the parameter storage unit 1010 stores a plurality of image processing parameters in association with a plurality of attributes indicating the state of the subject imaged as a subject image. The attribute specifying unit 1020 specifies, from the subject image, the state of the subject imaged as the subject image included in the input image.

An example of the state of the subject includes the direction of the subject when the image is taken. The direction of the subject can be, for example, the direction of the face of a person as an example of the subject. In this case, the parameter storage unit 1010 stores a plurality of image processing parameters in association with a plurality of attributes indicating the direction of the subject taken as the subject image. The attribute specifying unit 1020 specifies, from the subject image, the direction of the subject taken as the subject image included in the input image.

The attribute can also be the type of the subject. Examples of the type of the subject include, sex of the person as the subject, age of the person, expression of the imaged person, gesture of the imaged person, posture of the imaged person, race of the imaged person, wearing material worn by the imaged person (such as glasses sunglasses, mask, and hat), and illumination state. The parameter storage unit 1010 may store a plurality of image processing parameters in association with a plurality of attributes including at least one of the various attributes. In this case, the attribute specifying unit 1020 specifies, from the subject image, the attributes of the person imaged as the subject image included in the input image.

The weight determination unit 1050 determines weights for the plurality of image processing parameters when the image quality of the subject image included in the input image is increased. Based on the weights determined by the weight determination unit 1050, the image generation unit 1070 uses the plurality of image processing parameters selected by the parameter selection unit 1040 to generate a high quality image formed by increasing the image quality of the input image. The weight determination unit 1050 may determine a greater weight for an image processing parameter associated with an attribute with a greater matching degree with respect to the specified attribute.

The parameter generation unit 1060 generates combined parameters obtained by combining a plurality of image processing parameters selected by the parameter selection unit 1040. The image generation unit 1070 uses the combined parameters generated by the parameter generation unit 1060 to increase the image quality of the subject image included in the input image to generate a high quality image.

The generation of the image processing parameters according to the attributes of the subject is described above. The image processing unit 330 may also change, on the image, the strength of the high image quality formation.

The parameter storage unit 1010 stores specific parameters, which are image processing parameters used to increase the image quality of the images of a specific object, and non-specific parameters, which are image processing parameters used to increase the image quality of the images in which an object is not specified. As described later, the non-specific parameters may be general-purpose image processing parameters with some advantageous effects of the high image quality information regardless of the object.

The specific object area detection unit 1030 detects, from the input image, a specific object area that is an area of the specific object. The specific object may be an object of the subject that should be detected as a feature area. The weight determination unit 1050 determines weights of the specific parameters and the non-specific parameters in the high image quality formation of the input image from which the specific object area is detected.

The weight determination unit 1050 determines a greater weight for the specific parameters than for the non-specific parameters in the image of the specific object area in the input image. This can properly increase the image quality of the specific object that should be detected as the feature area. The weight determination unit 1050 determines a greater weight for the non-specific parameters than for the specific parameters in the image of the non-specific object area that is an area other than the specified object area. This can prevent the high image quality formation by the image processing parameters dedicated to the specific object.

Based on the weights determined by the weight determination unit 1050, the image generation unit 1070 uses the specific parameters and the non-specific parameters to generate a high quality image obtained by increasing the image quality of the input image.

The parameter storage unit 1010 stores specific parameters calculated by studying using a plurality of images of a specific object as studying images (also called "training images") and non-specific parameters calculated by studying using a plurality of images that are not images of the specific object as studying images. As a result, specific parameters specialized in the specific object can be calculated. General-purpose specific parameters for a variety of objects can also be calculated.

In the prior studying, it is desirable to study not the luminance information of the studying images, but the image processing parameters using spatial variation information such as edge information of the studying images. The use of the edge information with reduced information of the low spatial frequency area can realize robust high image quality formation processing for an illumination variation, particularly, with respect for an illumination change of a low frequency.

The parameter generation unit 1060 may generate combined parameters by combining the non-specific parameters and the specific parameters by the weights determined by the weight determination unit 1050. The image generation unit 1070 may use the combined parameters generated by the parameter generation unit 1060 to increase the image quality of the input image to generate the high quality image.

In the example, an operation of generating the high quality image using a plurality of image processing parameters selected based on the attributes of the subject specified by the attribute specifying unit 1020 is described. The image generation unit 1070 may also use a different combination of the plurality of image processing parameters to increase the image quality of the subject images included in the input images. For example, the image generation unit 1070 may use a different combination of a plurality of predetermined image processing parameters to increase the image quality of the subject images included in the input images. The image generation unit 1070 may select at least one of the plurality of images obtained by increasing the image quality based on the comparison with the input images to set the selected image as the high quality image. For example, the image generation unit 1070 may prioritize and select, as the high quality image, an image with image content more similar to the input images among the plurality of images obtained by increasing the image quality.

The parameter selection unit 1040 may select a different combination of the plurality of image processing parameters based on the attributes of the subject specified from the input images. The image generation unit 1070 may use the selected plurality of image processing parameters to increase the image quality of the subject images included in the input images. The image generation unit 1070 may select at least one of the plurality of images obtained by increasing the image quality based on the comparison with the input images to set the selected image as the high quality image.

As described, even if the parameter storage unit 1010 stores a limited number of image processing parameters, the image processing device 250 can increase the image quality using the image processing parameters that can handle the images of the subject with a variety of attributes. Examples of the high image quality formation include high resolution formation, multi-gradation formation, multi-color formation, as well as noise reduction, artifact reduction, blur reduction, sharpness formation, and high frame rate formation. The parameter storage unit 1010 can store image processing parameters for the various high image quality formation processes.

The external information acquisition unit 380 described in FIG. 21 acquires the image processing parameters stored in the parameter storage unit 1010 (see FIG. 22) from the outside. The parameter storage unit 1010 stores the image processing parameters acquired by the external information acquisition unit 380. Specifically, the external information acquisition unit 380 acquires at least one of the specific parameters and the non-specific parameters from the outside. The parameter storage unit 1010 stores at least one of the specific parameters and the non-specific parameters acquired by the external information acquisition unit 380.

FIG. 23 illustrates a table format of an example the parameters stored in the parameter storage unit 1010. The parameter storage unit 1010 stores specific parameters A0, A1 . . . as image processing parameters for faces of persons in association with the directions of the faces. The specific parameters A0 and A1 are calculated in advance by prior studying in which the images of the corresponding directions of the faces are handled as the studying images.

An example of a high resolution formation process based on weighting and addition in pixel values of peripheral pixels of target pixel will be illustrated to describe a calculation process of the specific parameters A based on the prior studying. It is assumed here that a pixel value y of the target pixel is calculated by weighting and addition in pixel values $x_i$ (wherein, i=1 to n) of n peripheral pixels. More specifically, it is assumed that $y=\Sigma(w_i x_i)$. Here, E denotes an addition throughout i. The character $w_i$ denotes weighting factors for the pixel values $x_i$ of the peripheral pixels, and the weighting factors $w_i$ serve as the specific parameters A to be calculated in the prior studying.

It is assumed that m face images including imaged faces in a specific direction are used as the studying images. If the pixel values of the target pixels of k-th (where k=1 to m) studying images are $y_k$, $y_k=\Sigma w_i x_{ki}$ can be expressed. In this case, the weighting factors $w_i$ can be calculated by a computation process such as the least squares method. For example, $w_i$ that substantially minimizes a square of a vector, in which k-th elements $e_k$ are indicated by $e_k=y_k-\Sigma(w_i x_{ki})$, can be calculated by a computation process such as the least squares method. The specific parameters A corresponding to the face directions can be calculated by applying the calculation process of the specific parameters to the face images of a plurality of face directions.

The parameter storage unit 1010 also stores non-specific parameters B for objects that are not faces of persons. The non-specific parameters B are calculated in advance by prior studying in which images of a variety of subjects are handled as the studying images. The non-specific parameters B can be calculated by the same prior studying process as the specific parameters A. For example, the non-specific parameters B can be calculated using images other than persons, instead of face images, as the studying images in the prior studying process for calculating the specific parameters A.

Figure 24:
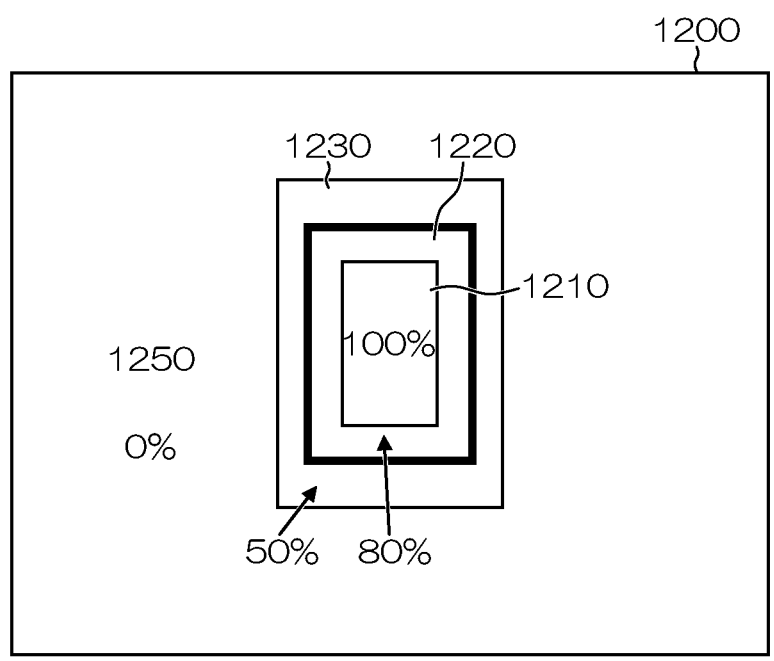
FIG. 24 is a diagram illustrating an example of weighting of a specific parameter.

FIG. 24 illustrates an example of weighting of a specific parameter. It is assumed that an area 1210 and an area 1220 inside a heavy line in an image 1200 are detected as feature areas. In the area 1210 more inside between the feature areas, the weight determination unit 1050 (see FIG. 22) determines that the weighting factor of the specific parameter is 100% and the weighting factor of the non-specific parameter is 0%. In the area 1220 closer to the non-feature area outside of the area 1210 in the feature areas (inside the heavy line frame), the weight determination unit 1050 determines that the weighting factor of the specific parameter is 80% and the weighting factor of the non-specific parameter is 20%.

In an area 1230 near the feature areas in the area outside of the feature areas, it determines that the weighting factor of the specific parameter is 50% and the weighting factor of the non-specific parameter is 50%. In an area 1250 further outside, it determines that the weighting factor of the specific parameter is 0% and the weighting factor of the non-specific parameter is 100%.

In this way, the weight determination unit 1050 (see FIG. 22) determines the weights so that the weights for the specific parameters are greater in the images of the areas more inside in the specific object areas of the input image. The weight determination unit 1050 also determines the weights so that the weights for the specific parameters are greater near the specific object areas in the images of the non-specific object areas that are areas other than the specific object areas. In this way, the weight determination unit 1050 reduces the weighting factors of the specific parameters step-by-step from the center of the feature areas to the outside and from the feature areas to the non-feature areas. Other than the step-by-step reduction of the weighting factors, the weight determination unit 1050 may continuously reduce the weighting factors in proportion to the distance from the center of the feature areas or the distance from the surrounding areas or the like of the feature areas. For example, the weight determination unit 1050 may determine the weighting factors with a value that decreases in terms of power or exponentially relative to a distance x, such as by reducing the value of the weighting factors relative to the distance x according to functions such as $1/x$, $1/x^2$, and $e^{-x}$.

The weight determination unit 1050 may control the weighting factors according to the detection reliability of the feature areas. Specifically, the weight determination unit 1050 sets greater weights for the specific parameters in the images of the specific object areas with greater detection reliability of the areas of the specific objects.

If there is a specific object in an area not detected as a feature area, whether the specific object exists may not be able to be determined even if the image quality of the area is increased by a general-purpose non-specific parameter. The image processing unit 330 executes a high image quality formation process with an effect of a specific parameter for specific object even in the area not detected as the feature area. Therefore, whether the specific object exists may be easily determined from the high quality image.

The specific parameters may be image processing parameters obtained by combining the plurality of image processing parameters described in relation to FIG. 23. For example, it is assumed that a detected feature area includes an image of the face of a person facing 15° to the side from the front face. In this case, the weight determination unit 1050 determines that the weighting factor for the specific parameter A0 is 25% and determines that the weighting factor for the specific parameter A1 is 75%. The parameter generation unit 1060 generates a combined parameter obtained by combining the specific parameter A0 and the specific parameter A1 with the weighting factors 25% and 75%, respectively. The image generation unit 1070 uses an image processing parameter obtained by weighting the combined parameter generated by the parameter combining unit and the non-specific parameter at the rate illustrated in FIG. 24 to increase the image quality.

For example, when the image processing parameters (specific parameters or non-specific parameter) for increasing the image quality by weighting and addition in the peripheral pixels is used, the parameter generation unit 1060 may weight and add the weighting factor determined by the weight determination unit 1050 to the weighting factor of the image processing parameter to calculate the combined parameter indicated by the obtained weighting factor. Other than the weighting factor, examples of the image processing parameter that can be added include spatial frequency components in the spatial frequency area and image data (for example, image data of the high frequency components).

Additionally, when the high image quality formation process is expressed by a vector computation, a matrix computation, or a tensor computation for a feature amount vector and the like, the parameter generation unit 1060 may generate the combined parameter by weighting and adding or multiplying a vector, a matrix, a tensor, an n-dimensional mixed normal distribution, or an n-dimensional mixed multinomial distribution as the image processing parameters. Here, n is an integer one or greater. For example, interpolation of the vector in the feature vector space may be able to reduce the blur due to combining on the vector that cannot be expressed by a scalar. For example, a computation of handling a sum of a feature vector obtained by multiplying a feature vector in a direction of 0° by a factor 0.25 and a feature vector obtained by multiplying a feature vector in a direction of 20° by a factor 0.75 as a feature vector in a direction of 15° can be illustrated as an example. Interpolation on the space of the locality preserving projection (LPP) may be able to further reduce the combined blur. The parameter generation unit 1060 can calculate the combined parameter from the specific parameter and the non-specific parameter. The parameter generation unit 1060 can also calculate the combined parameter from a plurality of different specific parameters.

In the generation of a high quality image using the specific parameter and the non-specific parameter, the image generation unit 1070 may generate the high quality image by adding the image information obtained by image processing using the specific parameter and the image information obtained by image processing using the non-specific parameter based on the weighting factors determined by the weight determination unit 1050. Additionally, the image generation unit 1070 may use the non-specific parameter to apply image processing to the image information obtained by image processing using the specific parameter to generate the high quality image. A similar process can be applied to a high image quality formation process using a plurality of specific parameters. Examples of the image data here include pixel values, a feature amount vector in the feature amount space, a matrix, an n-dimensional mixed normal distribution, and an n-dimensional mixed multinomial distribution. For example, interpolation of the vector in the feature vector space may be able to reduce the blur due to combining on the vector that cannot be expressed by the scalar.

In the high image quality formation process described in FIGS. 23 and 24, the parameter selection unit 1040 has selected the plurality of image processing parameters used to increase the image quality of the feature areas based on the direction of the face of the person specified from the image in the feature areas. The image generation unit 1070 uses the plurality of image processing parameters selected by the parameter selection unit 1040 to generate one high quality image.

Additionally, the image generation unit 1070 may generate a plurality of images formed by increasing the image quality of the feature areas from a plurality of combinations of the image processing parameters stored in the image generation unit 1070. The image generation unit 1070 may generate a high quality image formed by increasing the image quality of the feature area from an image most similar to the image in the feature area among the obtained plurality of images.

For example, the image generation unit 1070 uses the combined parameter of the specific parameter A0 corresponding to the direction of 0° and the specific parameter A1 corresponding to the direction of 20° to generate an image formed by increasing the quality of the image of the feature area. The image generation unit 1070 further uses the combined parameter of other one or more combinations of the specific parameters to generate one or more images formed by increasing the quality of the image of the feature area.

The image generation unit 1070 compares the generated plurality of images with the image in the feature area to calculate a degree of coincidence of the image content. The image generation unit 1070 determines the image with the highest degree of coincidence among the generated plurality of images as the high quality image.

In the generation of the plurality of images formed by increasing the quality of the image in the feature area, the image generation unit 1070 may increase the image quality of the image in the feature area by a plurality of combined parameters based on a plurality of predetermined sets of specific parameters. In this case, the parameter selection unit 1040 may select the plurality of predetermined sets of specific parameters without the execution of the process of specifying the direction of the face by the attribute specifying unit 1020.

Alternatively, the parameter selection unit 1040 may select a plurality of sets of the specific parameters based on the direction of the face of the person specified from the image in the feature area. For example, the parameter selection unit 1040 associates and stores the information for specifying the plurality of sets of the specific parameters and the information for specifying the direction of the face of the person and may select a plurality of sets of the specific parameters stored in association with the direction of the face of the person specified from the image in the feature area. The image quality of the image in the feature area may be increased by the plurality of combined parameters based on the plurality of selected sets to generate a plurality of images formed by increasing the image quality of the image of the feature area.

In the generation of the plurality of images formed by increasing the quality of the image of the feature area, the image generation unit 1070 may increase the quality of the image in the feature area based on the plurality of specific parameters. The image generation unit 1070 may generate an image most similar to the image in the feature area among the obtained plurality of images as the high quality image formed by increasing the image quality of the feature area. In this case, the parameter selection unit 1040 may select a plurality of predetermined specific parameters without the execution of the process for specifying the direction of the face by the attribute specifying unit 1020, or the parameter selection unit 1040 may select a plurality of specific parameters based on the direction of the face of the person specified from the image in the feature area.

As described in relation to FIG. 23, the image processing parameter (specific parameter) for increasing the image quality of the face image in a specific face direction can be calculated from the studying image in the specific face direction. The image processing parameters can be calculated in the same way for other plurality of face directions to calculate the image processing parameters corresponding to the plurality of face directions. The parameter storage unit 1010 stores in advance the calculated image processing parameters in association with the corresponding face directions. Although the image processing parameters for increasing the image quality of the face image may be image processing parameters for increasing the image quality of the entire face, the image processing parameters may be image processing parameters for increasing the image quality of at least part of the objects included in the face images, such as an image of eyes, an image of mouth, an image of nose, an image of ears.

The face direction is an example of the direction of the subject, and in the same way as for the direction of the face, a plurality of image processing parameters corresponding to the directions of a plurality of subjects can be calculated for the directions of other subjects. If the subject is a person, the direction of a human body can be illustrated as the direction of the subject, and more specifically, the direction of torso, the direction of hands, and the like can be illustrated as the direction of the human body. If the subject is not a person, a plurality of image processing parameters for increasing the image quality of the subject images with the imaged subject facing a plurality of directions can be calculated in the same way as for the face images.

The direction of the subject is an example of the state of the subject, and the state of the subject can also be classified by expressions of a person. In this case, the plurality of image processing parameters stored in the parameter storage unit 1010 increase the image quality of images of the face with different specific expressions. For example, the plurality of image processing parameters stored in the parameter storage unit 1010 increase the image quality of the faces when the person is in emotional states, the face when the person is in a nervous state, and the like.

The state of the subject can also be classified by gestures of a person. In this case, the plurality of image processing parameters stored in the parameter storage unit 1010 increase the image quality of the images of the person in the state of different specific gestures. For example, the plurality of image processing parameters stored in the parameter storage unit 1010 increase the image quality of an image of a person running, an image of a person walking at a quick pace, an image of a person about to run, an image of a person hunting for a thing, and the like.

The state of the subject can also be classified by postures of a person. In this case, the plurality of image processing parameters stored in the parameter storage unit 1010 increase the image quality of the images of the person in the state of different specific postures. For example, the plurality of image processing parameters stored in the parameter storage unit 1010 increase the image quality of an image of a person bending the back, an image of a person putting hands in pockets, an image of a person crossing the arms, an image of a person in which the directions of the face and the body do not match, and the like.

The state of the subject can also be classified by wearing materials of a person. In this case, the plurality of image processing parameters stored in the parameter storage unit 1010 increase the image quality of the images of the person in the state of wearing different specific wearing materials. For example, the image processing parameters stored in the parameter storage unit 1010 increase the image quality of an image of a person wearing glasses, an image of a person wearing sunglasses, an image of a person wearing a mask, an image of a person wearing a hat, and the like.

As described, the subject is classified into a plurality of attributes according to a plurality of states of the subject. The subject can also be classified into a plurality of attributes by the type of the subject. An example of the type of the subject includes the race of a person. Examples of the race of a person include a regionally classified race, such as an Asian race and a European race, and a physical anthropologically classified race. In this case, the plurality of image processing parameters stored in the parameter storage unit 1010 increase the image quality of the images of persons classified into corresponding races.

As for the type of the subject, classification by sex of the person, such as male and female, is possible. In this case, the plurality of image processing parameters stored in the parameter storage unit 1010 increase the image quality of the images of the persons of the corresponding sex, such as images of male or female. As for the type of the subject, classification by age groups of persons is possible. In this case, the plurality of image processing parameters stored in the parameter storage unit 1010 increase the image quality of the images of the persons of corresponding age, such as images of teenagers and images of people in their twenties.

The attributes of the subject images are defined by the illustrated types of subject, the plurality of states of subject, or a combination of the types and the states. The parameter storage unit 1010 stores in advance the image processing parameters for increasing the image quality of the subject images belonged to the attributes in association with the defined attributes. The image processing parameters stored in the parameter storage unit 1010 can be calculated by a similar method as the calculation method of the image processing parameters for face direction. For example, when the attributes are defined by expressions, a plurality of images with laughing faces can be studied in advance as studying images to calculate the image processing parameters for increasing the image quality of the images of laughing faces. Images of other expressions, such as images of angry faces, can be similarly studied in advance to calculate a plurality of image processing parameters for increasing the image quality of the face images of the expressions. The image processing parameters can be similarly calculated for the attributes defined by gestures, postures, wearing materials, race, sex, age, and the like.

The attribute specifying unit 1020 can apply a classifier calculated in advance by boosting, such as by AdaBoost, to the subject image to specify the attributes of the subject image. For example, a plurality of face images with the face in a specific direction are used as the teacher images, and weak classifiers are integrated by a boosting process to generate the classifier. Whether the image is a face image of the specific face direction can be determined according to a right or wrong classification result obtained when the subject image is applied to the generated classifier. For example, when a right classification result is obtained, the input subject image can be determined as the face image in the specific face direction.

A plurality of classifiers corresponding to the face directions can be similarly generated for other plurality of face directions by generating the classifier by the boosting process. The attribute specifying unit 1020 can apply the plurality of classifiers to the subject images to specify the face directions based on right or wrong classification results obtained from the classifiers. Other than the face direction, the classifiers generated for the attributes by the boosting process can be applied to specify one or more other attributes defined by expressions, sex, and the like. Other than the studying by boosting, the attribute specifying unit 1020 can apply the classifiers studied for the attributes by various methods, such as a linear discrimination method and a mixed Gaussian mode, to the subject images to specify the attributes.

(Example of Configuration of Display Device 260)

Figure 25:
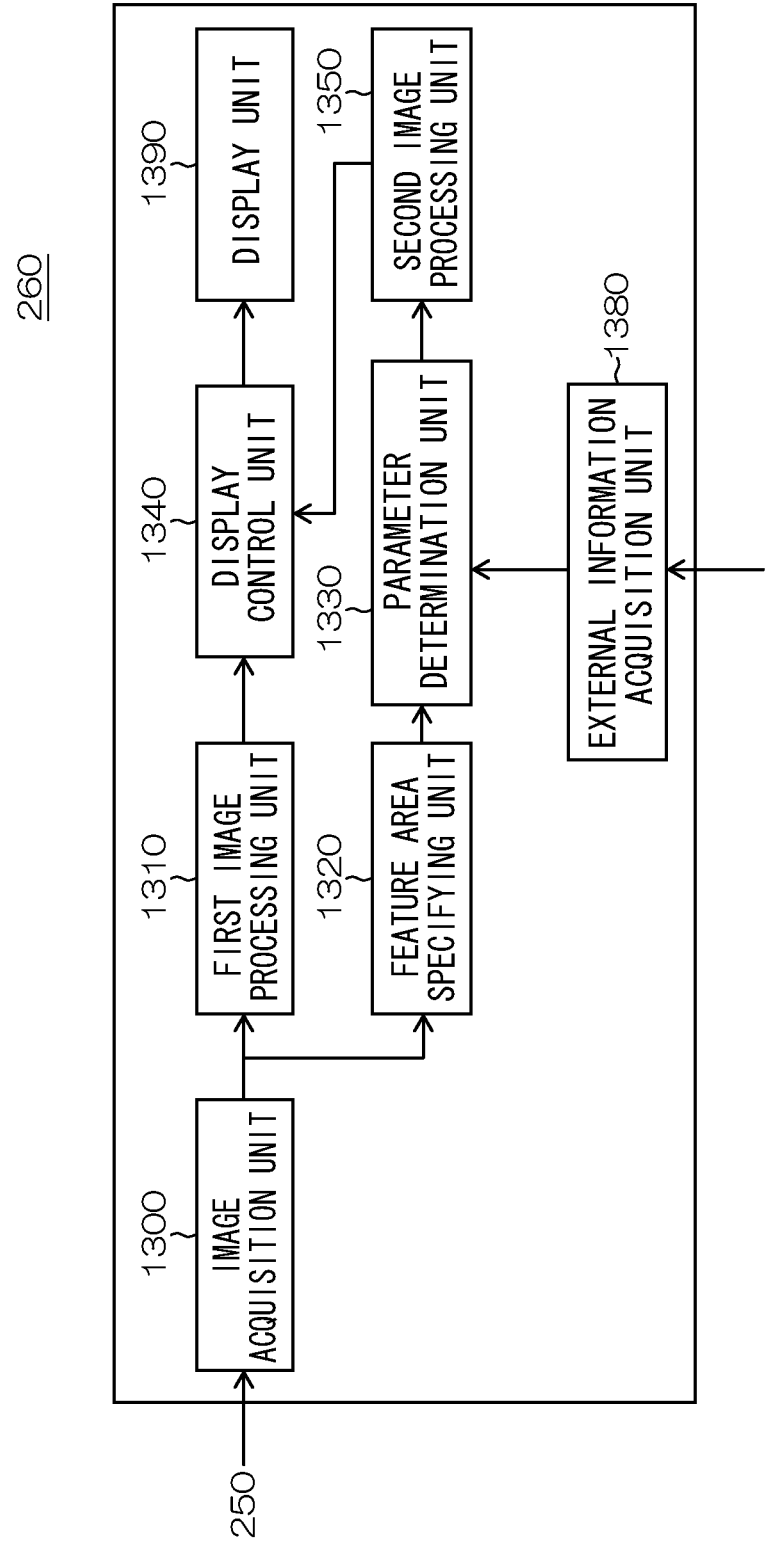
FIG. 25 is a block diagram illustrating an example of a configuration of a display device 260 in FIG. 13.

FIG. 25 illustrates an example of a block configuration of the display device 260 in FIG. 13. As illustrated in FIG. 25, the display device 260 includes an image acquisition unit 1300, a first image processing unit 1310, a feature area specifying unit 1320, a parameter determination unit 1330, a display control unit 1340, a second image processing unit 1350, an external information acquisition unit 1380, and a display unit 1390.

The image acquisition unit 1300 acquires input images. The input images here may be frame images included in a video received from the image processing device 250. The first image processing unit 1310 uses predetermined image processing parameters to generate predetermined quality images obtained by increasing the image quality of the input images. For example, to increase the resolution, the first image processing unit 1310 uses image processing parameters of a system in which the required amount of computation is smaller than a predetermined value, such as a simple interpolation enlargement process, to generate the predetermined quality images.

The display control unit 1340 displays the predetermined quality images generated by the first image processing unit 1310 on the display unit 1390. In this way, the display unit 1390 displays the predetermined quality images.

The feature area specifying unit 1320 specifies a plurality of feature areas in the input images. The feature area specifying unit 1320 may specify the plurality of feature areas in the input images when the display unit 1390 displays the predetermined quality images. The image processing device 250 may attach information for specifying the feature areas to a video as auxiliary information and transmit the information to the display device 260. The feature area specifying unit 1320 may extract the information for specifying the feature areas from the auxiliary information of the video acquired by the image acquisition unit 1300 to specify the plurality of feature areas.

The parameter determination unit 1330 determines, for each of the plurality of feature areas, image processing parameters for further increasing the image quality of the images of the plurality of feature areas. For example, the parameter determination unit 1330 determines, for each of the plurality of feature areas, the image processing parameters for increasing the image quality of the images of the plurality of feature areas at different strengths. "Increasing the image quality at different strengths" may denote increasing the image quality with different amounts of computation, increasing the image quality with different amounts of computation per unit area, or increasing the image quality by high image quality formation systems with different required amounts of computation.

The second image processing unit 1350 uses the image processing parameters determined by the parameter determination unit 1330 to generate a plurality of high quality feature area images formed by increasing the image quality of the images of the plurality of feature areas. The display control unit 1340 displays the plurality of feature area images in the plurality of feature areas in the predetermined quality images displayed by the display unit 1390. In this way, the display control unit 1340 displays the high quality images in place of the predetermined quality images already displayed by the display unit 1390 when the high quality images are generated. Since the display unit 1390 quickly generates and displays the predetermined quality images, the user can observe a monitoring video in certain image quality substantially without a delay.

The parameter determination unit 1330 may determine the image processing parameters for the plurality of feature areas based on the importance of the images of the plurality of feature areas. Information indicating the importance may be attached to the auxiliary information. The importance may be predetermined according to the type of the subject of the feature areas. The user who observes the display unit 1390 may set the importance of each type of the subject. The parameter determination unit 1330 determines the image processing parameters for increasing the image quality of the feature areas with greater importance at a higher strength. Therefore, the user can observe images in which important feature areas have higher image quality.

The parameter determination unit 1330 determines the image processing parameters for each of the plurality of feature areas based on the types of features of the images of the plurality of feature areas. The parameter determination unit 1330 may also determine the image processing parameters for each of the plurality of feature areas based on the types of the subjects imaged in the plurality of feature areas. In this way, the parameter determination unit 1330 may directly determine the image processing parameters according to the types of the subjects.

The parameter determination unit 1330 determines the image processing parameters based on the amount of process required to increase the image quality of the plurality of feature areas in the second image processing unit 1350. Specifically, the parameter determination unit 1330 determines the image processing parameters for increasing the image quality at a higher strength when the required amount of process is small.

For example, the parameter determination unit 1330 may determine the image processing parameters for increasing the resolution at a higher strength when the areas of the plurality of feature areas are small. The second image processing unit 1350 uses the image processing parameters determined by the parameter determination unit 1330 to generate a plurality of high quality feature area images formed by increasing the resolutions of the images of the plurality of feature areas. The parameter determination unit 1330 may determine the image processing parameters for increasing the image quality at a higher strength when the number of pixels of the plurality of feature areas is smaller.

The parameter determination unit 1330 determines the image processing parameters based on the processing capacity as an acceptable throughput in the second image processing unit 1350. Specifically, the parameter determination unit 1330 may determine the image processing parameters for increasing the image quality at a higher strength when the processing capacity is smaller.

Therefore, the extent of the high image quality formation can be controlled according to the amount of computation that can be processed by the second image processing unit 1350. Therefore, an excessive load on the display unit 1390 by the high image quality formation process and a delay in the display of the images may be prevented. If there is a room in the amount of computation by the display unit 1390, high quality images are quickly generated, and the images can be observed.

As described, the high resolution formation can be illustrated as the high image quality formation. Specifically, the parameter determination unit 1330 determines, for each of the plurality of feature areas, the image processing parameters for increasing the resolution of the images of the plurality of feature areas. The second image processing unit 1350 uses the image processing parameters determined by the parameter determination unit 1330 to generate a plurality of high quality feature area images formed by increasing the resolution of the images of the plurality of feature areas. The increase in the resolution at a high strength includes highly accurately increasing the resolution and generating high quality images with more pixels.

Examples of the high image quality formation process include, in addition to the high resolution formation, multi-gradation formation, multi-color formation process, noise reduction, artifact reduction, blur reduction, and sharpness formation. In the same way as for the high resolution formation, the parameter determination unit 1330 determines, for the various high image quality formations, the image processing parameters for various high image quality formations in each of the plurality of feature areas. The second image processing unit 1350 can use the image processing parameters determined by the parameter determination unit 1330 to generate the plurality of high quality feature area images obtained by applying various high image quality formations to the images of the plurality of feature areas.

As described, the image acquisition unit 1300 may acquire a plurality of video configuration images included in a video as the input images. The parameter determination unit 1330 determines, for each of the plurality of feature areas, the image processing parameters for increasing the frame rate of the plurality of feature areas. The second image processing unit 1350 may use the image processing parameters determined by the parameter determination unit 1330 to generate a plurality of high quality feature area images formed by increasing the frame rate.

The parameter determination unit 1330 determines the image processing parameters based on the frame rate of the video. Specifically, the parameter determination unit 1330 may determine the image processing parameters for increasing the image quality at a higher strength when the frame rate of the video is smaller. The second image processing unit 1350 may use the determined image processing parameters to increase the image quality of the input images to generate a video formed by increasing the image quality. As in the high image quality formation by the image processing device 250, the high image quality formation by the second image processing unit 1350 may include concepts of high resolution formation, multi-color formation, multi-gradation formation, noise reduction, artifact reduction for reducing artifacts such as block noise and mosquito noise, blur reduction, and sharpness formation. The second image processing unit 1350 can generate the high quality images by the processes.

In this way, the display device 260 can determine the strength of the high image quality formation according to the amount of data of the images for high image quality formation and the amount of computation that can be allocated to the high image quality formation process. The display device 260 can quickly provide images with a certain quality to the user and can prevent a significant delay of the display of the images subjected to the high image quality formation process. Therefore, the display device 260 can prevent the excessive load due to the high image quality information process and can smoothly replay the video provided from the image processing device 250.

The external information acquisition unit 1380 acquires determination conditions for determining the image processing parameters for the feature areas from the outside of the display device 260. The parameter determination unit 1330 determines the image processing parameters for the plurality of feature areas based on the determination conditions acquired by the external information acquisition unit 1380. Examples of the determination conditions include parameters of the importance of the feature areas, the type of the features of the feature areas, the required amount of process, the area of the feature areas, the number of pixels of the feature areas, and the processing capacity.

Figure 26:
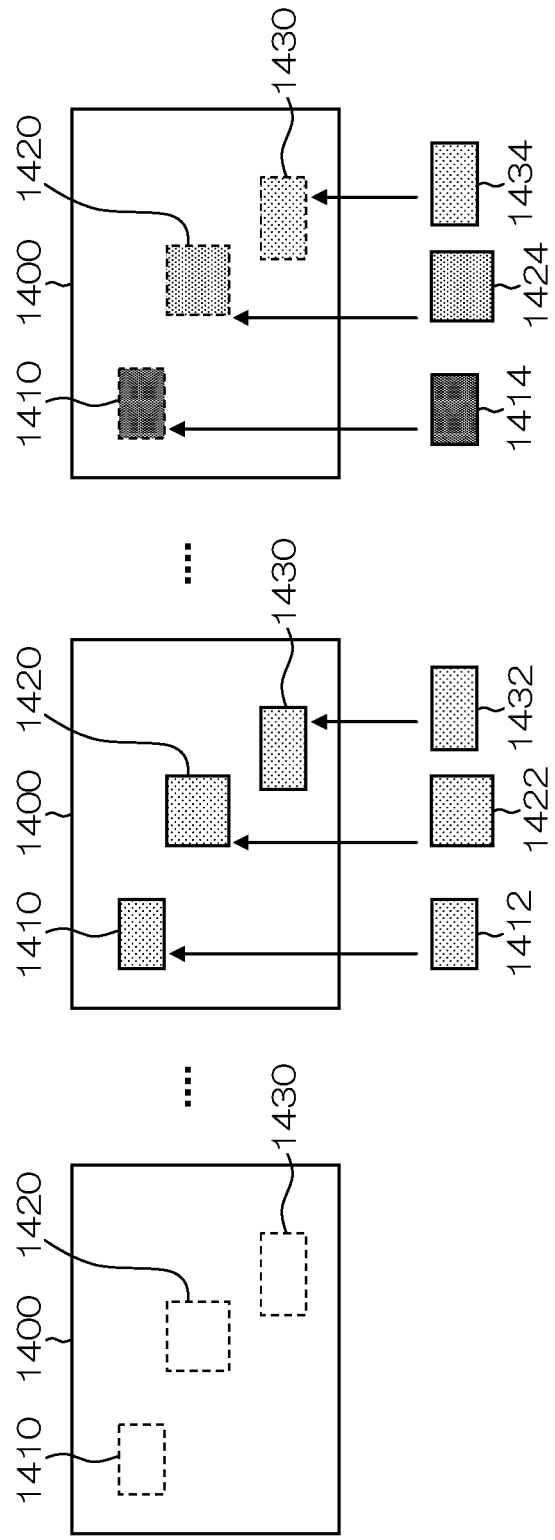
FIG. 26 is a diagram illustrating an example of a display area of image.

FIG. 26 illustrates an example of a display area 1400 of images. It is assumed that the display area 1400 is an area where the display unit 1390 displays an input image. It is assumed here that three feature areas are specified from the input image. Images of the feature areas are displayed in a feature region area 1410, a feature region area 1420, and a feature region area 1430 of the display area 1400.

When the image acquisition unit 1300 described in FIG. 25 acquires an input image, the display control unit 1340 displays the acquired input image on the display area 1400 of the display unit 1390.

While the input image is displayed, the second image processing unit 1350 applies a predetermined high resolution formation process with a required amount of computation smaller than a predetermined value, such as simple interpolation, to the images of the feature areas to generate predetermined quality images of the images of the feature areas (first high resolution formation stage). As for the strength of the high resolution formation in the first high resolution formation stage, the second image processing unit 1350 applies a high resolution formation process at a predetermined strength regardless of the number of pixels of the feature areas, the amount of data of images such as the frame rate, the importance of the feature areas, the type of the subject, and the computation tolerance in the second image processing unit 1350. The amount of computation required to apply the high resolution formation process at the predetermined strength to the entire input image may be always allocated to the second image processing unit 1350.

When a predetermined quality image 1412, a predetermined quality image 1422, and a predetermined quality image 1432 are generated after the completion of the first high resolution formation stage, the display control unit 1340 displays the predetermined quality image 1412, the predetermined quality image 1422, and the predetermined quality image 1432 to the corresponding feature region area 1410, the feature region area 1420, and the feature region area 1430, respectively.

In a state that the predetermined quality image 1412, the predetermined quality image 1422, and the predetermined quality image 1432 are displayed, the second image processing unit 1350 executes a high resolution formation process at strengths determined for the feature areas by the parameter determination unit 1330 to generate high quality images of the images of the feature areas (second high resolution formation stage). In the second high resolution formation stage, the strengths of the high resolution formation are strengths determined by the parameter determination unit 1330, and the strengths of the high resolution formation depend on the amount of data of images such as the number of pixels of the feature areas and the frame rate, the importance of the feature areas, the type of the subject, and the computation tolerance in the second image processing unit 1350.

When a high quality image 1414, a high quality image 1424, and a high quality image 1434 are generated after the completion of the second high resolution formation stage, the display control unit 1340 displays the high quality image 1414, the high quality image 1424, and the high quality image 1434 on the corresponding feature region area 1410, the feature region area 1420, and the feature region area 1430, respectively.

In this way, the second image processing unit 1350 increases the resolution at a strength according to the amount of computation required for the current amount of load and high image quality formation. Therefore, high quality images can be quickly provided to the user within a possible range.

<Another Example of Embodiment of Image Processing System>

Figure 27:
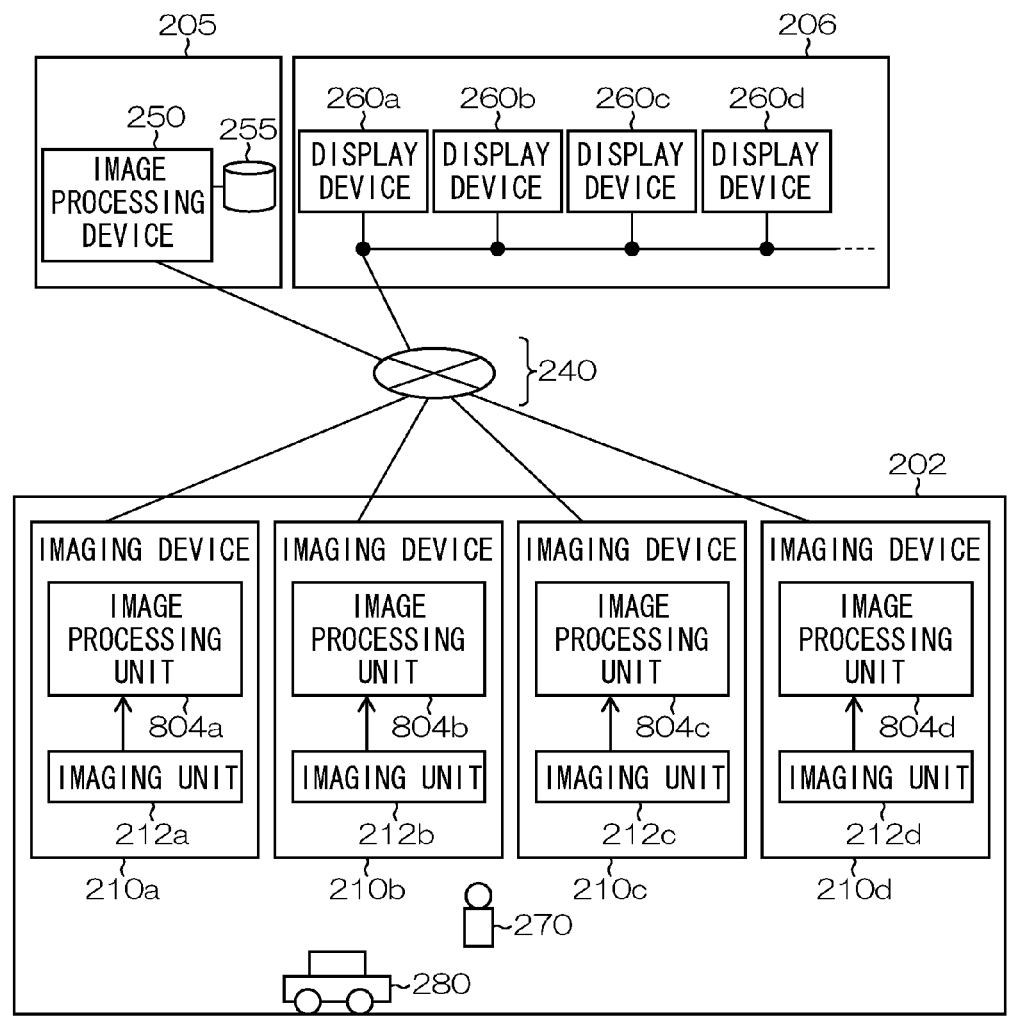
FIG. 27 is a configuration diagram illustrating an example of an image processing system according to another embodiment.

FIG. 27 illustrates an example of the image processing system 201 according to another embodiment. The configuration of the image processing system 201 according to the present embodiment is the same as the configuration of the image processing system 200 described in FIG. 13, except that the imaging devices 210*a-d* include image processing units 804*a-d* (hereinafter, collectively called "image processing units 804"), respectively.

The image processing units 804 include constituent elements except the image acquisition unit 222 among the constituent elements included in the image processing device 220 described in FIG. 13. Functions and operations of the constituent elements included in the image processing units 804 may be substantially the same as the functions and the operations of the constituent elements included in the image processing device 220 except that a video imaged by the imaging unit 212 is processed instead of the constituent elements included in the image processing device 220 processing a video obtained by the compressed video expansion unit 224 through the expansion process. The same advantageous effects as the advantageous effects described in relation to the image processing system 200 from FIGS. 13 to 26 can also be obtained in the image processing system 201 with the configuration.

The image processing units 804 may acquire a video including a plurality of photographic images expressed in an RAW format from the imaging unit 212 to compress, in the RAW format, the plurality of photographic images expressed in the RAW format included in the acquired video. The image processing units 804 may detect one or more feature areas from the plurality of photographic images expressed in the RAW format. The image processing units 804 may compress the video including the compressed plurality of photographic images in the RAW format. The image processing units 804 can compress the video by the compression method described as an operation of the image processing device 220 in relation to FIGS. 13 to 18. The image processing device 250 can expand the video acquired from the image processing units 804 to acquire the plurality of photographic images expressed in the RAW format. The image processing device 250 enlarges, area-by-area, the plurality of photographic images expressed in the RAW format acquired by the expansion and executes the synchronization process area-by-area. At this time, the image processing device 250 may execute more accurate synchronization process in the feature areas compared to the areas other than the feature areas.

The image processing device 250 may apply a super-resolution process to the images of the feature areas in the photographic images obtained by the synchronization process. The means of super-resolution using the tensor projection of the present invention can be applied as the super-resolution process in the image processing device 250.

The image processing device 250 may apply the super-resolution process to each object included in the feature areas. For example, when the feature areas include face images of a person, the image processing device 250 applies the super-resolution process to each face region (for example, eyes, nose, and mouth) as an example of the object. In this case, the image processing device 250 stores studying data, such as a model described in Japanese Patent Application Laid-Open No. 2006-350498, for each face region (for example, eyes, nose, and mouth). The image processing device 250 may use the studying data selected for each face region included in the feature areas to apply the super-resolution process to the images of the face regions.

The studying data, such as a model, may be stored for each combination of a plurality of expressions, a plurality of face directions, and a plurality of illumination conditions. Examples of the expressions include faces in emotional states as well as a serious look, and examples of the face direction include front, upward, downward, rightward, leftward, and backward. Examples of the illumination conditions include conditions related to the illumination strength and the direction of the illumination. The image processing device 250 may use the studying data corresponding to a combination of the face expressions, face directions, and illumination conditions to apply the super-resolution process to the face images.

The face expressions and the face directions can be specified based on the image content of the face images included in the feature areas. The expression can be specified from the shape of the mouth and/or eyes, and the face direction can be specified from the positional relationship between the eyes, mouth, nose, and ears. The illumination strength to the face and the illumination direction can be specified based on the image content of the face image, such as the position and the size of a shade. The image processing units 804 specify the face expressions, the face directions, and the illumination conditions, and the output unit 236 may transmit the specified face expressions, face directions, and illumination conditions in association with the images. The image processing device 250 may use the studying data corresponding to the face expressions, the face directions, and the illumination conditions received from the output unit 236 to execute the super-resolution process.

Other than the model expressing the entire face, a model of each region of the face can be used as the studying data, such as a model. Additionally, a model of the face of each sex and/or race can be used. The model can be stored not only for the persons, but also for each type of objects to be monitored, such as vehicles and ships.

In this way, the image processing device 250 can use the locality preserving projection (LPP) to reconfigure the images of the feature areas. In addition to the locality preserving projection (LPP), other methods for preserving the locality, such as locally linear embedding (LLE), can be used as an image reconfiguration method by the image processing device 250 and a studying method for the image reconfiguration.

In addition to the model described in Japanese Patent Application Laid-Open No. 2006-350498, the studying data may include low frequency components and high frequency components of the images of the objects extracted from a multiplicity of sample images of the objects. The low frequency components of the images of the objects may be clustered by the k-means method or the like for each type of the plurality of objects to cluster the low frequency components of the images of the objects into a plurality of clusters for each type of the plurality of objects. A representative low frequency component (for example, a value of a center of gravity) may be defined cluster by cluster.

The image processing device 250 extracts the low frequency components from the images of the objects included in the feature areas in the graphic images. From the clusters of the low frequency components extracted from the sample images of the object of the type of the extracted object, the image processing device 250 specifies a cluster in which the value matching the extracted low frequency components is defined as a representative low frequency component. The image processing device 250 specifies a cluster of the high frequency component associated with the low frequency component included in the specified cluster. In this way, the image processing device 250 can specify the clusters of the high frequency components correlated to the low frequency components extracted from the object included in the photographic images. The image processing device 250 may use a high frequency component that represents the clusters of the specified high frequency components to convert the image of the object to a high quality image with higher image quality. For example, the image processing device 250 may add, to the image of the object, the high frequency component selected for each object with a weight according to the distance from the center of each object to the position to be processed on the face. The representative high frequency component may be generated by closed-loop studying. In this way, the image processing device 250 selects and uses, for each object, desirable studying data from the studying data generated by studying in each object, and the image processing device 250 may be able to increase the image quality of the images of the object at a higher accuracy.

The image processing device 250 can also use the stored low frequency components and high frequency components to increase the image quality of the input images without clustering by the k-means method and the like. For example, the image processing device 250 stores pairs of low resolution edge components as the edge components extracted from the patches in low resolution studying images and high resolution edge components as the edge components extracted from the patches in high resolution studying images. The edge components may be stored as vectors on the eigenspace of the LPP and the like.

To increase the image quality of the input image as a target of the high image quality formation, the image processing device 250 extracts the edge components in each patch from an enlarged image obtained by enlarging the input image by a predetermined method such as bicubic. The image processing device 250 calculates, on the eigenspace of the LPP and the like, norms between the extracted edge components and the stored edge components for each patch in the input image. The image processing device 250 selects, from the stored patches, a plurality of patches in which norms smaller than a predetermined value are calculated. For the target patches and the surrounding patches, the image processing device 250 sets a Markov random field of the extracted edge components and the high resolution edge components of the plurality of selected patches. The image processing device 250 uses loopy belief propagation (LBP) and the like to solve an energy minimization problem of the Markov random field model set for each target patch to select, from the stored high resolution edge components and for each target patch, the high resolution edge components to be added to the image in each target patch. The image processing device 250 adds the high resolution edge components selected in the patches to the image components of the patches of the enlarged image to generate a high quality image.

Additionally, the image processing device 250 can also use a Gaussian mixture model of a plurality of classes to increase the image quality of the input images. For example, image vectors of the patches in the low resolution studying images and the image vectors of the patches in the high resolution studying images are set as studying data. Cluster vectors obtained from the image vectors of the patches in the low resolution studying images are used to calculate an average and a dispersion of the density distribution corresponding to the classes in the Gaussian mixture model and weights for the classes based on an EM algorithm and the like. The image processing device 250 stores the average, the dispersion, and the weights as studying data. To increase the image quality of the input images as targets of the high image quality formation, the image processing device 250 uses the image vectors of the patches in the input images, the cluster vectors obtained from the image vectors, as well as the average, the dispersion, and the weights stored as the studying data to generate the high quality images.

Additionally, the image processing device 250 can also use contour information extracted from an input image to generate high quality images only from the input image. For example, to increase the resolution of specific image areas near the contour extracted from the input image, the image processing device 250 can arrange, in the specific image areas, pixel values of the pixels included in other areas along the contour to generate the high quality image formed by increasing the resolution of the specific image areas. For example, the image processing device 250 can determine on which positions in the specific image areas the pixel values of the pixels will be arranged based on the positional relationship between the positions of the pixels included in the other areas and the position of the contour and arrange the pixel values on the determined positions to increase the resolution of the specific image areas.

The image processing device 250 may execute the high resolution formation process using the contour information only near the edge areas including the edge in the input image. The resolution may be increased by a filtering system and the like in image areas other than the edge areas. For example, the image processing device 250 may use the filtering system to increase the resolution in flat areas from which an amount of edge smaller than a predetermined amount is extracted. In texture areas from which an amount of edge greater than a predetermined amount is extracted, the image processing device 250 may increase the resolution by correcting the image formed by increasing the resolution using the filter system so that the conditions generated from the input image are satisfied.

As described, the high image quality formation process using the low frequency components and the high frequency components, the Gaussian mixture model, and the high resolution formation process using the contour information can be used to increase the image quality of the image in which an object is not specified. The parameter storage unit 1010 can store the parameters used in the high image quality formation by the image processing device 250, such as the data of the high frequency components corresponding to the low frequency components, the filters for increasing the resolution of the flat areas, the studying data related to the Gaussian mixture model, and the like. The high image quality formation process using the locality preserving projection tensor of the present invention can be applied as the process for increasing the image quality of the image in which the object is specified.

An example of the high image quality formation process for face images will be described as the high image quality formation process using the tensor. Face images with different resolutions, persons, and patch positions are used as the studying images for calculating, by studying, a fourth-order tensor including resolutions, patch positions, persons, and pixels as studying targets. The studying images are used to calculate eigenvectors in the eigenspace by targeting the resolutions, the patch positions, the persons, and the pixel values. The fourth-order tensor based on the products of the calculated eigenvector is used to generate medium resolution face images from the face images included in the input images. The eigenvectors can be calculated by studying based on the eigenvalue decomposition method, the locality preserving projection (LPP), and the like. High resolution patches used to recover the high frequency components from the medium-resolution face images can be obtained from the high resolution studying images. The image processing device 250 stores the obtained tensors and high resolution patches.

When increasing the image quality of the face images included in the input images as the targets of the high image quality formation, the image processing device 250 converts the face images patch-by-patch based on the stored fourth-order tensor to obtain the patches that form the medium resolution face images. The image processing device 250 sets a Markov random field of the medium resolution patches and the stored high resolution patches. The energy minimization problem of all patches in the Markov random field model is solved by an iterative correction method (ICM) and the like to obtain high resolution face images in which the high frequency components are recovered.

When the configuration of the image processing device 100 described in FIG. 6 is adapted as the means for increasing the image quality in the image processing device 250, the output images of the addition unit 160 (or the combining unit 166) of FIG. 6 correspond to the "medium resolution" face images. The "medium resolution" images are further input to solve the energy minimization problem of the Markov random field model to obtain an output of the "high resolution" images.

The image processing device 250 may execute a process of generating low resolution face images from the face images included in the input images as preprocessing for obtaining the medium resolution patches. In this case, the image processing device 250 converts, by the fourth-order tensor, the low resolution face images obtained by the preprocessing to obtain the medium resolution patches. The preprocessing can include a process of converting the face images included in the input images by using a fifth-order tensor obtained by targeting the directions of faces, illumination levels, expressions, persons, and pixels. Face images with different directions of faces, illumination levels, expressions, and persons can be used as the studying images for obtaining the fifth-order tensor.

It is desirable to include a positioning process of the face images included in the input images as the preprocessing. For example, the face images may be positioned by an affine transformation. More specifically, parameters of the affine transformation are optimized to match the positions of the face images after the affine transformation and the face images for studying. It is obviously desirable to execute a positioning process for the face images for studying so that the positions of the images match.

An example of the high image quality formation process using the locality preserving projection (LPP) will be described below. In the studying stage, eigenvectors are calculated by the locality preserving projection (LPP) from the low resolution images and the high resolution images as the studying images. In the LPP space, the low resolution images and the high resolution images are associated by radial basis functions as weights of the network. Residual images between the medium resolution images obtained from an input of the low resolution images of the studying images and the low resolution images as well as residual images between the high resolution images of the studying images and the medium resolution images are calculated. The image processing device 250 stores the residual images between the medium resolution images and the low resolution images and the residual images between the high resolution images and the medium resolution images patch-by-patch.

When increasing the image quality of the input images as the targets of the high image quality formation, the image processing device 250 generates the eigenvectors from the input image based on the locality preserving projection (LPP) and the medium resolution images from the radial basis functions obtained in the studying stage. The image processing device 250 calculates the residual images between the medium resolution images and the input face images. The residual images between corresponding high resolution images and medium resolution images are selected patch-by-patch from the stored residual images based on the locally linear embedding (LLE) and the nearest search. The image processing device 250 adds residual images obtained by smoothing the residual images between the selected high resolution images and medium resolution images to the medium resolution images generated from the input images to generate the high quality images.

In the super-resolution process based on the principal component analysis as described in Japanese Patent Application Laid-Open No. 2006-350498, the images of the objects are expressed by principal component vectors and weighting factors. The amount of data of the weighting factors and the principal component vectors is significantly small compared to the amount of data of the pixel data included in the images of the objects. Therefore, the image processing units 804 may calculate the weighting factors from the images of the objects included in the feature areas in the compression process for compressing the images of the feature areas in the plurality of photographic images acquired from the imaging unit 212. More specifically, the image processing units 804 can compress the images of the objects included in the feature areas by expressing the images by the principal component vectors and the weighting factors. The image processing units 804 may transmit the principal component vectors and the weighting factors to the image processing device 250. In this case, the image processing device 250 can use the principal component vectors and the weighting factors acquired from the image processing units 804 to reconfigure the images of the objects included in the feature areas. Instead of the model based on the principal component analysis as described in Japanese Patent Application Laid-Open No. 2006-350498, it is obvious that the image processing units 804 can use a model for expressing the objects by various feature parameters to compress the images of the objects included in the feature areas.

In the configuration of the image processing system 200 described in relation to FIGS. 13 to 27, the image processing device 250 or the display device 260 can also apply the super-resolution process to the images of the feature areas as the high image quality formation process. In the image processing system 200 and the image processing system 201, the compression unit 232 can, like the image processing device 220, express the images by the principal component vectors and the weighting factors to further compress the photographic images.

An example of the monitoring system is illustrated above to describe the operations of the image processing systems 200 and 201. A high image quality formation process and encoding for a document scanned by a scanner device such as a copy machine can be applied as another application of the invention. For example, assuming that areas, such as texts, drawings, tables, and photographs, are feature areas, a high image quality formation process, such as the super-resolution process, can be applied as the high resolution formation process to the areas. The feature area detection process and the compression process can be applied to the detection and encoding of the feature areas. Similarly, the feature area detection process, the high image quality formation process, and the compression process can be applied to the detection, high image quality formation, and encoding of regions inside the body in an endoscopic system.

MODIFIED EXAMPLE 1

Although the image processing systems 200 and 201 include the plurality of imaging devices 210*a-d* in the example described above, the number of imaging devices 210 is not particularly limited, and the number of imaging devices 210 may be one. The number of display devices 260 is not particularly limited either, and the number of display devices 260 may be one.

MODIFIED EXAMPLE 2

Although the feature areas are specified from the photographic images (frame images or field images) in the video data in the image processing systems 200 and 201, the image processing systems 200 and 201 can be applied not only to the video data, but also to still image data.

MODIFIED EXAMPLE 3

Although the configuration that can detect a plurality of feature areas from one photographic image is described in the image processing systems 200 and 201, the number of feature areas is not particularly limited, and there may be one feature area in one photographic image.

MODIFIED EXAMPLE 4

The mode of the means for acquiring the studying image group is not limited to the mode of preparing the image group of pairs of high quality images and low quality images. Only the high quality images may be provided, and the low quality images may be generated from the high quality images to obtain the image pairs. For example, processing means (low image quality formation processing means) for executing a process of decreasing the image quality may be included in the image processing device. High quality studying images can be input, and the device can decrease the image quality of the high quality studying images to acquire studying image pairs.

In the case of the image processing systems 200 and 201 described in FIGS. 13 and 27, the mode is not limited to the mode in which the studying images are provided from a prepared database and the like. The systems can be operated to update the studying content based on images actually imported by the imaging device 210 or images (partial images) cut out from the images. The conversion accuracy can be further improved by appropriately importing the studying images according to the application of the system or the installation location of the imaging device to execute the studying step again.

MODIFIED EXAMPLE 5

Although an example of studying image data to convert images by increasing the image quality is described in the embodiment, the present invention can be applied not only to the high image quality formation process, but also to other image conversions such as image recognition. The data to be processed is not limited to the images, but various data other than the images can be similarly applied. More specifically, the configurations described as the image processing device, the image processing means, and the image processing system can be expanded as a data processing device, data processing means, and a data processing system.

<Application to Image Recognition>

An application to a technique of personal authentication based on image recognition will be described as an application other than the high image quality formation process. In this case, the same process as the process up to the intermediate eigenspace of the high image quality formation process described in FIGS. 2, 3, 6, and the like can be executed, and the positional relationship between the coefficient vectors in the intermediate eigenspace can be used to perform the personal authentication. The distances, the directions, and the like can be obtained for the positional relationship based on the obtaining method of the "coefficient vector correction processing unit 140". More specifically, the closer the obtained distances and directions of the input data to the studying data, the higher the possibility that the input data is a determination target.

Therefore, the similarity to a specific person (for example, likelihood of "Person A") can be determined from the positional relationship between the studying data and the newly input data in the intermediate eigenspace (personal different eigenspace here).

Various conditions can be considered for the input images of faces, such as facing to the front, to the left, to the right . . . However, a new advantageous effect that one or more conditions can be accurately handled by a single standard can be obtained using a property that even if images of any directions are input, the images gather into one point on the intermediate eigenspace (for example, personal difference eigenspace) through a direction modality such as facing to the front, to the left, to the right . . . .

Not only the modality of "direction", but also resolution modalities of low resolution, medium resolution, high resolution, . . . and the like as well as various modalities described above can be similarly handled. In this way, the same applies to other modalities with one or more conditions. Even if images of any conditions are input in relation to a specific modality, one or more conditions can be accurately handled by a single standard using the property that the images gather into one point on the intermediate eigenspace through the specific modality.

<Application to Speech Recognition>

An example of an application to speech recognition will be described as an example of handling data other than the images. Voice data is targeted in place of the image data, and the process similar to the process up to the intermediate eigenspace of the high image quality formation process described in FIGS. 2, 3, 6, and the like can be executed to perform the speech recognition using the positional relationship between the coefficient vectors in the intermediate eigenspace. The distances, the directions, and the like can be obtained for the positional relationship by the obtaining method of the "coefficient vector correction processing unit 140". More specifically, the closer the obtained distances and directions of the input data to the studying data, the higher the possibility that the input data is a determination target.

In this case, for example, modalities of the number of sound samples (low resolution and high resolution) of the voice data are applied to the pixel modalities (low resolution and high resolution) described for the image data. A signal-to-noise ratio (S/N) and the positions of a sound source and a microphone (sensor) can also be handled as the modalities.

In the conventional method, the studying eigenspace for speech recognition needs to be prepared for each sampling frequency, such as 48 kHz, 44.1 kHz, and 32 kHz, or each number of quantization bits, such as 16 bits and 8 bits.

Conversely, according to the present invention, the determination is made on a common studying eigenspace for speech recognition (equivalent to the "intermediate eigenspace"), and a plurality of samples and quantization bits can be commonly recognized and handled by one type of criteria. Therefore, there is an advantageous effect that the criteria do not have to be adjusted case by case. Moreover, local features are preserved in the time axis direction, and the high frequency components can be identified well. The same advantageous effect can be obtained for the modalities such as the S/N and the sound source microphone position.

<Application to Language Processing>

An example of an application to language processing will be described as another example of handling data other than the images. Language data (may be voice data or text data) is targeted in place of the image data, and the process similar to the process up to the intermediate eigenspace of the high image quality formation process described in FIGS. 2, 3, 6, and the like can be executed to perform the language processing using the positional relationship between the coefficient vectors in the intermediate eigenspace. The distances, the directions, and the like can be obtained for the positional relationship by the obtaining method of the "coefficient vector correction processing unit 140". More specifically, the closer the obtained distances and directions of the input data to the studying data, the higher the possibility that the input data is a determination target.

In this case, for example, language (Japanese and English) modalities are applied to the pixel modalities (low resolution and high resolution) described in relation to the image data. Regions (dialects), applications (formal (news) and informal), eras (Heian period, Edo period, and modern era), and generations (high school students and elderly) can also be handled as the modalities.

In the conventional method, the studying eigenspace for language recognition needs to be prepared for each language, such as Japanese and English.

Conversely, according to the present invention, the determination is made on a common studying eigenspace for language recognition (equivalent to the "intermediate eigenspace"), and a plurality of languages can be commonly recognized and handled by one type of criteria. Therefore, there is an advantageous effect that the criteria do not have to be adjusted case by case. Moreover, local features are preserved on the language feature space, and in general, the languages often indicate sparse characteristics. Therefore, the languages can be excellently identified. The same advantageous effect can be obtained for the modalities such as the regions, the applications, the eras, and the generations.

<Application to Living Body Information Processing>

An example of an application to living body information processing will be described as another example of handling data other than the images. Examples of the living body information include waveforms, periods, and amplitudes of the heartbeat, pulse, blood pressure, breathing, and sweating. The data of the living body information is targeted in place of the image data, and the process similar to the process up to the intermediate eigenspace of the high image quality formation process described in FIGS. 2, 3, 6, and the like can be executed to execute the living body information process using the positional relationship between the coefficient vectors in the intermediate eigenspace. The distances, the directions, and the like may be obtained for the positional relationship by the obtaining method of the "coefficient vector correction processing unit 140". More specifically, the closer the obtained distances and directions of the input data to the studying data, the higher the possibility that the input data is a determination target.

In this case, for example, modalities of the number of data samples (low decomposition and high decomposition) of the living body information are applied to the pixel modalities (low resolution and high resolution) described in relation to the image data. The signal-to-noise ratio (S/N) and the positions of the signal source and the sensor can also be handled as the modalities.

In the conventional method, the studying eigenspace for living body information needs to be prepared for each sampling frequency or each number of quantization bits.

Conversely, according to the present invention, the determination is made on a common studying eigenspace for living body information process (equivalent to the "intermediate eigenspace"), and a plurality of samples and quantization bits can be commonly recognized and handled by one type of criteria. Therefore, there is an advantageous effect that the criteria do not have to be adjusted case by case. Moreover, local features are preserved in the time axis direction, and the high frequency components can be identified well. The same advantageous effect can be obtained for the modalities such as the S/N and the sensor position.

<Application to Natural/Physical Information Processing>

An example of an application to natural/physical information processing will be described as another example of handling data other than the images. Examples of the natural/physical information include waveforms, periods, and amplitudes of weather, climate, and earthquake. Data of the natural/physical information is targeted in place of the image data, and the process similar to the process up to the intermediate eigenspace of the high image quality formation process described in FIGS. 2, 3, 6, and the like can be executed to process the natural/physical information using the positional relationship between the coefficient vectors in the intermediate eigenspace. The distances, the directions, and the like may be obtained for the positional relationship by the obtaining method of the "coefficient vector correction processing unit 140". More specifically, the closer the obtained distances and directions of the input data to the studying data, the higher the possibility that the input data is a determination target.

In this case, for example, modalities of the number of data samples (low decomposition and high composition) are applied to the pixel modalities (low resolution and high resolution) described in relation to the image data. The signal-to-noise ratio (S/N) and the positions of the signal source and the sensor can also be handled as the modalities.

In the conventional method, the studying eigenspace for natural/physical information processing needs to be prepared for each sampling frequency and each number of quantization bits.

Conversely, according to the present invention, the determination is made on a common studying eigenspace for natural/physical information processing (equivalent to the "intermediate eigenspace"), and a plurality samples and quantization bits can be commonly recognized and handled by one type of criteria. Therefore, there is an advantageous effect that the criteria do not have to be adjusted case by case. Moreover, local features are preserved in the time axis direction, and the high frequency components can be identified well. The same advantageous effect can be obtained for the modalities such as the S/N and the sensor position.

{Reference Signs Lists}

100 . . . image processing device, 108 . . . LPP projection tensor generation unit, 114 . . . re-projection tensor generation unit, 115 . . . LPP eigenprojection matrix, 116 . . . LPP projection core tensor, 122 . . . first sub-core tensor generation unit, 124 . . . second sub-core tensor generation unit, 130 . . . first LPP_HOSVD projection processing unit, 150 . . . second LPP_HOSVD projection unit, 200 . . . image processing system, 201 . . . image processing system, 610 . . . first feature area specifying unit, 620 . . . second feature area specifying unit, 230 . . . compression control unit, 232 . . . compression unit

The invention claimed is:

1. An image processing device comprising:
a studying image acquisition device which is part of a processor and is configured to acquire a studying image group including an image pair of a first-quality image and a second-quality image with different image qualities;
an eigenprojection matrix generation device which is part of a processor and is configured to generate, from the acquired studying image group, an eigenprojection matrix by a projection computation using a local relationship;
a projection core tensor creation device which is part of a processor and is configured to create, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace;
a first sub-core tensor creation device which is part of a processor and is configured to create, from the created projection core tensor, a first sub-core tensor corresponding to a condition specified by a first setting;
a second sub-core tensor creation device which is part of a processor and is configured to create, from the created projection core tensor, a second sub-core tensor corresponding to a condition specified by a second setting;
a first subtensor projection device which is part of a processor and is configured to project an input image to be processed by a first projection computation using the eigenprojection matrix and the first sub-core tensor to calculate a coefficient vector in the intermediate eigenspace; and
a second subtensor projection device which is part of a processor and is configured to project the calculated coefficient vector by a second projection computation using the second sub-core tensor and the eigenprojection matrix to generate a change image with an image quality different from the input image.

2. The image processing device according to claim 1, wherein
the first-quality image is an image with a relatively low image quality of the image pair,
the second-quality image is an image with a relatively high image quality of the image pair, and
the change image is an image with a higher image quality than the input image.

3. The image processing device according to claim 1, wherein
the first setting designates a projection relationship of projecting the first-quality image on the intermediate eigenspace, and
the second setting designates a projection relationship of projecting the second-quality on the intermediate eigenspace.

4. The image processing device according to claim 1, wherein
the projection computation using the local relationship is one of locality preserving projection (LPP), locally linear embedding (LLE), linear tangent-space alignment (LTSA), Isomap, Laplacian Eigenmaps (LE), and Neighborhood Preserving Embedding (NPE).

5. The image processing device according to claim 1, wherein
the studying image group includes the image pair targeting a face of a person, and
the intermediate eigenspace is a personal difference eigenspace.

6. An image processing device comprising:
a studying image acquisition device which is part of a processor and is configured to acquire a studying image group including an image pair of a first-quality image and a second-quality image with different image qualities;
an eigenprojection matrix generation device which is part of a processor and is configured to generate, from the acquired studying image group, an eigenprojection matrix by a projection computation using a local relationship;
a projection core tensor creation device which is part of a processor and is configured to create, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and
a storage device which is part of a processor and is configured to store the eigenprojection matrix generated by the eigenprojection matrix generation device and the projection core tensor created by the projection core tensor creation device.

7. The image processing device according to claim 6, further comprising:
a first sub-core tensor creation device which is part of a processor and is configured to create, from the created projection core tensor, a first sub-core tensor corresponding to a condition specified by a first setting; and
a second sub-core tensor creation device which is part of a processor and is configured to create, from the created projection core tensor, a second sub-core tensor corresponding to a condition specified by a second setting, wherein
the first sub-core tensor created by the first sub-core tensor creation device and the second sub-core tensor created by the second sub-core tensor creation device are stored and preserved in the storage device in place of the projection core tensor or along with the projection core tensor.

8. An image processing device comprising:
an information acquisition device which is part of a processor and is configured to acquire an eigenprojection matrix generated, by a projection computation using a local relationship, from a studying image group including an image pair of a first-quality image and a second-quality image with different image qualities, to acquire a first sub-core tensor created corresponding to a condition specified by a first setting from a projection core tensor using locality, the projection core tensor generated from the studying image group and the eigenprojection matrix, the projection core tensor defusing a correspondence between the first-quality image and an intermediate eigenspace and a correspondence between the second-quality image and the intermediate eigenspace, and to acquire a second sub-core tensor created corresponding to a condition specified by a second setting from the projection core tensor;

a first subtensor projection device which is part of a processor and is configured to project an input image to be processed by a first projection computation using the eigenprojection matrix and the first sub-core tensor acquired from the information acquisition device to calculate a coefficient vector in the intermediate eigenspace; and a second subtensor projection device which is part of a processor and is configured to project the calculated coefficient vector by a second projection computation using the second sub-core tensor and the eigenprojection matrix acquired from the information acquisition device to generate a change image with an image quality different from the input image.

9. The image processing device according to claim 1, further comprising:

a first feature area specifying device which is part of a processor and is configured to specify a first feature area from an inputted image;

a compression processing device which is part of a processor and is configured to compress an image part of the first feature area in the inputted image at a first compressive strength and compressing an image part other than the first feature area at a second compressive strength which is a compressive strength higher than the first compressive strength; and a device in a processor which is configured to project at least the first feature area by the first subtensor projection device and the second subtensor projection device to change the image quality.

10. An image processing method comprising:

a studying image acquisition step of acquiring a studying image group including an image pair of a first-quality image and a second-quality image with different image qualities;

an eigenprojection matrix generation step of generating, from the acquired studying image group, an eigenprojection matrix by a projection computation using a local relationship;

a projection core tensor creation step of creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace;

a first sub-core tensor creation step of creating, from the created projection core tensor, a first sub-core tensor corresponding to a condition specified by a first setting;

a second sub-core tensor creation step of creating, from the created projection core tensor, a second sub-core tensor corresponding to a condition specified by a second setting;

a first subtensor projection step of projecting an input image to be processed by a first projection computation using the eigenprojection matrix and the first sub-core tensor to calculate a coefficient vector in the intermediate eigenspace; and a second subtensor projection step of projecting the calculated coefficient vector by a second projection computation using the second sub-core tensor and the eigenprojection matrix to generate a change image with an image quality different from the input image.

11. An image processing method comprising:

a studying image acquisition step of acquiring a studying image group including an image pair of a first-quality image and a second-quality image with different image qualities;

an eigenprojection matrix generation step of generating, from the acquired studying image group, an eigenprojection matrix by a projection computation using a local relationship;

a projection core tensor creation step of creating, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and a storage step of storing, in a storage device which is part of a processor, the eigenprojection matrix generated in the eigenprojection matrix generation step and the projection core tensor created in the projection core tensor creation step.

12. The image processing method according to claim 11, further comprising:

a first sub-core tensor creation step of creating, from the created projection core tensor, a first sub-core tensor corresponding to a condition specified by a first setting; and a second sub-core tensor creation step of creating, from the created projection core tensor, a second sub-core tensor corresponding to a condition specified by a second setting, wherein the first sub-core tensor created in the first sub-core tensor creation step and the second sub-core tensor created in the second sub-core tensor creation step are stored and preserved in the storage device in place of the projection core tensor or along with the projection core tensor.

13. An image processing method comprising:

an information acquisition step of acquiring an eigenprojection matrix generated, by a projection computation using a local relationship, from a studying image group including an image pair of a first-quality image and a second-quality image with different image qualities, acquiring a first sub-core tensor created corresponding to a condition specified by a first setting from a projection core tensor using locality, the projection core tensor generated from the studying image group and the eigenprojection matrix, the projection core tensor defining a correspondence between the first-quality image and an intermediate eigenspace and a correspondence between the second-quality image and the intermediate eigenspace, and acquiring a second sub-core tensor created corresponding to a condition specified by a second setting from the projection core tensor;

a first subtensor projection step of projecting an input image to be processed by a first projection computation using the eigenprojection matrix and the first sub-core tensor acquired in the information acquisition step to calculate a coefficient vector in the intermediate eigenspace; and a second subtensor projection step of projecting the calculated coefficient vector by a second projection computation using the second sub-core tensor and the eigenprojection matrix acquired in the information acquisition step to generate a change image with an image quality different from the input image.

14. A non-transitory computer-readable recording medium including a program stored thereon, such that when the program is read and executed b a com cuter the com cuter is caused to function as:

a studying image acquisition device which is part of a processor and is configured to acquire a studying image group including an image pair of a first-quality image and a second-quality image with different image qualities;

an eigenprojection matrix generation device which is part of a processor and is configured to generate, from the acquired studying image group, an eigenprojection matrix by a projection computation using a local relationship;

a projection core tensor creation device which is part of a processor and is configured to create, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace;

a first sub-core tensor creation device which is part of a processor and is configured to create, from the created projection core tensor, a first sub-core tensor corresponding to a condition specified by a first setting;

a second sub-core tensor creation device which is part of a processor and is configured to create, from the created projection core tensor, a second sub-core tensor corresponding to a condition specified by a second setting;

a first subtensor projection device which is part of a processor and is configured to project an input image to be processed by a first projection computation using the eigenprojection matrix and the first sub-core tensor to calculate a coefficient vector in the intermediate eigenspace; and a second subtensor projection device which is part of a processor and is configured to project the calculated coefficient vector by a second projection computation using the second sub-core tensor and the eigenprojection matrix to generate a change image with an image quality different from the input image.

15. A non-transitory computer-readable recording medium including a program stored thereon, such that when the program is read and executed by a computer, the computer is caused to function as:

a studying image acquisition device which is part of a processor and is configured to acquire a studying image group including an image pair of a first-quality image and a second-quality image with different image qualities;

an eigenprojection matrix generation device which is part of a processor and is configured to generate, from the acquired studying image group, an eigenprojection matrix by a projection computation using a local relationship;

a projection core tensor creation device which is part of a processor and is configured to create, from the acquired studying image group and the generated eigenprojection matrix, a projection core tensor using locality, the projection core tensor defining a correspondence between the first-quality image and an intermediate eigenspace and a correspondence between the second-quality image and the intermediate eigenspace; and a storage device which is part of a processor and is configured to store the eigenprojection matrix generated by the eigenprojection matrix generation unit and the projection core tensor created by the projection core tensor creation unit.

16. The medium according to claim 15, further causing the computer to function as:

a first sub-core tensor creation device which is part of a processor and is configured to create a first sub-core tensor corresponding to a condition specified by a first setting from the created projection core tensor; and a second sub-core tensor creation device which is part of a processor and is configured to create a second sub-core tensor corresponding to a condition specified by a second setting from the created projection core tensor, wherein the first sub-core tensor created by the first sub-core tensor creation device and the second sub-core tensor created by the second sub-core tensor creation device are stored and preserved in the storage device in place of the projection core tensor or along with the projection core tensor.

17. A non-transitory computer-readable recording medium including a program stored thereon, such that when the program is read and executed by a computer, the computer is caused to function as:

an information acquisition device which is part of a processor and is configured to acquire an eigenprojection matrix generated, by a projection computation using a local relationship, from a studying image group including an image pair of a first-quality image and a second-quality image with different image qualities, to acquire a first sub-core tensor created corresponding to a condition specified by a first setting from a projection core tensor using locality, the projection core tensor generated from the studying image group and the eigenprojection matrix, the projection core tensor defining a correspondence between the first-quality image and an intermediate eigenspace and a correspondence between the second-quality image and the intermediate eigenspace, and to acquire a second sub-core tensor created corresponding to a condition specified by a second setting from the projection core tensor;

a first subtensor projection device which is part of a processor and is configured to project an input image to be processed by a first projection computation using the eigenprojection matrix and the first sub-core tensor acquired from the information acquisition device to calculate a coefficient vector in the intermediate eigenspace; and a second subtensor projection device which is part of a processor and is configured to project the calculated coefficient vector by a second projection computation using the second sub-core tensor and the eigenprojection matrix acquired from the information acquisition device to generate a change image with an image quality different from the input image.

18. A data processing device comprising:
an eigenprojection matrix generation device which is part of a processor and is configured to generate, from a studying data group, an eigenprojection matrix by a projection computation using a local relationship;
a projection core tensor creation device which is part of a processor and is configured to create, from the studying data group and the generated eigenprojection matrix, a projection tensor using locality; and
a storage device which is part of a processor and is configured to store the eigenprojection matrix generated by the eigenprojection matrix generation device and the projection core tensor created by the projection core tensor creation device.

19. A data processing method comprising:
an eigenprojection matrix generation step of generating, from a studying data group, an eigenprojection matrix by a projection computation using a local relationship;
a projection core tensor creation step of creating, from the studying data group and the generated eigenprojection matrix, a projection tensor using locality; and
a storage step of storing, in a storage device which is part of a processor, the eigenprojection matrix generated in the eigenprojection matrix generation step and the projection core tensor created in the projection core tensor creation step.

20. A non-transitory computer-readable recording medium including a program stored thereon, such that when the program is read and executed by a computer, the computer is caused to function as:
an eigenprojection matrix generation device which is part of a processor and is configured to generate, from a studying data group, an eigenprojection matrix by a projection computation using a local relationship;
a projection core tensor creation device which is part of a processor and is configured to create, from the studying data group and the generated eigenprojection matrix, a projection tensor using locality; and
a storage device which is part of a processor and is configured to store the eigenprojection matrix generated by the eigenprojection matrix generation device and the projection core tensor created by the projection core tensor creation device.

21. A data processing device comprising:
an information acquisition device which is part of a processor and is configured to acquire an eigenprojection matrix generated, by a projection computation using a local relationship, from a studying data group including a pair of first-condition data and second-condition data with different conditions and to acquire a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and
a first subtensor projection device which is part of a processor and is configured to project input data to be processed by a first projection computation using the eigenprojection matrix and the first sub-core tensor acquired from the information acquisition device to calculate a coefficient vector in the intermediate eigenspace.

22. A data processing method comprising:
an information acquisition step of acquiring an eigenprojection matrix generated, by a projection computation using a local relationship, from a studying data group including a pair of first-condition data and second-condition data with different conditions and acquiring a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and
a first subtensor projection step of projecting input data to be processed by a first projection computation using the eigenprojection matrix and the first sub-core tensor acquired in the information acquisition step to calculate a coefficient vector in the intermediate eigenspace.

23. A non-transitory computer-readable recording medium including a program stored thereon, such that when the program is read and executed by a computer, the computer is caused to function as:
an information acquisition device which is part of a processor and is configured to acquire an eigenprojection matrix generated, by a projection computation using a local relationship, from a studying data group including a pair of first-condition data and second-condition data with different conditions and to acquire a first sub-core tensor that is created corresponding to a condition specified by a first setting and that is created from a projection core tensor using locality, the projection core tensor generated from the studying data group and the eigenprojection matrix, the projection core tensor defining a correspondence between the first-condition data and an intermediate eigenspace and a correspondence between the second-condition data and the intermediate eigenspace; and
a first subtensor projection device which is part of a processor and is configured to project input data to be processed by a first projection computation using the eigenprojection matrix and the first sub-core tensor acquired from the information acquisition unit to calculate a coefficient vector in the intermediate eigenspace.

* * * * *